US011302213B2

(12) United States Patent
Connell et al.

(10) Patent No.: US 11,302,213 B2
(45) Date of Patent: *Apr. 12, 2022

(54) TACTICAL TARGET MOBILE DEVICE

(71) Applicant: Mobile Virtual Player, LLC, Bradford, VT (US)

(72) Inventors: Quinn R. Connell, Pleasant Hill, OR (US); James A. Beaulieu, Orford, NH (US); John H. Currier, Norwich, VT (US); Ryan G. McManus, Mendota Heights, MN (US); David J. Polashenski, Fairbanks, AK (US); C. Matthew Mitman, Cape Elizabeth, ME (US); Kristie Nicole Kelly, Oyster Bay, NY (US); J. Cedar M. Farwell, Norwich, VT (US); Kendall M. Ronzano, Santa Cruz, CA (US); Daniel Robert Magoon, North Granby, CT (US); Cristel E. Callupe Chavez, Brookline, MA (US)

(73) Assignee: Mobile Virtual Player LLC, Bradford, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/512,939

(22) Filed: Jul. 16, 2019

(65) Prior Publication Data

US 2020/0051456 A1 Feb. 13, 2020

Related U.S. Application Data

(63) Continuation-in-part of application No. 15/614,009, filed on Jun. 5, 2017, now Pat. No. 10,702,757, which (Continued)

(51) Int. Cl.
*G09B 19/00* (2006.01)
*G09B 9/00* (2006.01)
*A63B 69/34* (2006.01)

(52) U.S. Cl.
CPC ............. *G09B 19/003* (2013.01); *G09B 9/00* (2013.01); *A63B 69/345* (2013.01); *A63B 2225/50* (2013.01)

(58) Field of Classification Search
CPC . G09B 19/003; G09B 9/00; F41J 5/00; A63B 69/345; A63B 2225/50

(Continued)

(56) References Cited

U.S. PATENT DOCUMENTS

| | | | | |
|---|---|---|---|---|
| 3,401,939 A | * | 9/1968 | La Mura | F41J 5/044 273/373 |
| 4,953,875 A | * | 9/1990 | Sudit | F41J 5/044 273/373 |
| 2005/0153262 A1 | * | 7/2005 | Kendir | G09B 19/0038 434/21 |

* cited by examiner

*Primary Examiner* — John E Simms, Jr.
*Assistant Examiner* — Rayshun K Peng
(74) *Attorney, Agent, or Firm* — Blank Rome LLP

(57) ABSTRACT

A device, sometimes mobile, which simulates human motion, such as an omnidirectional sensing target. The target that can detect and differentiate between projectile (bullet) hits to the head, body, and one or more peripheral regions (e.g., arms, pelvis, legs) of a humanoid-form target, elicit a physical response from the mobile device based upon the sensing data, and provide real time feedback to a user (shooter) via a user-friendly interface. The target includes multiple layers of conductive material separated by one or more insulating layers. Forming can be by wrapping planar sensing panel into a three-dimensional configuration such that the panel occludes a three-dimensional volume and presents surfaces sensing projectiles from all directions. Associated circuitry is configured to have a bullet pass (Continued)

through multiple zones and to electronically detect the bullet path based on a combination and/or sequence of zones detecting bullet passage.

28 Claims, 32 Drawing Sheets

Related U.S. Application Data is a continuation-in-part of application No. 15/240,346, filed on Aug. 18, 2016, now Pat. No. 9,682,301, which is a continuation-in-part of application No. 14/582,264, filed on Dec. 24, 2014, now Pat. No. 9,427,649.

(60) Provisional application No. 62/698,461, filed on Jul. 16, 2018, provisional application No. 62/274,834, filed on Jan. 5, 2016, provisional application No. 61/920,801, filed on Dec. 26, 2013.

(58) Field of Classification Search
USPC .......................................................... 473/441
See application file for complete search history.

Route Recording / Playback

Fully Autonomous / Fleet Control

Route Recording / Playback

Fully Autonomous / Hybrid Team

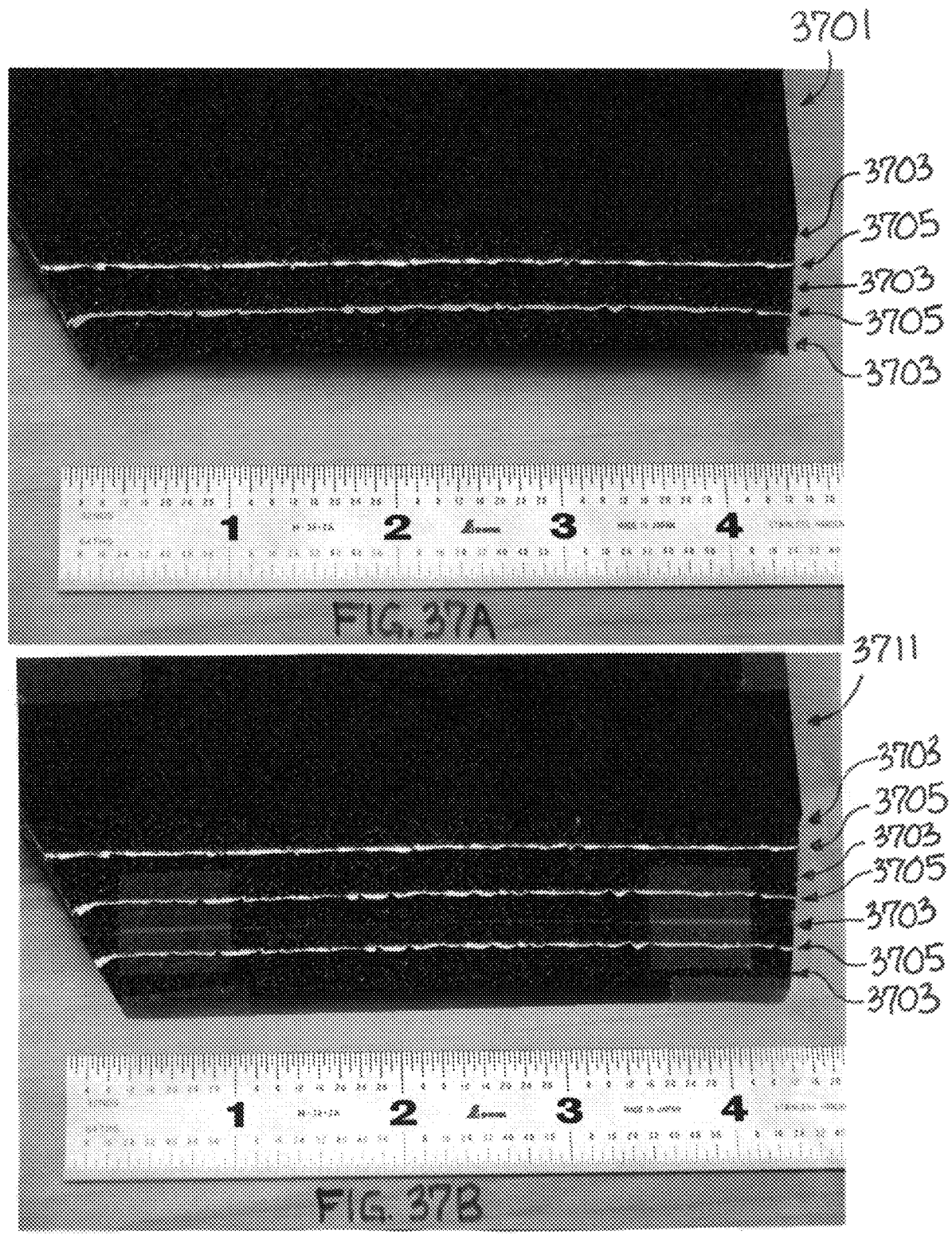

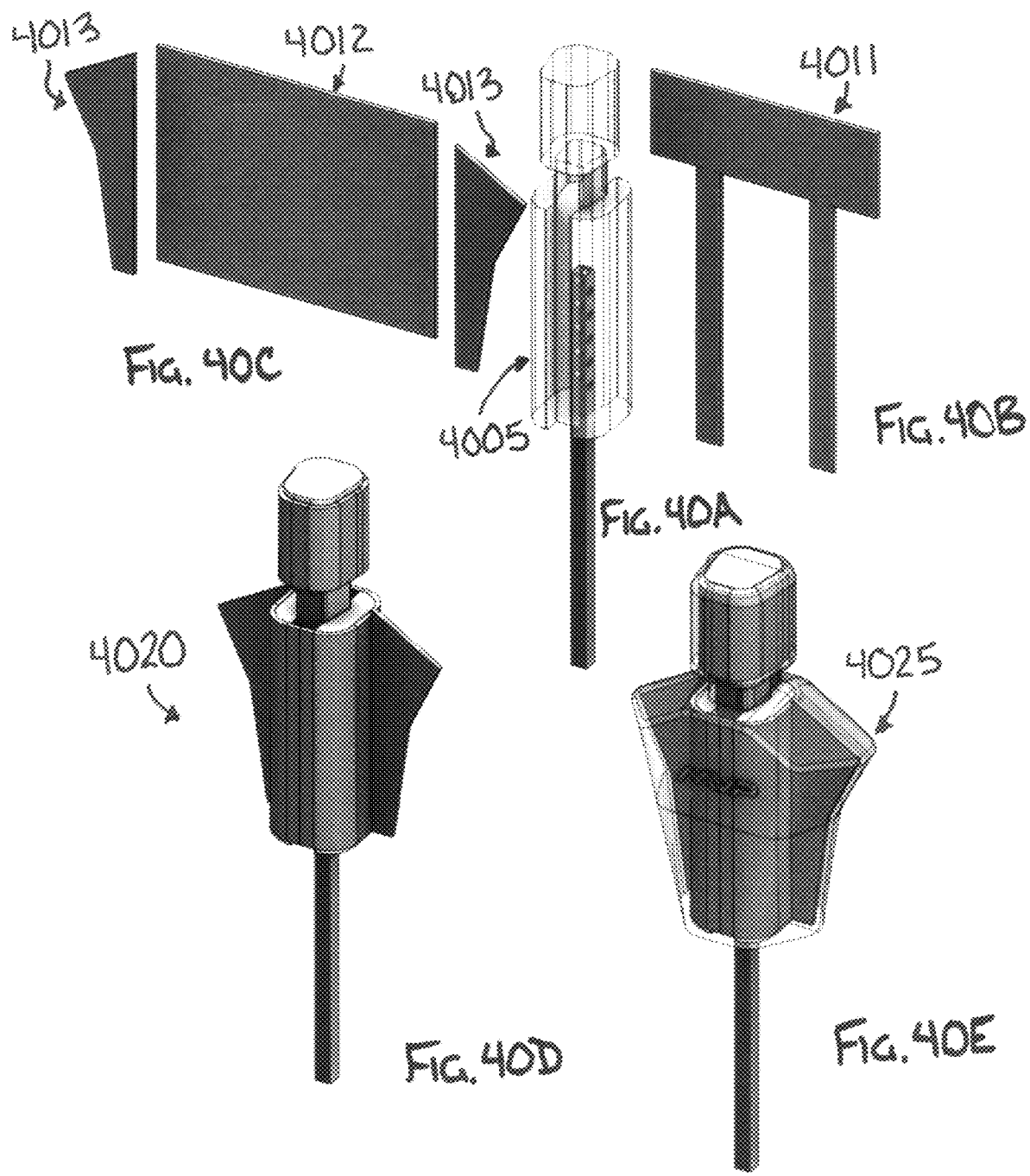

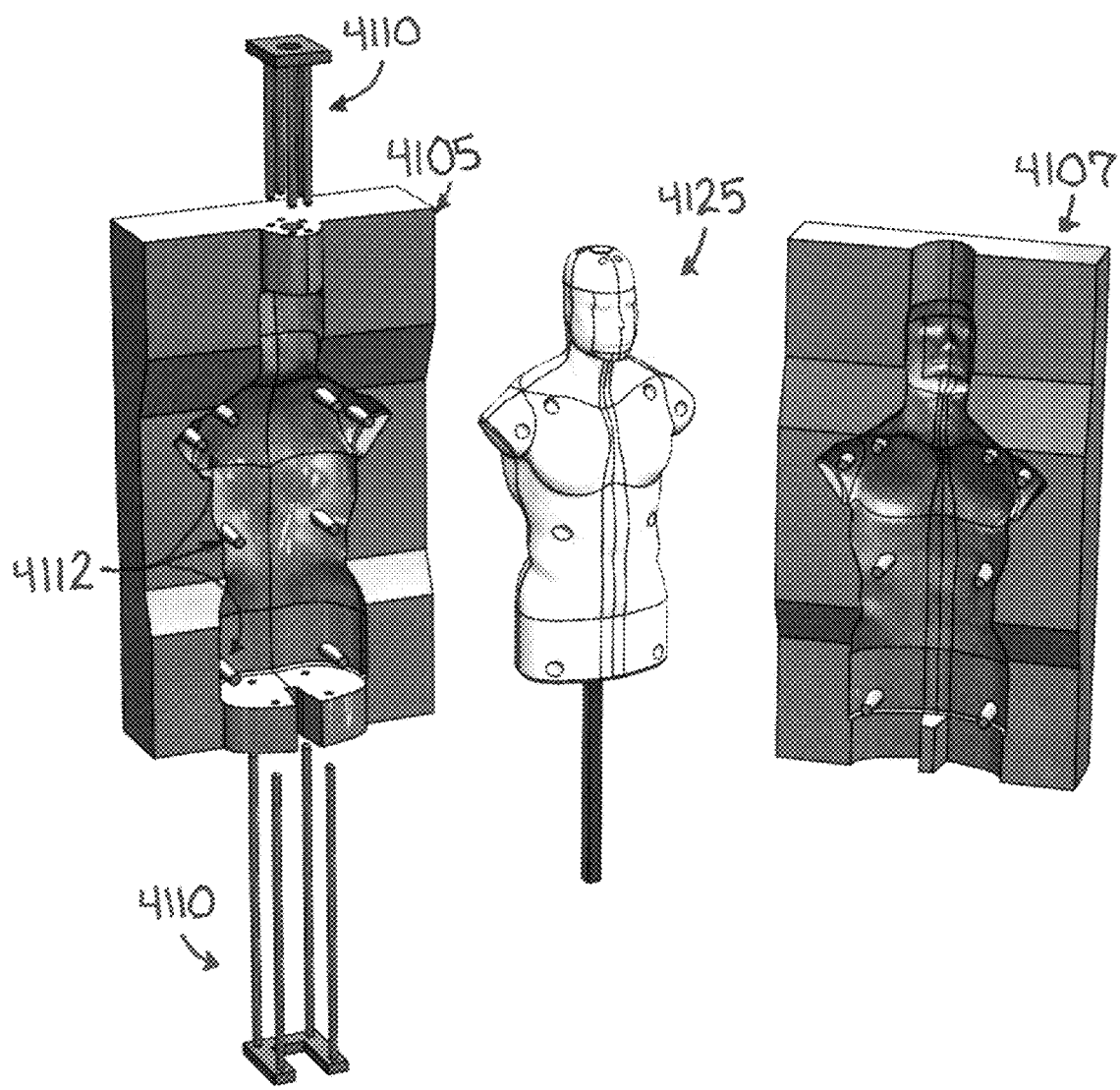

TACTICAL TARGET MOBILE DEVICE

CROSS-REFERENCE TO RELATED APPLICATIONS

This application is a continuation-in-part of U.S. patent application Ser. No. 15/614,009, filed Jun. 5, 2017; which application is a continuation-in-part of U.S. patent application Ser. No. 15/240,346, filed Aug. 18, 2016 (now U.S. Pat. No. 9,682,301); which application is a continuation-in-part of U.S. patent application Ser. No. 14/582,264, filed Dec. 24, 2014 (now U.S. Pat. No. 9,427,649); which application claims benefit of priority of U.S. Provisional Application Ser. No. 61/920,801, filed Dec. 26, 2013. This application claims benefit of priority of U.S. Provisional Application No. 62/698,461, filed Jul. 16, 2018. U.S. patent application Ser. No. 15/240,346, claims benefit of priority of U.S. Provisional Application No. 62/274,834 filed Jan. 5, 2016. All of the above-referenced related applications are incorporated herein by reference.

FIELD OF THE INVENTION

The present invention is directed to a dynamic drive system and mobile device which can be integrated into any activity where simulated or actual motion from a non-human device can improve safety, practice efficiency and performance, including, but not limited to, athletics and military/law enforcement. In particular, the invention is directed to any device, or any powered mobile device, which suits to replace a human counterpart for improved safety and more effective training.

BACKGROUND OF THE INVENTION

Many activities pose serious health risks to the participants. These health risks are also present when practicing or drilling for these activities. For example, a major concern facing football players today is the risk of concussive head injuries, which can lead to a variety of dangerous medical conditions. In order to reduce the occurrence of these types of injuries, teams/organizations are limiting contact during practices. In place of tackling each other during practice, most teams now use tackling drills which simplify tackling and break it into multiple steps which can be safely practiced. Limiting contact has been successful at reducing injuries during practice or drilling, but it has left no way for players or participants to practice realistic or relevant scenarios.

As an example of such limited contact, in football, current drills focus on pursuing a player and not finishing the tackle to the ground, or using a padded target, known as a tackling dummy, instead of a live player. Tackling dummies are used by almost all football teams but do not simulate a realistic tackle because they are static objects whereas an opposing player moves dynamically. There are some products on the market today that attempt to mobilize the tackling dummy; however, none of them accurately simulate the motion of a live player.

Although various methods to provide for increased safety in football and other activities have been attempted, known devices have not effectively protected athletes or participants while simulating the motion of a live person. In order to prevent injuries while allowing players or participants to practice various movements without person-to-person contact or interaction, individuals, organization and sports teams are in need of a dynamic and mobile device which replicates or simulates human motion as realistically as possible.

Further, firearms training is an established industry with a variety of existing target systems to accommodate various training needs. State of the art consists of both stationary and reactive targets. Typically, when training with paper or steel stationary targets, shooters rely on an auditory or visual target response from down range to confirm hits. More advanced, mobile, three-dimensional, and/or reactive training set-ups are not readily available.

It would, therefore, be beneficial to provide a device or system which safely allows players or participants to practice proper form and procedure in realistic and relevant scenarios. It would also be beneficial to provide a device or system which is a safer alternative to live play or motion and which increases participant safety and reduces the incidence of injuries while at the same time reinforcing proper form and procedure. It would also be beneficial to provide a device or system which increases training efficacy by allowing trainers more complete control over the motion of elements in the training environment.

SUMMARY OF THE INVENTION

An object is to provide a device and/or drive system which safely allows participants to practice or train in a realistic and relevant scenario.

An object is to provide a device and/or drive system which provides a safer alternative to human interaction and which increases participant safety when compared to person to person contact and reduces the incidence of injuries while at the same time reinforcing proper form and procedure.

An object is to provide a device and/or drive system which reflects the unpredictable motion of a live player or participant.

An object is to provide a device and/or drive system which simulates realistic human movement.

An object is to provide a dynamic drive system and mobile device which can be integrated into any activity where simulated or actual motion from a non-human device can improve safety, practice efficiency and performance, including, but not limited to, athletics and military/law enforcement. Actualizations include, but are not limited to: rugby, lacrosse, soccer, hockey, field hockey, hurling, volleyball, basketball, tennis and racquet sports, wrestling, baseball, cricket, archery, hunting, boxing, kickboxing, taekwondo, mixed martial arts, flying disc sports, striking or grappling sports, football sports (American football, Gaelic football, Australian football, etc.), military, combat, animal training and police/crowd control.

An object is to provide a device and/or drive system which satisfactorily performs its intended function on various surfaces and in all types of weather conditions.

An object is to provide a device and/or drive system which can be easily stored, and which may include sufficient weather proofing to account for accidentally leaving the device in the elements for a period of time.

An object is to provide a device and/or drive system which, after a completed drill, must regain balance/control, deemed by percent of driveability/usability restored, and return to a satisfactory starting position to repeat again.

An object is to provide a device and/or drive system which is controlled using a wired or wireless control system, allowing for device to be controlled remotely to facilitate maximum mobility and precision.

An object is to provide an omnidirectional sensing target of a stationary or mobile device (robot); and more particularly to a sensing target that can detect and differentiate between projectile (bullet) hits to the head, body, and one or more peripheral regions of a humanoid-form target, elicit a physical response from the mobile device based upon the sensing data, and provide real time feedback to a user (shooter) via a user-friendly interface.

An embodiment is directed to a mobile device which simulates player motion, the device including a drive for providing motion to the device and pads positioned on the device. The device accurately mimics the unpredictable motion, with sufficient degrees of freedom, of a human to provide a safe alternative to live interaction to increase participant safety and decrease the incidence of injuries during practice or training.

An embodiment is directed to a controlled mobile device which simulates player motion. The device includes: a drive for providing translational or rolling motion to the device; at least one motor providing the motive force to power the drive; a wireless controller which controls the at least one motor; and infrastructure, such as, but not limited to, pads, suitably attached and positioned on the device. The device accurately mimics the unpredictable motion of a human to provide a safer alternative to live interaction to increase participant safety and decrease the incidence of injuries during practice or training.

An embodiment is directed to a mobile device which simulates human motion. The device includes a base with a drive system for providing motion to the device. Pads and a self-stabilizing component are provided on the device. The device accurately mimics the unpredictable motion of a human motion to provide a safer alternative to live interaction to increase participant safety and benefit while decreasing the incidence of injuries during practice or drill sessions.

Further features of the invention are directed to a system of padded devices capable of executing pre-programmed, semi-autonomous or fully autonomous routes, where multiple devices can work together to simulate patterns. The devices can be capable of executing motion autonomously or semi-autonomously, being capable of automatically returning to a predetermined "home" position after completion of a prescribed route.

The devices could also have a "Safe mode" during certain events, for example, returning to home. The devices might have restricted speed; collision avoidance; and/or audio/visual alerts. In one aspect, prescribed routes might be interrupted and considered finished in the event of contact with an object or person.

Routes could be based on previous player motion (from film, RFID, global/local positioning data, etc.). Sensor feedback can stop, slow, or redirect motion in the event of a detected obstacle or of a person near the device. There could be provided override from a handheld control unit. An automatic "return to home" function might be provided when a battery is below a specified threshold.

Multiple devices might be configured to work together, while preventing collisions, whether working only with other devices or whether sharing an area with humans. Accordingly, the devices can work in "hybrid" teams with humans, while preventing collisions with one another, and with the humans.

Systems of the present invention can send controls one-way to dictate or prescribe device motion. Further, the system could send controls and receive telemetry from the devices.

Location data of the various devices can be obtained using one or more of: GPS, RTK GNSS, camera(s), Lidar, Sonar, RFID, wireless communication to fiducial markers, and/or on-board beacons. A control unit may be determined through positional sensors. The device can be configured to orient itself to the driver/operator. Laser guidance might be used.

The devices can be configured to operate based on control loop. A controller might receive real-time positional data to determine current location, velocity and acceleration. Positional data can be combined with on-board acceleration, rotation, magnetic heading, encoder and ground sensor information. Factoring the above, wheel speed can be adjusted to continue motion on desired path(s). Sensor feedback can be used to stop, slow, or redirect motion in event of a detected obstacle or person. According to the above, programs/plays can be coordinated: on a single processor; and/or with distributed computing across the devices.

The control loop can be performed on a processor; the processor being on the device itself, in a controller/UI module, or on a separate base station. Devices can receive control signals based on wireless communication to/from the processor, or from communication with other devices.

A user interface can be provided, on a computer, smartphone or tablet, connected to one or multiple devices. The user interface can allow coaches to remotely monitor current and historical status of devices, including but not limited to speed, temperature, battery level, impacts to the unit, percent complete of current route, etc. The user interface can allow an operator to issue a single command for multiple devices, and/or to execute a prescribed set of commands. The user interface can allow operators to create new routes; to use "draw-to-drive" technology, where a route can be drawn on the controller and executed by one or more devices. Software/UI can automatically determine speed and steering controls to execute a path, and waypoints.

The user interface can allow an operator to upload routes from existing data; to select from a set of "canned," pre-existing routes; to send control signals to devices via one or more of wifi, Bluetooth, xbee, RF, cellular data; and to provide data about impact to the device by a projectile, object or person.

Devices can include on-board or external sensors, such as accelerometers, gyroscopes, pressure transducers, and piezoelectric sensors to characterize motion and impacts to the device.

A camera, RFID, magnetic or other wireless communication devices can detect and identify objects, projectiles, or people in the training environment. Devices can react to such stimulus, such as by falling over. As such, devices can act as a goalie, blocking shots, and can detect and evade or pursue players. Response to the stimulus can be altered (i.e., in the case of impact by bullets, a threshold location of impact or number of impacts can trigger a response such as flashing lights, audio cues, falling over, or another physical response).

Data can be streamed and visualized wirelessly to phone, tablet or computer via wireless connection (bluetooth, wifi, cellular data, RF, xbee). Devices could further have on-board internet connection. A data stream can go to a specialized device that gives specific response to aid in coaching based on the sensor data (e.g., a tackle feedback device). Data regarding device use and sensor information can be uploaded (directly or after being recorded) to the internet and accessed remotely.

Devices can further employ learning capability, learning new routes by following players on a field and/or by replicating motion. Routes can be detected with RFID/Magnetic/GPS or other "tokens;" or can be done with cameras. For example, devices can learn new routes directly from player motion with the use of cameras or positional sensors.

Devices can limit operation to geographic zones detected automatically or set by the operator (i.e., defining a field of play). These zones may be determined using: markings on a field; fiducial markers with wireless communication capabilities; wire or antennas that delineate a specific area; by GPS or local positioning coordinates; and/or by lasers.

Other embodiments of the present invention are directed to an omnidirectional sensing target of a stationary or mobile device (robot); and more particularly to a sensing target that can detect and differentiate between projectile (bullet) hits to the head, body, and one or more peripheral regions (e.g., arms, pelvis, legs) of a humanoid-form target, elicit a physical response from the mobile device based upon the sensing data, and provide real time feedback to a user (shooter) via a user-friendly interface.

A tactical target embodiment can be directed to: 1) a sensor having the ability to detect bullets shot through the target from any direction and differentiate between impacts to different zones of the target (e.g., the head, body, and peripheral zones (arms, pelvis, legs)); 2) an integrated electrical control system capable of collecting input data from the target sensor and eliciting a desired physical response from the device; 3) a mechanical actuator which will cause a humanoid target attached to the mobile device (MVP) drive base to pivot to a near-horizontal position in response to defined critical zone hits; 4) a software application which interfaces with the aforementioned electrical control system, displays shot placement to a user in real time, and allows the user to specify the conditions that trigger the target to fall over.

In one or more tactical target embodiments, a three-dimensional (3D) target geometry for omnidirectional sensing of bullets is provided, where:

an embodiment of a shooting target for sensing bullet impact comprises multiple layers of conductive material separated by one or more insulating layers. The embodiment can be formed by the wrapping of a planar sensing panel into a three-dimensional configuration such that the panel occludes a three-dimensional volume and presents surfaces that can sense projectiles incident from all directions;

an embodiment and associated circuitry is configured to have a bullet pass through multiple zones and to electronically detect the bullet path based on a combination and/or sequence of zones detecting bullet passage;

the 3D, omnidirectional configuration above, where a sensor panel is comprised of multi-layered conductors of any material (e.g. metal foil, metal mesh, conductive paint);

the aforementioned sensor panels, laminated in such a way that individual conductors protrude from the sensing zone such that discrete electrical contact may be made with each layer individually;

a method of making an initially planar sensor panel into a 3D configuration by means of scoring and bending, hinging, wrapping around a shaped die; in addition to simple bending; and a method of pre-forming and affixing the three-dimensional target configuration for subsequent embedding in molded polymer that comprises the manufactured target outer shape, texture and appearance.

In one or more further embodiments, the tactical target includes detection and repair of conductive target electrical shorting.

a system and method of detecting a persistent electrical connection (short circuit) between conductive layers of a sensing target panel resulting, for example, from pieces of conductive-layer material being torn and repositioned as a result of bullet impact;

a system and method of automatically applying a voltage across the conductive panels from a power source of sufficient capacity to burn out a fragment causing the unwanted short circuit;

a system and method of detecting the completion of the fragment burn-out and automatically switching off the applied voltage and resetting the circuitry in preparation for a repeated short circuit event; and a system and method of implementing three or four or more layers of conductive material and observing the signal from each temporally such that a closed circuit from a penetrating projectile may be discerned from a spurious or unwanted short circuit (false positive).

Accordingly, tactical target embodiments of the present invention are directed to: 1) a target sensor having the ability to detect bullets shot through the target from any direction and can differentiate between impacts on different zones of the target (e.g., the head, body, and peripheral zones); 2) an integrated electrical control system capable of collecting input data from the target sensor and eliciting a desired physical response from the target device; 3) a mechanical actuator which will cause a humanoid target attached to the mobile device (MVP) drive base to pivot to a near-horizontal position in response to defined critical zone hits; 4) a software application which interfaces with the aforementioned electrical control system, displays shot placement to a user in real time, and allows the user to specify the conditions that trigger the target to fall over.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 32A illustrates devices playing back a route recording; FIG. 32B illustrates devices performing routes without collision; FIG. 32C illustrates a device working alone with a human; and FIG. 32D illustrates multiple, fully autonomous devices working with a human without collision.

FIG. 36A illustrates a conductive layer within a body of the mobile unit; FIG. 36B illustrates a relay for actuation of the mobile unit upon detection by the conductive layer; FIG. 36C illustrates mobile unit fall response to shot detection; and FIG. 36D illustrates mobile unit sensing and response to external stimulus.

FIGS. 37A and 37B illustrate exemplary shot detection sensors; where FIG. 37A illustrates a two conductive layer target sensor embodiment and FIG. 37B illustrates a three conductive layer target sensor embodiment.

FIG. 39A illustrates a mold for casting a central core, or inner die, and FIG. 39B illustrates a mold for casting an outer body of the final humanoid target.

FIGS. 40A-40E illustrate an exemplary production process for manufacturing a humanoid target with target sensors, where sensor panels for the head, body, and peripheral regions are attached to an inner core before casting an outer body; FIG. 40A shows an inner core; FIG. 40B shows head sensor panels; FIG. 40C shows body and peripheral region sensor panels; FIG. 40D shows the sensor panels wrapped about the inner core; and FIG. 40E shows a cast outer body about the sensor panels and inner core.

FIGS. 41A-41C illustrates another exemplary production process for manufacturing a humanoid target with target sensors, where sensor panels for the head, body, and peripheral regions are packed into a mold for casting an outer body thereabout; FIG. 41A shows one-half of an outer body mold with inner, fixed support pins and removable support posts; FIG. 41B shows the other one-half of the outer body mold; and FIG. 41C shows a final cast humanoid target.

DETAILED DESCRIPTION OF THE ILLUSTRATED EMBODIMENTS

Figure 1:
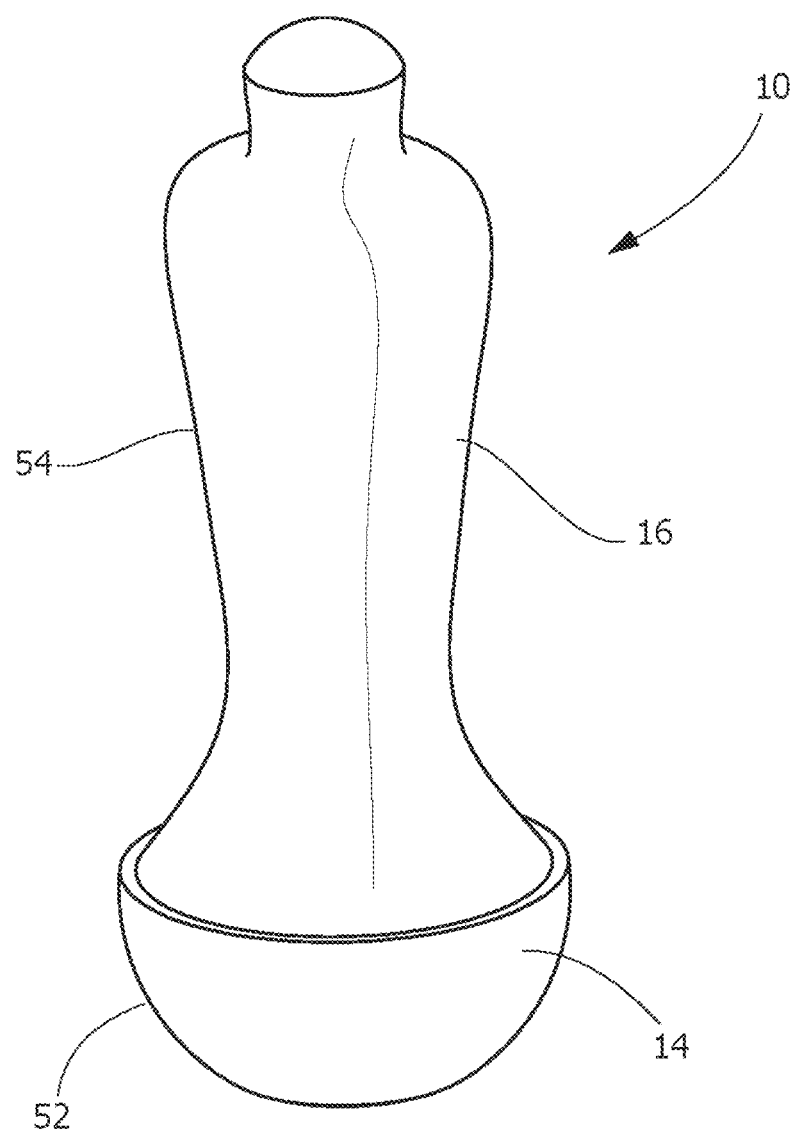
FIG. 1 is a perspective view of an illustrative embodiment of a mobile device which simulates player motion according to the present invention.
Figure 2:
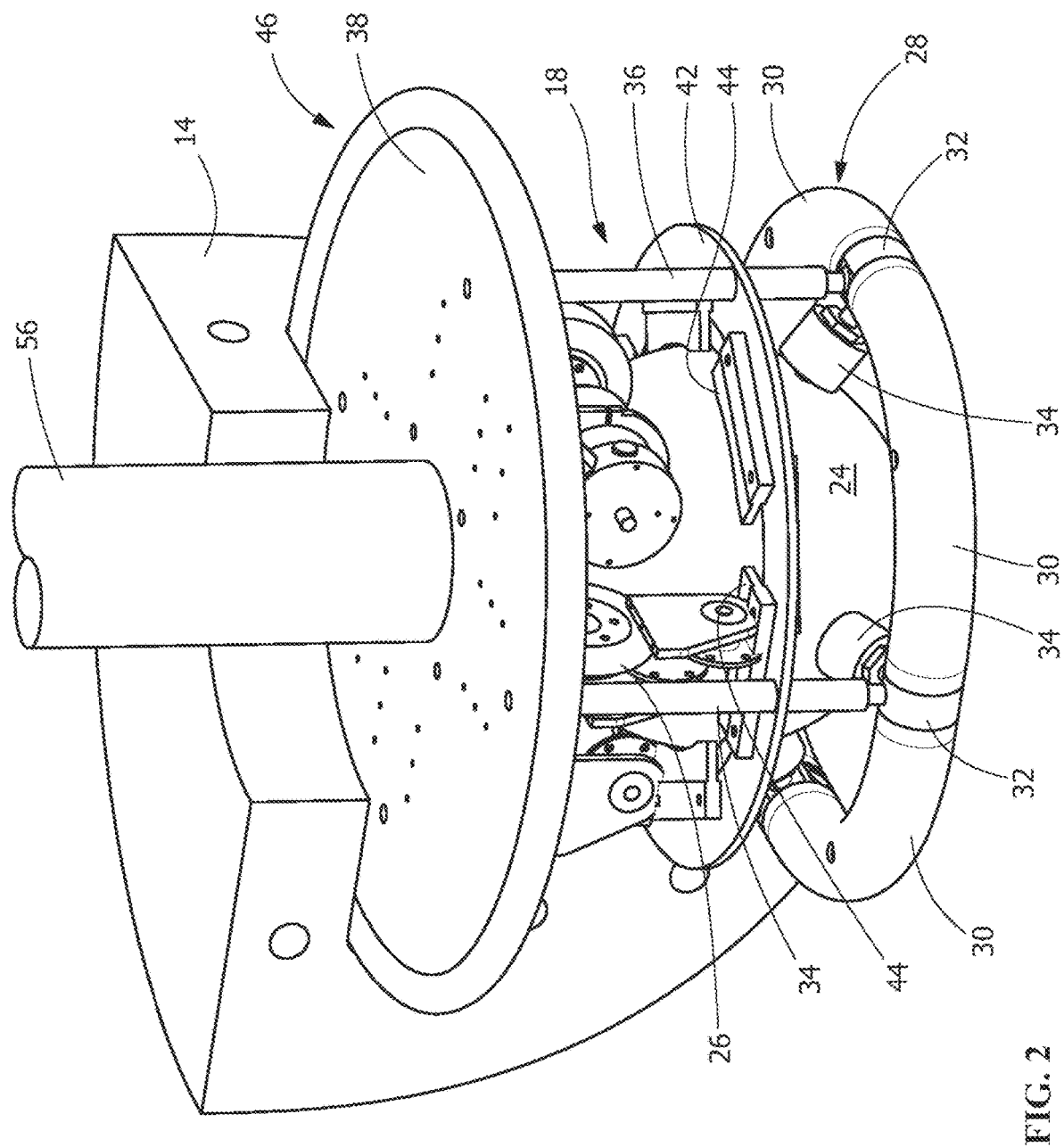
FIG. 2 is a top, side perspective view of a lower portion of the mobile device of FIG. 1 with portions of the padding removed.
Figure 3:
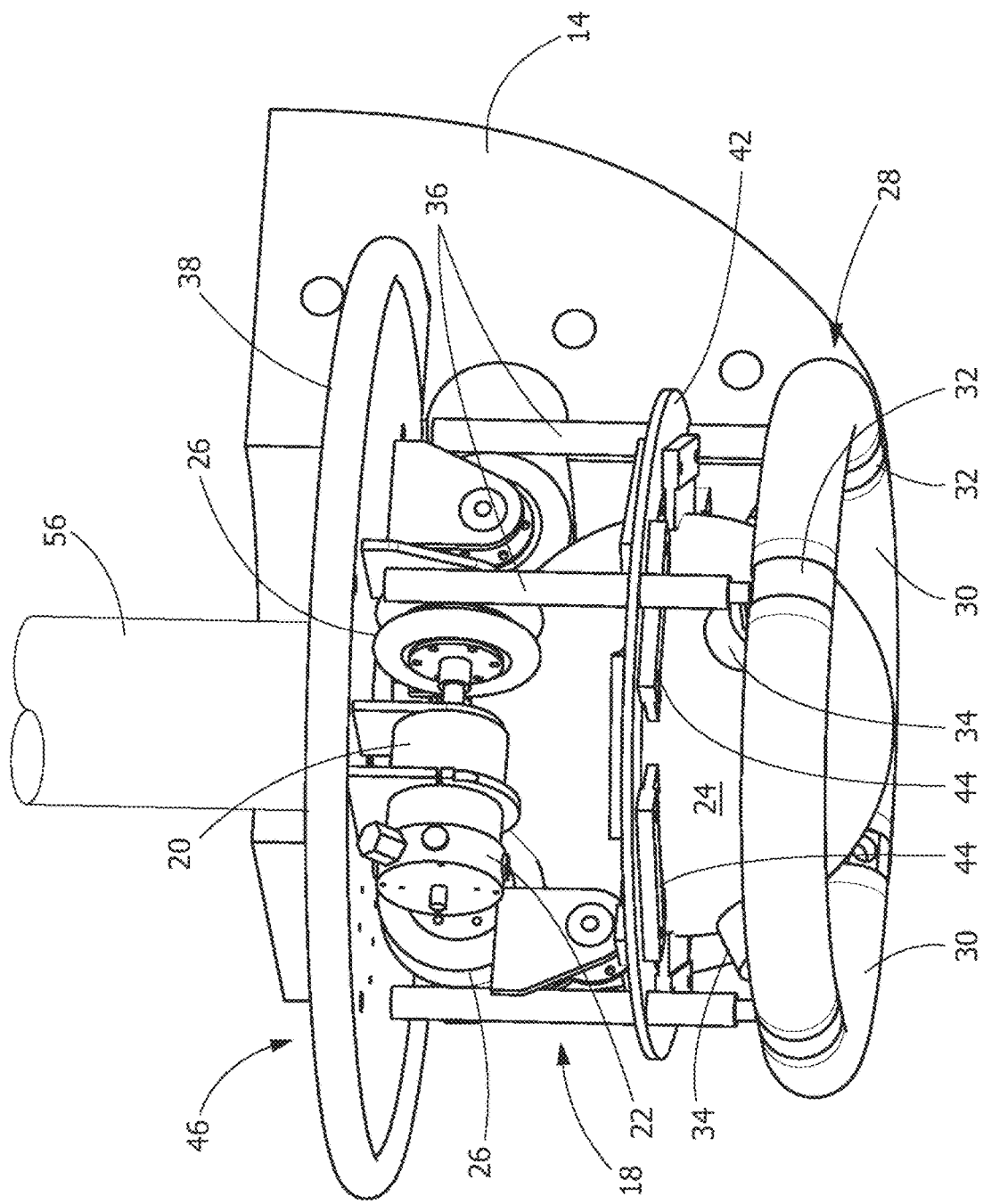
FIG. 3 is a bottom, side perspective view of the lower portion of the mobile device shown in FIG. 2.
Figure 4:
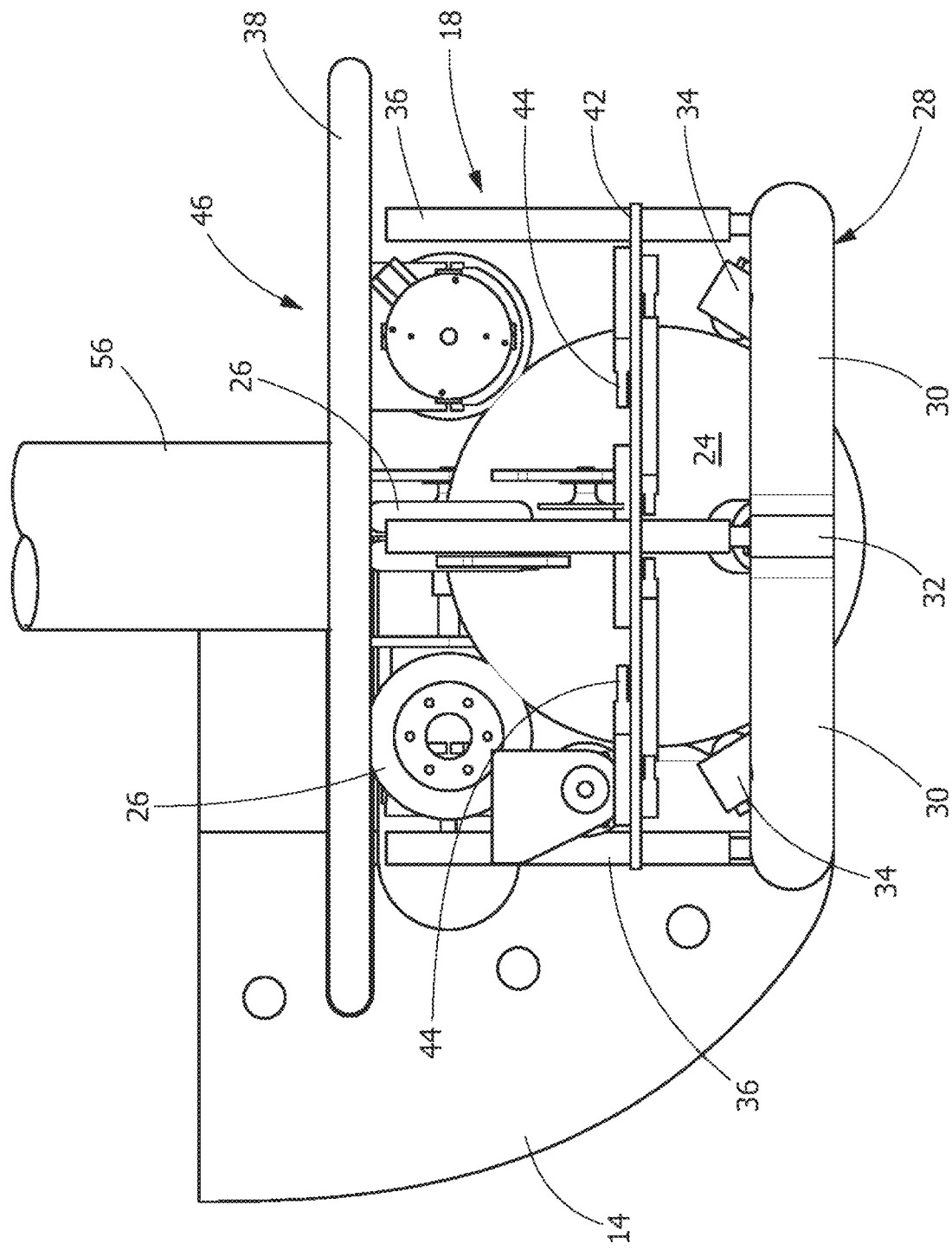
FIG. 4 is side view of the lower portion of the mobile device shown in FIG. 2.
Figure 5:
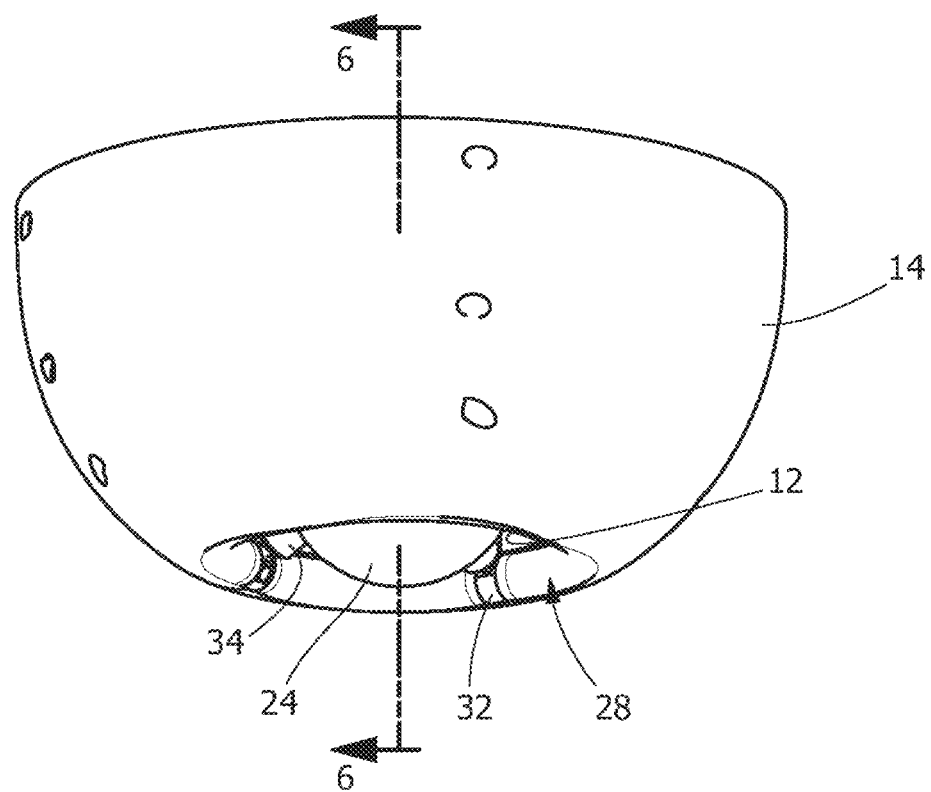
FIG. 5 is a bottom, side perspective view of a lower portion of the mobile device of FIG. 1.
Figure 6:
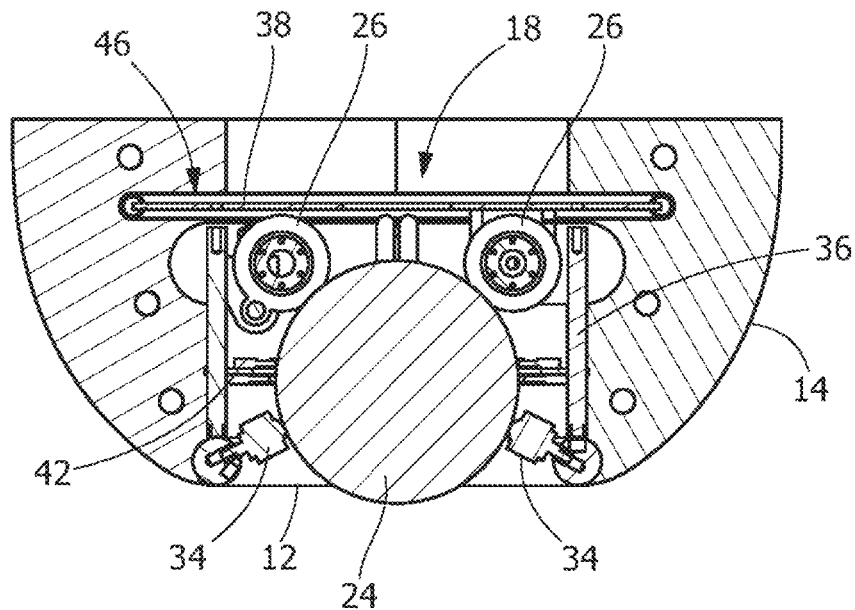
FIG. 6 is a cross section of the lower portion of the mobile device taken along line 6-6 of FIG. 5.
Figure 7:
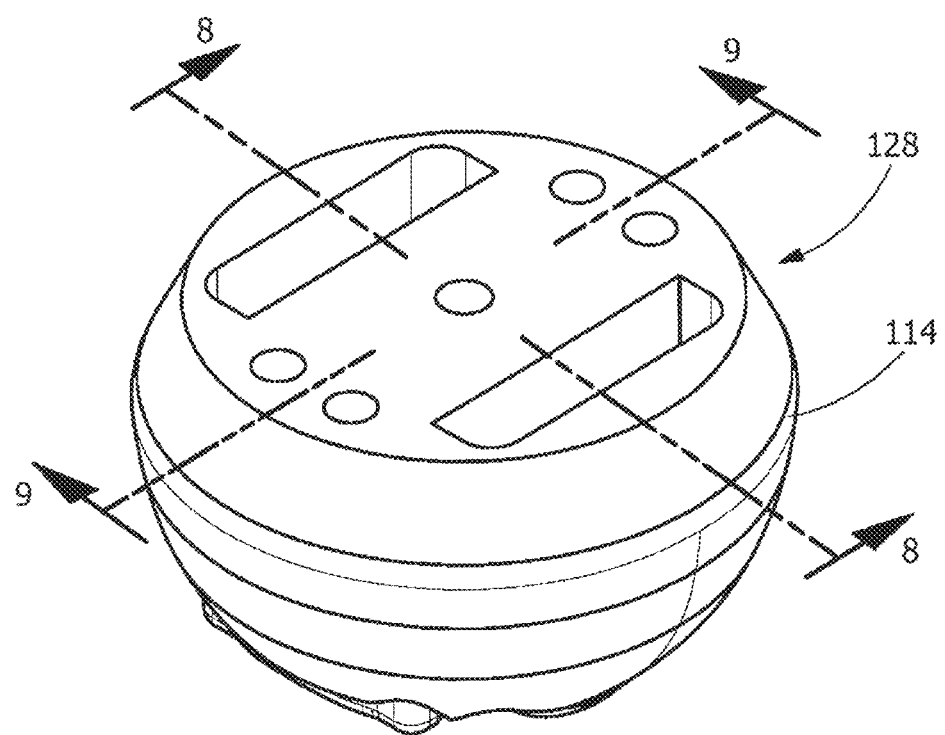
FIG. 7 is a perspective view of an alternate illustrative embodiment, a base of a mobile device which simulates human motion according to the present invention.
Figure 8:
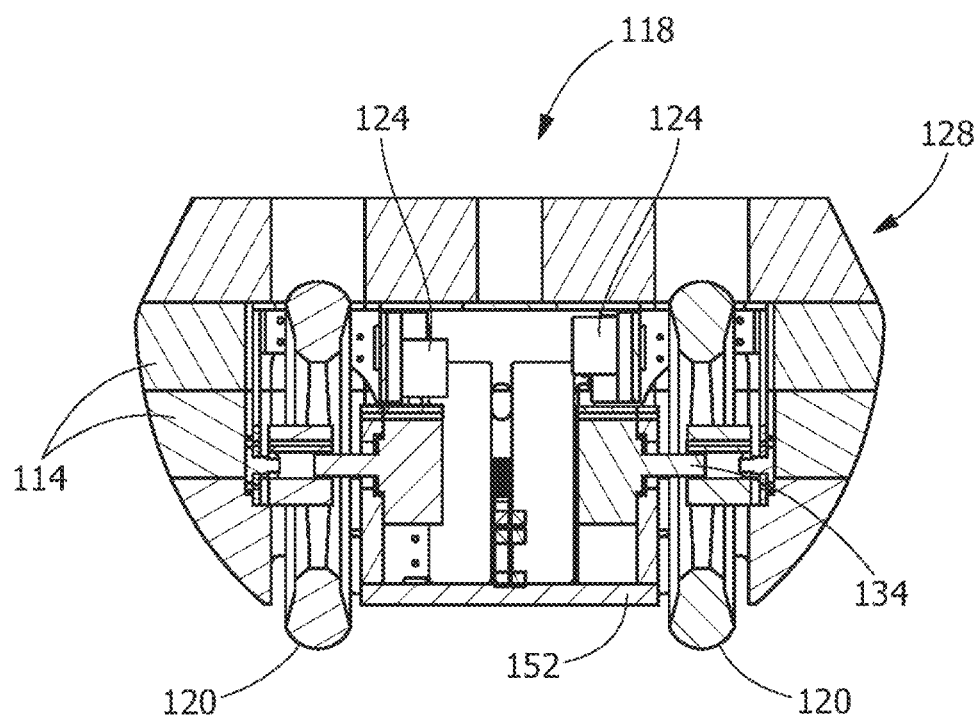
FIG. 8 is a cross section of the base of the mobile device taken along line 8-8 of FIG. 7.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the illustrative embodiments. Accordingly, the invention expressly should not be limited to such illustrative embodiments illustrating some possible non-limiting combination of features that may exist alone or in other combinations of features. In particular, while the detailed description provided herein is directed to applications related to football, the invention is not so limited. The invention can be used for any sport or activity which could benefit from a dynamic mobile device to simulate player or participant's motion.

In general, the invention is directed to a remotely controlled or semi-autonomous mobile device and to a drive system which controls the same. In various illustrative embodiments, the device has no external infrastructure in order to maximize mobility of the device and the safety of the participants. The entire device, with the exception of the bottom opening, may be covered in padding. In some forms the wheels may be the only non-padded portion of the device.

Different types of motion of the device may be used, including, but not limited to, leaning, rolling, sliding and launching. In the illustrative embodiments shown, rolling motion is used because it is the most similar to the motion of a live participant. In FIGS. 1-6, the rolling motion is accomplished by a ball drive system 18 that will be more fully described below. In FIGS. 7-16, the rolling motion is accomplished by a wheel drive system that will be more fully described below. The drive systems accurately mimics the unpredictable motion of a live participant by allowing instant acceleration in any direction. The drive also exhibits a zero turning radius and protects hard edges that could injure a player. The mass, velocity capabilities and acceleration of the illustrated powered devices are engineered to replicate that of the human counterpart being replaced.

Referring initially to the illustrative embodiment shown in FIGS. 1-6, gravity is used to reset the device 10 after the device 10 is tackled to the ground. As the device 10 is self-righting, no additional motors or other devices are required for this function. In order to accomplish this method of reset, the geometry and weight distribution of the pads 14, 16 of the device 10 allows the device 10 to be passively self-righting, allowing for the quick repetitions of drills that are required during practice.

At least one motor 20 is used as the motive force. The at least one motor is easily controllable and can provide ample force. Batteries are used as the power source because they are a portable and safe power source that will work in all weather conditions. The device 10 is controlled using a remote control system, allowing for maximum mobility and precision.

As shown in FIG. 1, the shape of the pad approximates a humanoid form figure in the illustrative embodiment. This gives players a realistic-looking target and reinforces safe tackling form by encouraging tackling at the correct height.

The device 10 is driven by a uni-ball drive system 18, although other drive systems such as, but not limited to, multi-ball drive systems and wheel based systems may be used without departing from the scope of the invention. The uni-ball drive system 18 shown includes a single large ball 24 that is driven by wheels 26. In the embodiment, the wheels 26 are omni-directional wheels. The omni-directional wheels are able to power the ball 24 in any direction, allowing for a complete range of motion and allowing for the device 10 to quickly and elegantly change directions.

In the illustrative embodiment, the wheels 26 have rubber rollers to increase the resistance to slipping between the ball 24 and the rollers 26. Other materials can be used to decrease the slippage of the ball relative to the rollers.

In one embodiment, dual omni-wheels 26 are used to transmit forces tangent to their direction of motion to the ball 24, while not inhibiting motion in all other directions. The omni-directional wheels may be of various sizes depending upon the size of the device and the type of ball drive used. For example, in the illustrative embodiment shown, the omni-wheels 26 may have a four inch diameter.

In the embodiment shown, a ten inch diameter medicine ball 24 with rubber coating is used as the drive ball. The ball is selected to optimize its weight, compressibility and friction coefficient with the turf to allow for optimal performance of the device 10. The ball 24 sits within a two inch outside diameter base-ring 28 made from four 90-degree mandrel bent steel elbows 30. Steel slugs 32 are welded between the elbows 30 with holes drilled and tapped for adjustable spring members 34 to secure the drive ball 24. Four vertical rods 36 connect the base ring 28 to a plate 38, on which the motors 20 and controls system are mounted. The spring members 34 are adjustable. In the embodiment shown, the spring members 34 are ball casters which are spring loaded to apply pressure to the ball 24. Consequently, the ball casters 34 apply pressure to the ball 24 to keep the wheels 26 in contact with the ball 24 at all times despite any eccentricity in the ball's 24 shape.

As an example, drive balls 24 are not spherical, exhibiting variance in the diameter of up to ¾ inches. In such applications, the adjustability of the ball casters 34 is beneficial. Rather than fixing the ball casters 34 against the ball 24, tension springs are included in the ball casters 34 to allow the ball casters 34 to force the ball 24 toward the wheels 26, causing the omni-wheels 26 to remain in contact with the ball 24 at all times despite eccentricity in the ball's 24 shape. Consequently, the ability of the motors 20 to drive the ball 24 in any direction is not affected by the eccentricity of the ball 24.

The ball 24 drive must have adequate traction on the field, particularly in wet conditions. Artificial turf has a higher coefficient of friction than natural grass and does not become as slippery when wet. An illustrative embodiment has a coefficient of friction with the turf of greater than 0.35, greater than 0.5 or greater than 0.7.

In one alternate embodiment, a basketball was chosen for the ball 24 drive. In other embodiments, a soccer ball, tether ball, medicine ball or water polo ball were used. Regardless of the ball 24 used, the weight of the ball 24 must be considered. A ball that is heavy relative to the overall weight of the device 10 causes ball's 24 moment of inertia relative to the device 10 to be large, thereby causing the unwanted effect of having the pads 14, 16 rotate around the ball 24, rather than the ball 24 rotating within the pads 14, 16. In such an embodiment, an inflatable ball 24 acts as a suspension system to maintain constant pressure on all contact points with the wheels 26.

In another alternate embodiment, a non-inflatable ball 24 is used. Such a ball greatly reduces the risks associated with irregularities in ball shape and allows for a more rigid and robust drive system. Such balls may include, but are not limited to, rubber-coated nylon and HDPE balls.

In the illustrative embodiment shown, four omni-directional wheels 26 are provided to control the ball 24. However, other numbers, sizes, positions and types of wheels may be provided without departing from the scope of the invention. The wheels 26 are configured such that the friction of omni-wheels 26 on the ball 24 is sufficient to transmit power from the motors 20 to the drive ball 24. The four opposing omni-wheels 26 are made from aluminum with a rubber coating. In one illustrative embodiments, at least two of the omni-wheels are powered by 3 HP brushed DC motors 20 and bearings on either side to prevent side-loading on the motors 20 during the impact of a tackle. The other two omni-directional wheels are free floating. A ring 42 holding brushes 44 against the equator of the ball 24 is attached to the vertical rods 36. The brushes 44 engage the ball 24 to remove debris and loose turf blades, thereby preventing the debris and turf blades from interfering with the motors 20 and wheels 26. A rubberized coating is applied to the upper plate 38 of frame 46 to eliminate all edges which may pose injury risks.

As mentioned previously, a 3 hp motor 20 is used in the embodiment shown. One such motor is the AmpFlow A28-150. The motor may be used with a radio transmitter and receiver. The transmitters and receivers are able to wirelessly control one motor or two or more motors independently. Another motor which can be used in the AmpFlow A28-400 motor. When used with a single 12V battery, instant acceleration in all directions is achieved with a high degree of control. When used with a 24V battery, a maximum speed of 4 m/s was achieved. Regardless of the motor used, the motor 20 must be sized to fit within the frame 46.

The speed and acceleration of the device is dependent upon many factors, including the size of the device, the type of ball drive, the size of the motor, etc. In the embodiment shown, the device is designed to operate at a speed of at least 3 m/s and an acceleration of at least 3 m/s$^2$, with preferred speeds of 5 m/s or greater and preferred accelerations of 7 m/s$^2$. However, in other embodiments the speeds and accelerations may vary. The device is also designed to have less than a 10% loss of speed in all playable weather conditions.

The batteries and battery system for the device 10 must be of the type which are non-spillable and which are designed to be depleted and recharged many times. One such illustrative battery is a lead-acid absorbed glass mat (AGM) battery. Such batteries are deep cycle batteries which are designed to be completely drained and then recharged. These types of batteries are non-spillable and can be used in any orientation because the electrolyte is held in glass fiber mats instead of floating freely. In one embodiment, a single 24-volt deep cycle battery can be used. Alternatively, other sizes of batteries can be used, such as, but not limited to, two 12-volt batteries connected in series. An example of such a battery is the MC-545 battery which weighs approximately 10 lbs and has a capacity of 14 Ah. In one embodiment, full throttle for the device runs at approximately 50 amps, whereby two MC-545 batteries have the capacity to run at full throttle for around 17 minutes. Given that the device 10 will be going at full speed only a fraction of the time, this will provide sufficient capacity for the device 10 to last for a typical twenty (20) minute tackling practice session.

The control system includes a transmitter, antenna, receiver, battery(ies), speed controllers and motor(s) 20. In various embodiments, the type of motor 20 chosen dictates what type of control system could be used. In one illustrative embodiment, a radio frequency controller is used. In one illustrative embodiment, an AmpFlow Dual Motor Speed Controller is used. Such a controller can run at 24 volts and provide a 5 volt power output designed for wireless receivers. In one illustrative embodiment, a Planetary Rover Radio Control, which includes a pre-paired transmitter and receiver, can be connected directly into the speed controller. Once connected, the speed controller can be programmed for channel mixing, meaning that both motors are controlled via a single joystick or other known devices, such as, but not limited to, a pistol grip, two sticks, triggers. The single joystick allows the user to drive the device 10 in any direction using an intuitive control system. The control system is designed to allow for a minimum travel distance of greater than 25 meters, with a preferred distance of greater than 100 meters, allowing the coach to operate the device 10 from anywhere on the field.

As best shown in FIG. 1, the illustrative device 10 has high density foam 14 around the base 52 of the device 10 and lower density foam 16 for the upper portion 54 of the dummy or device 10. Foams may be open-cell foams or closed-cell foams. Open-cell foams have gas pockets which are connected to one another, creating a lower density. In contrast, closed-cell foams have isolated gas pockets for a more rigid high-density shape. The high density, closed cell foam 14 around the base 52 is used to cushion against the frame 46 and provide protection for the electronics. The high density, closed cell foam 14 also provides structure for the self-righting nature of the dummy or device 10. The low density, open-cell foam 16 for the upper portion 54 is used where the primary impact area will be.

One such representative high density foam 14 is sold under the brand of Minicell. In one embodiment, the high density foam 14 is provided in a bowl shape to encase the frame 46 and allow the device or dummy 10 to be self-righting. In one embodiment, the bowl shaped foam was constructed in two hemispheres that are connected around the frame or cage 46 via two straps. This modular design provides easy access to the electronics and drive system for maintenance, as the two halves can be swiftly disconnected and removed.

The upper portion 54 of the device 10 has a humanoid formed pad 16, although other configurations can be used without departing from the scope of the invention. The upper portion 54 is configured to encourage safe tackling at the correct contact height by reflecting the proportions of an average player in an exaggerated manner. This foam 16 must be significantly softer on impact than the base foam 14, yet rigid enough to hold its shape. While different types of foam 16 can be used, in one embodiment, a castable urethane foam is used. One such foam is the 3 lb/ft$^3$ FlexFoam-iT III foam. The shape of the upper portion can be cast in one piece or in two identical halves which are fused together. Based on player safety and other testing, the high density foam 14 has a density between 4 lb/ft$^3$ and 6 lb/ft$^3$ and the low density foam 16 has a density between 2 lb/ft$^3$ and 4 lb/ft$^3$, although other densities of the high density foam and the low density foam may be used.

In the embodiment shown, a structural element 56 is provided for supporting the upper portion of foam 16. The structural element 56 also provides a robust connection between the frame 46, the upper portion 54 and the lower portion 52. The structural element 56 is a rigid but slightly flexible cylinder or post made from high density polyurethane. However, in other embodiments, other materials such as a steel beam or pipe may be used for the structural element 56. This material is highly durable, able to sustain a high force impact and is designed to restore itself to vertical after bending. The structural element 56 is bolted to the frame 46 of the device or dummy 10 and the two halves of the upper portion 54 are affixed thereto by glue or other known fasteners. However, other known methods of fastening the structural element 56 to the frame 46 and the upper portion 54 can be used without departing from the scope of the invention.

The foam 14, 16 may be painted and/or the foam may be coated in shrink film or other durable coating to provide a durable, uniform and aesthetically pleasing finish. In one illustrative embodiment, the coating may be a self-skinning polyurethane such that the outer skin protects and increases durability of softer inner foam and allows for more secure attachment of components. In another illustrative embodiment, the softer upper foam may be covered by a weather proof vinyl.

The device 10 is configured to be sufficiently tall and heavy enough to provide a realistic visual target and realistic tackling resistance for players. In one embodiment, the device 10 has a weight of approximately 188 lbs and a height of approximately 63 inches.

In order for football practices to run efficiently, the device or dummy 10 must be able to be reset quickly between repetitions of a drill. This time was quantified as 4 seconds, based upon calculations from observing football practice. As previously described, the device 10 is constructed to have a weight distribution such that it is passively self-righting. Therefore, depending upon the weight of the components and foam 14, 16 used, additional weight may be added to the bottom portion to ensure that the device 10 is self-righted in 2 second, 3 seconds, 4 seconds or less than 5 seconds. In order to mitigate improper stabilization resulting in wobble when driving, weights may be added to the frame 46, which will stabilize the device or dummy 10 and assist in self-righting. The weights may be any component or contained material which adds weight, such as, but not limited to, sand and water. Widening the contact area with the field will also increase the device's 10 stability. Wobbling could also be mitigated by designing a suspension system that produces a restorative force for the device or dummy 10.

Referring to the illustrative embodiment shown in FIGS. 7-16, the device 110 is driven by a diwheel drive system 118, although other drive systems such as, but not limited to, ball drive, multi-ball drive, wheel based or track based systems may be used without departing from the scope of the invention.

Figure 9:
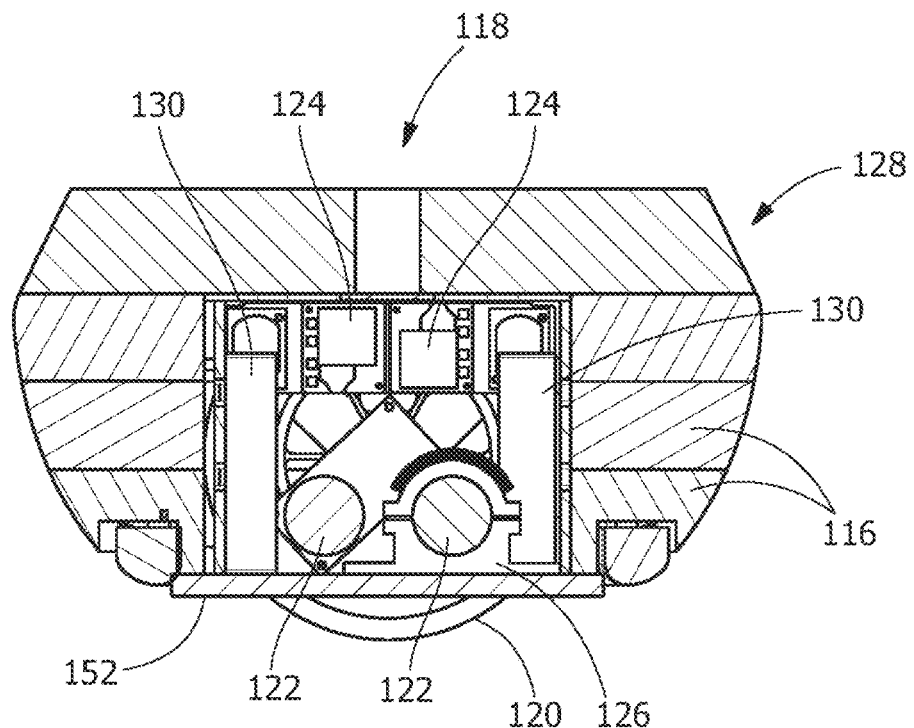
FIG. 9 is a cross section of the base of the mobile device taken along line 9-9 of FIG. 7.
Figure 10:
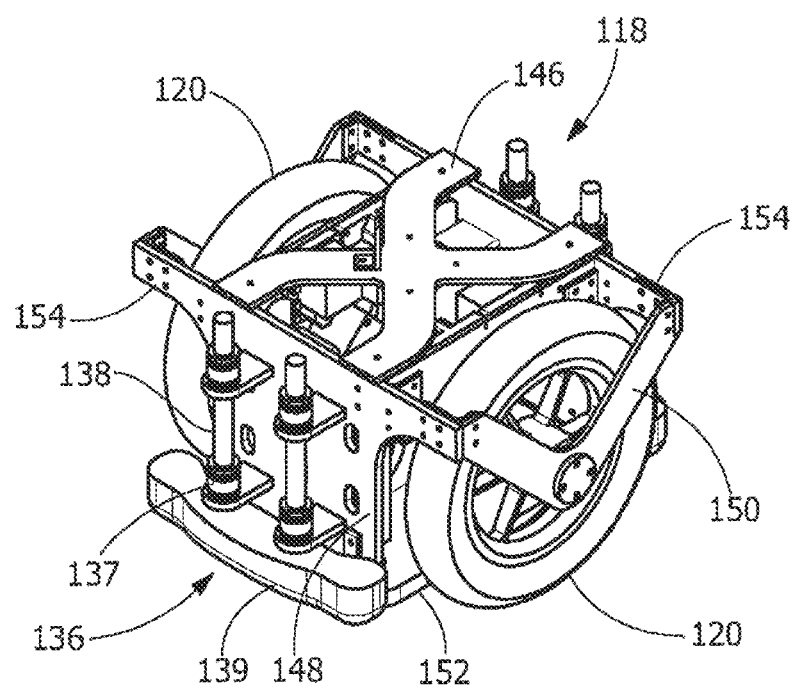
FIG. 10 is a perspective view of the base of FIG. 7 with a cover removed.
Figure 12:
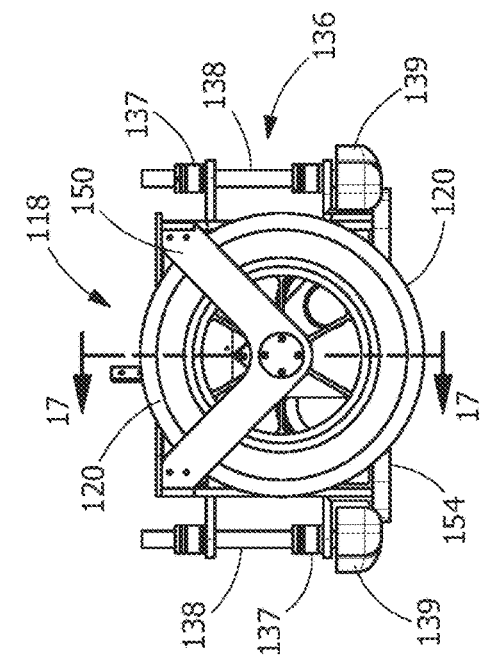
FIG. 12 is a side view of the base with the cover removed, as shown in FIG. 10.
Figure 16:
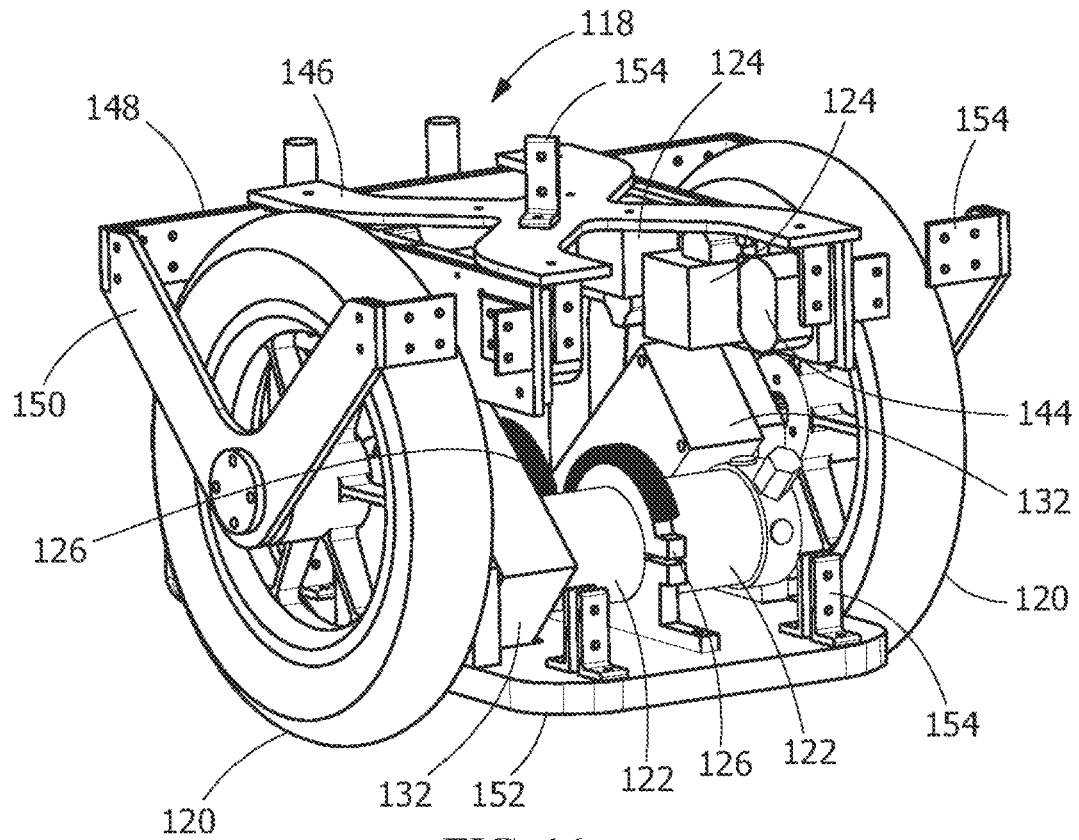
FIG. 16 is a perspective view of the base with a cover removed, as shown in FIG. 10, with various components removed to better view the drive mechanism.
Figure 17:
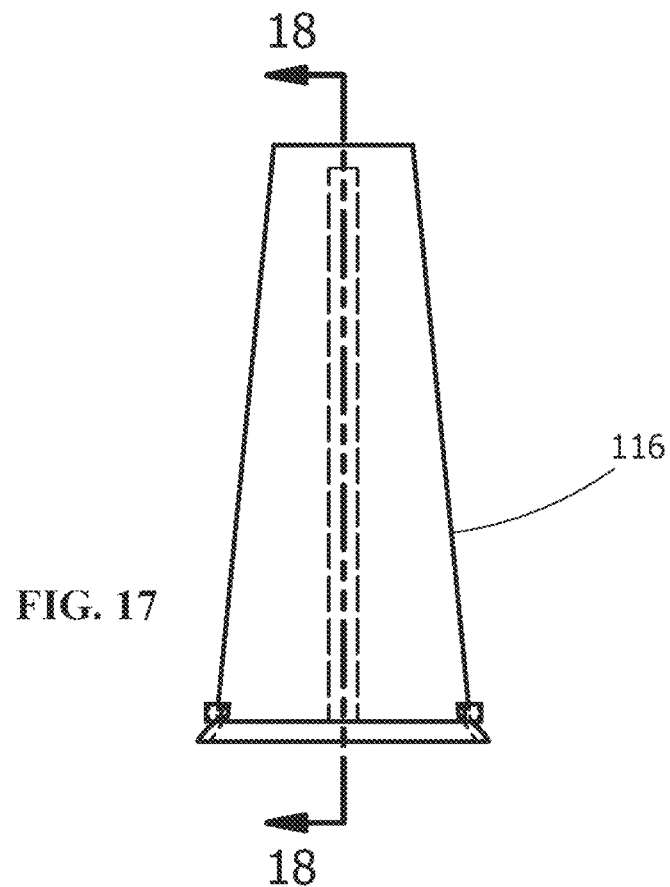
FIG. 17 is a front view of an illustrative embodiment of an upper portion of the mobile device according to the present invention, the upper portion is positioned on the base when in use.
Figure 18:
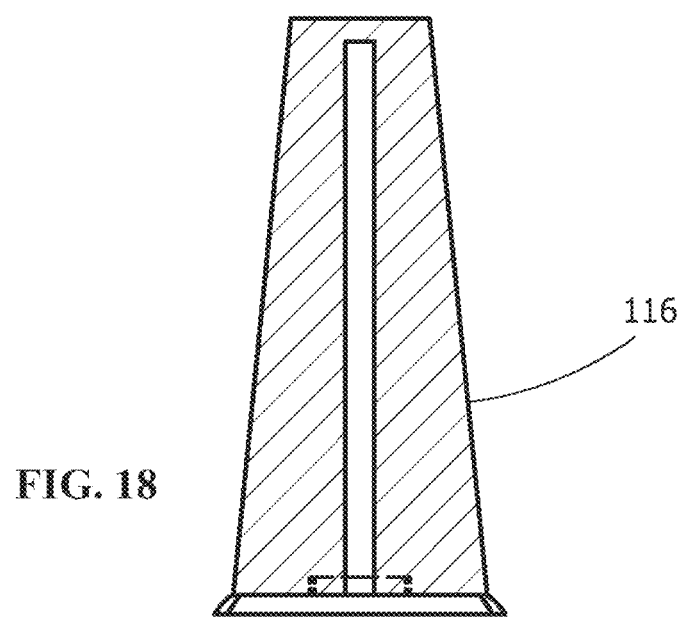
FIG. 18 is a cross view of upper portion of the mobile device taken along line 18-18 of FIG. 17.

As best shown in FIGS. 9 and 16, the diwheel drive system 118 includes two parallel fixed axle wheels 120 where each wheel 120 in the diwheel design is powered by an independent motor 122 and electronic speed controller 124, allowing for independent rotational velocity control to facilitate turning including rotation in place without translation. The wheels 120 are driven by the motors 122 using gearboxes 132 attached to the drive shaft 134, as is known in the art. The diwheel drive system 118 allows rapid drill pace, with the motor 122, gearbox 132, wheel 120 combination allowing proper torque and wheel speed reduction to meet human speed and agility quantifications. This allows rapid and easy replication of any drill being performed. The symmetric design allows the dummy to also be used identically in both forward and reverse to facilitate ease of operation and simulate realistic motion.

The motors 122 are easily controllable and can provide ample force. Batteries 130 are used as the power source because they are portable and are a safe power source that will work in all weather conditions. Circuit breakers or fuse switches 144 are provided for additional safety. In the preferred embodiment, the device 110 is controlled using a remote control system, allowing for maximum mobility and precision.

The drive system 118 is properly sealed/encased to protect against variations in weather and infiltration from debris at location of use. The drive system 118 is properly ventilated, through the wheel wheels or other paths and incorporates exposed heat sinks 126 to reduce temperature increase during use. Temperature is also monitored by sensors or other mechanisms to ensure safe operational function. Thermistors and on board sensors measure motor temperature and limit function to maintain safe operating temperatures. Should the temperature exceed design limits, operation can be temporarily suspended.

In various embodiments, the diameter of the wheel 120 is as large as possible while still fitting in padded drive system base 128 (FIGS. 7-9) to allow traction on all playing surfaces and to match the round shape of the modular bottom or base thereby not inhibiting its self-righting nature. The larger wheel diameter also provides a larger contact surface with the playing surface, thereby decreasing field degradation as well In any of the exemplary embodiments, the wheels may be made of rubber or other material which provides the required coefficient of friction with the surface on which the device is to be used. In addition, the wheels may be textured or may include studs to increase the coefficient of friction.

In all of the embodiments, the wheels may be of various sizes depending upon the size of the device and the type of drive used. The drive system must have adequate traction on the field, particularly in wet conditions. Artificial turf has a higher coefficient of friction than natural grass and does not become as slippery when wet. An illustrative embodiment has a coefficient of friction with the turf of greater than 0.35, greater than 0.5 or greater than 0.7.

The base 112 of device 110 includes supports and structural elements to provide the required rigidity to protect the components housed in the base 112. The supports include top supports 146, side supports 148, wheel supports 150 and bottom supports 152. Mounting members or brackets 154 are provided at various locations on the supports. The mounting brackets 154 are used to secure the base pads 114 to the base 112.

In the illustrative embodiment, the base 112 is elliptical to provide stability in the direction of motion but still self-righting over specific aspects of the form and designed to passively return to those aspects.

Figure 20:
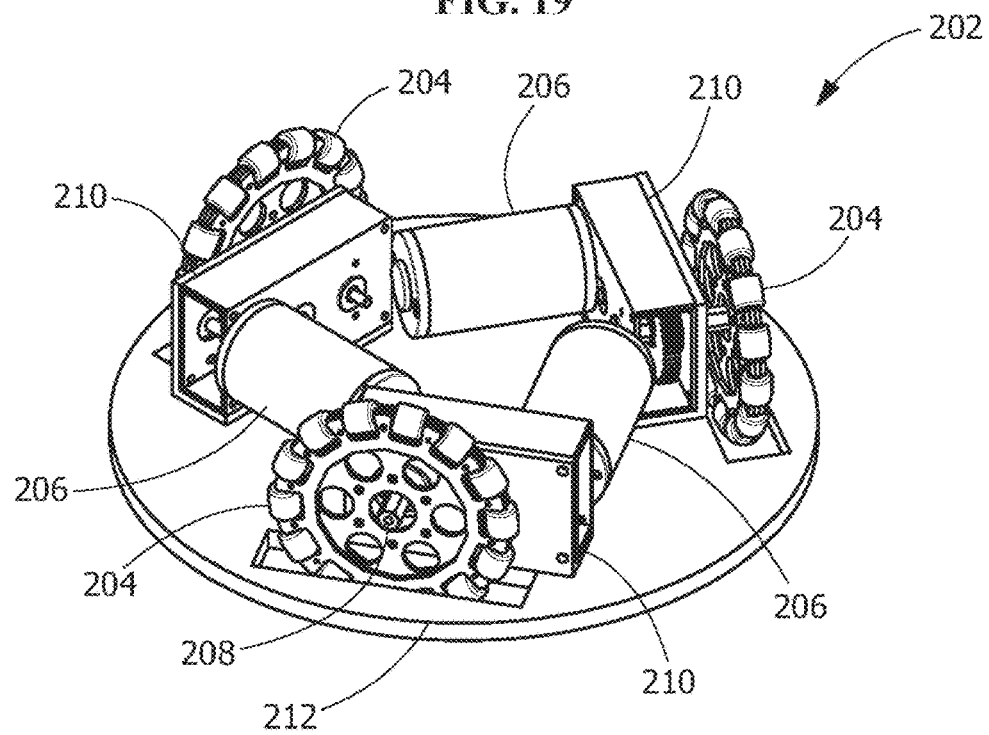
FIG. 20 is a perspective view of a third alternate illustrative embodiment, a base of a mobile device which simulates human motion according to the present invention.

In another illustrative embodiment, as shown in FIG. 20, the drive system is an omni-wheel drive system 202. This drive system 202 uses multiple omni-wheels 204, with the omni-wheels 204 contacting the ground directly and providing the motive force. In the embodiment shown, three wheels, oriented 120 degrees apart from each other are shown. However, other embodiments, such as, but not limited to, four wheels oriented 90 degrees from each other may be used. Each wheel 204 is able to be driven independently, with the result that the device 110 can be driven in any direction regardless of rotational alignment. An objective of drive system 202 is to enable direct and nearly instantaneous lateral movement without the need for rotational re-alignment of the device 110 relative to the ground (quick lateral cuts). In the embodiment shown, each wheel 204 is powered by a motor 206 connected to a drive shaft 208 through a gear box 210. The wheels 204 extend through openings in a mounting plate 212.

Figure 21:
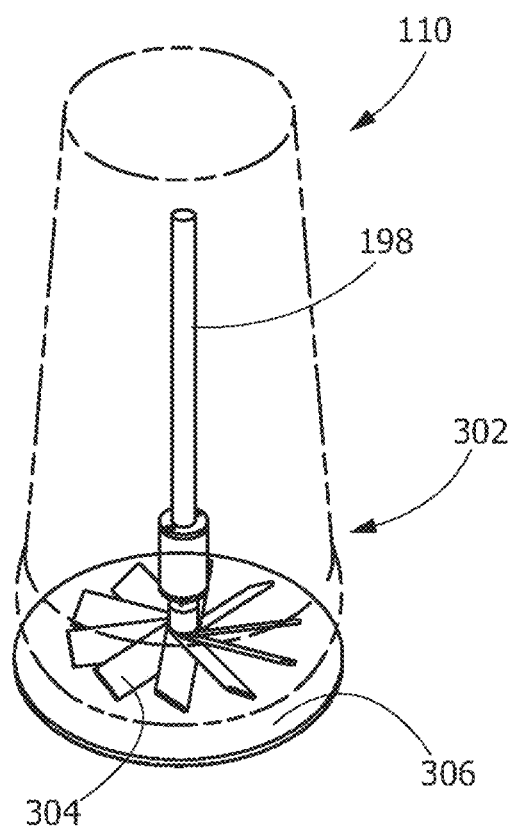
FIG. 21 is a perspective view of a fourth alternate illustrative embodiment, a base of a mobile device which simulates human motion according to the present invention.

In another illustrative embodiment, as shown in FIG. 21, the drive system is a hover system 302 which utilizes blowers/fans 304 to produce a substantial volume of air slightly above atmospheric pressure to create lift below the device 110. A flexible skirt or curtain 306 encloses the produced air to create the lift and drive. The air contained within the curtain 306 may be circulated through slots/perforations (not shown) to provide stability.

Figure 22:
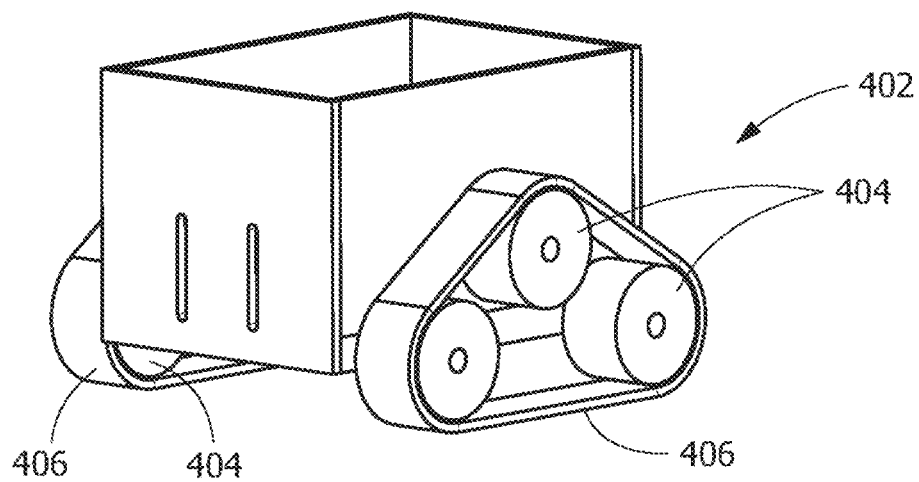
FIG. 22 is a perspective view of a fourth alternate illustrative embodiment, a base of a mobile device which simulates human motion according to the present invention.

In another illustrative embodiment, as shown in FIG. 22, the drive system is a tank drive system 402 with sprockets 404 and treads 406 which contact the ground. Each tread 406 is able to be driven independently, with the result that the device 110 can be driven in any direction regardless of rotational alignment. In the embodiment shown, at least one sprocket 404 of each tread 406 is powered by a motor (not shown) connected to a drive shaft (not shown) through a gear box (not shown).

Other types of drive systems can be used without departing from the scope of the invention. Such systems include, but are not limited to, mecanum wheel drive systems.

Self-righting components, such as weight, may be added to and removed from the device 110 to influence performance characteristics by adapting both the overall weight and adjusting the center of gravity. In one actualization, dynamic weight is added providing a dynamic center of gravity to improve performance in turning maneuvers and to adjust the center of gravity prior to and after the device 110 has been tackled. The weight may be changed by adding or removing discrete weights. In addition, other methods may be used to alter the weight of the device 110, such as, but not limited to, changing the shape and/or material used for various components.

In an illustrative embodiment, gravity is used to reset the device 110 after the device 110 has fallen to the ground. As the device 110 is self-righting, no additional motors or other devices are required for this function. In order to accomplish this method of reset, the geometry and weight distribution of the pads 115, 117 of the device 110 allows the device 110 to be passively self-righting, allowing for the quick repetitions of drills that are required during use.

In order to run efficiently, the device must be able to be reset quickly between repetitions of a drill. For football, this time was quantified as 4 seconds, based upon calculations from observing football practice. As previously described, the device is constructed to have a weight distribution such that it is passively self-righting. Therefore, depending upon the weight of the components and foam used, additional weight may be added to the bottom portion to ensure that the device is self-righted in 2 second, 3 seconds, 4 seconds or less than 5 seconds. In order to mitigate improper stabilization resulting in wobble when driving, weights may be added to the frame, which will stabilize the device and assist in self-righting. Widening the contact area with the field will also increase the device's stability. Wobbling can also be mitigated by designing a suspension system that produces a restorative force for the device, as previously described.

In alternative illustrative embodiments, self-righting may also be achieved by other self-righting components, including, but not limited to, dynamic center of gravity with a mobile mass inside the device or with a flywheel 156 (FIG. 19) to add restorative force. The same means may be used to temporarily disable self-righting capabilities when useful for training purposes. Additionally, the flywheel 156 can be used to increase performance during regular driving or drills.

In alternative illustrative embodiments, self-righting may also be achieved by the incorporation of a weighted rotating element, such as a disc or wheel, to provide angular momentum that resists tipping (gyroscopic effect). Said rotating element could be powered by electric motors and batteries, and it could be placed as far below the center of gravity as possible (i.e. near the base of the drive system) to further add to righting moment.

In alternative illustrative embodiments, balancing may also be achieved by gyroscopes and accelerometers that feedback into wheel position.

Self-stabilizing components, such as weight, may be added to and removed from the device 110 to influence performance characteristics by adapting both the overall weight and adjusting the center of gravity. In one actualization, dynamic weight is added providing a dynamic center of gravity to improve stability and performance in turning maneuvers and to adjust the center of gravity prior to and after the device 110 has been tackled. The weight may be changed by adding or removing discrete weights. In addition, other methods may be used to alter the weight of the device 110, such as, but not limited to, changing the shape and/or material used for various components.

In an illustrative embodiment, gravity is used to facilitate stabilization of the device 110. In various embodiments, the geometry and weight distribution of the pads 114, 116 and other components of the device 110 are sufficient to provide the required stability, thereby allowing the device to passively self-stabilizing with no additional motors or other devices required.

Depending upon the weight of the components and foam used, additional weight may be added to the bottom portion to ensure that the device is self-stabilizing. In various embodiment, in order to mitigate improper stabilization resulting in wobble when driving, weights may be added to the frame, which will assist in stabilization. Widening the contact area with the field will also increase the device's stability. Wobbling can also be mitigated by designing a suspension system that produces a restorative force for the device, as previously described.

In alternative illustrative embodiments, self-stabilization may also be achieved by other self-righting components, including, but not limited to, dynamic center of gravity with a mobile mass inside the device or with a flywheel 156 (FIG. 19) to add restorative force. Additionally, the flywheel 156 can be used to increase performance during regular driving or drills.

In alternative illustrative embodiments, self-stabilization may also be achieved by the incorporation of a weighted rotating element, such as a disc or wheel, to provide angular momentum that resists tipping (gyroscopic effect). Said rotating element could be powered by electric motors and batteries, and it could be placed as far below the center of gravity as possible (i.e. near the base of the drive system) to further add to the stabilization of the device.

In alternative illustrative embodiments, stabilization may also be achieved by gyroscopes and accelerometers that feedback into wheel position.

Figure 14:
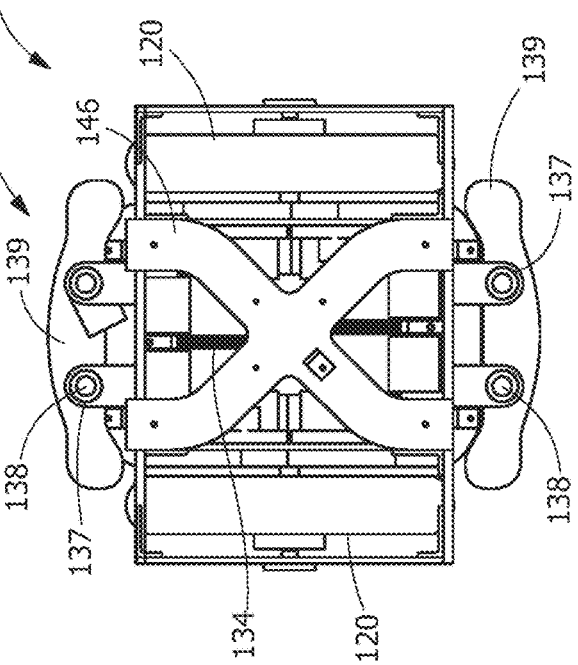
FIG. 14 is a top view of the base with the cover removed, as shown in FIG. 10.
Figure 11:
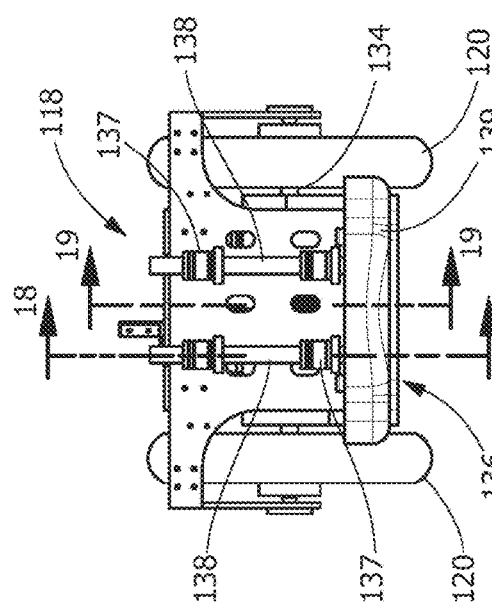
FIG. 11 is a front view of the base with the cover removed, as shown in FIG. 10.
Figure 13:
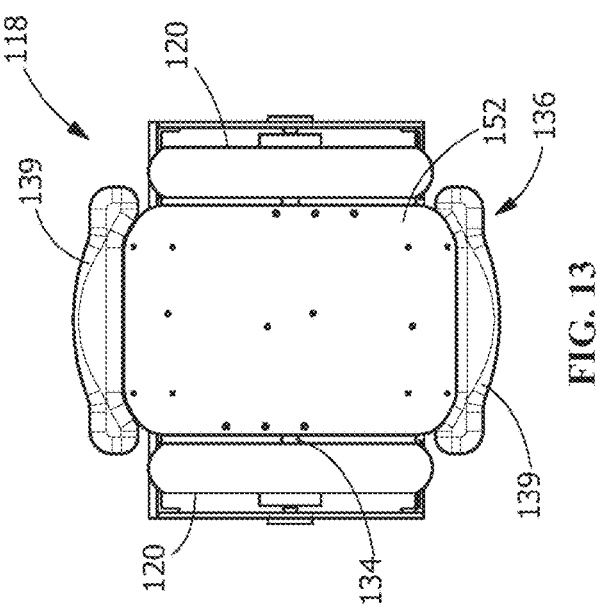
FIG. 13 is a bottom view of the base with the cover removed, as shown in FIG. 10.
Figure 15:
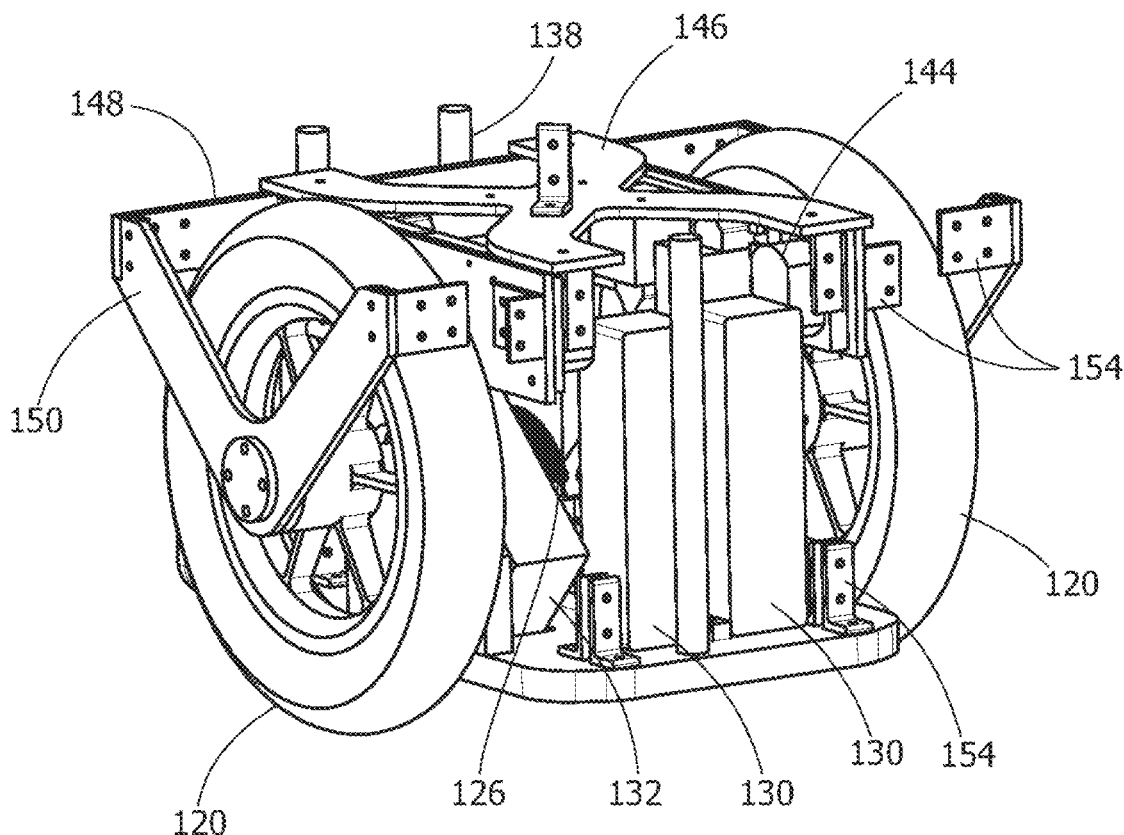
FIG. 15 is a perspective view of the base with a cover removed, as shown in FIG. 10, with a front plate removed.
Figure 19:
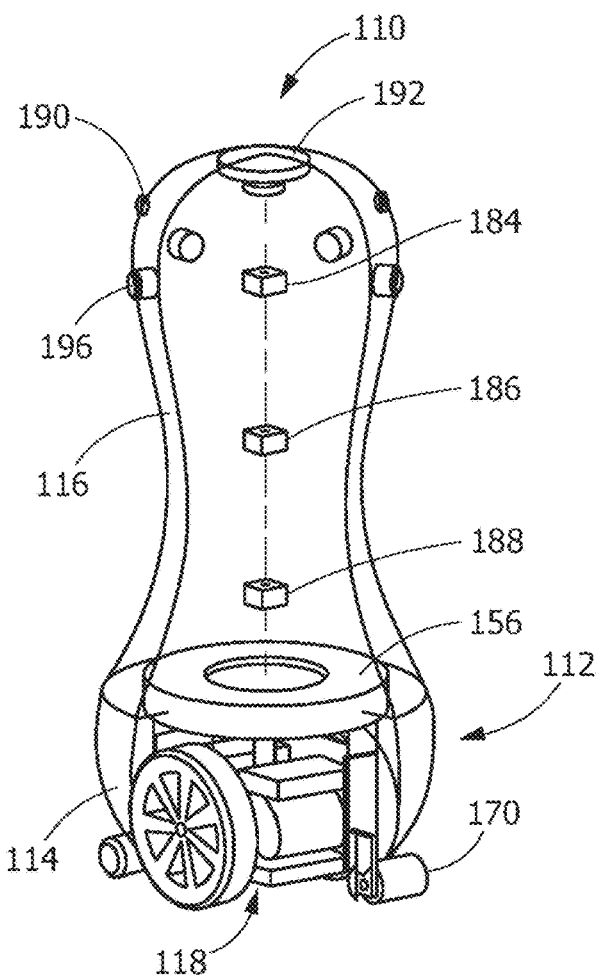
FIG. 19 is a perspective view of a second alternate illustrative embodiment, a mobile device which simulates human motion according to the present invention.

In the illustrative embodiment shown in FIGS. 14-16, the shape of the top or upper portion 116 or pads is conical. However, other shapes may be used, including, but not limited to, a humanoid form figure (as illustrated in FIG. 19) or a realistic-looking target. The shape of the pads can provide realistic-looking targets and can reinforce safe procedures.

The upper portion 116 of the device 110 is removable/exchangeable, allowing for easy replacement of the upper portion 116 if needed. This allows the upper portion 116 to be customized to enhance its effectiveness in various scenarios. The quick release and change feature allows for alternative functions, such as, but not limited to, quarterback, receiver, running back etc., of the device 110 to be implemented quickly. This also allows for exchange of colors and design which is useful for representing different players or teams. The removable/exchangeable aspect of the upper portion 116 also provides access to the drive system 118 and electronics in the hull, bottom or base portion of the device 110. While the upper portion 116 of the device 110 is removable/exchangeable, the upper portion 116 is secured to the base 112 during operation, thereby preventing the unwanted or inadvertent removal or separation of the upper portion 116 from the base 112. The upper portions 116 may be secured to the base 112 through mounting components 154, such as, but not limited to brackets, zippers, buckles, or fasteners. In various illustrative embodiments, the pads and drive system are always connected and are never separate during normal operation.

In the illustrative embodiment shown, the drive system 118 is provided where the wheels 120 are mounted without suspension. A suspension component or system 136 is added both in front and behind the axis of rotation of said wheels 120 to resist axial rotation of the body of device 110 around said axis during rapid acceleration and deceleration. This component 136 restores the device 110 to a completely vertical position while dampening oscillation and maintaining maximum normal force on said wheels 120 from the ground to maintain traction. Suspension is a beneficial component of an agile and mobile device 110. Suspension is beneficial for both forward and reverse as well as cornering. As best shown in FIGS. 11-14, one embodiment of the suspension system 136 includes one or more vertical shafts 138 mounted to the base 112. Compression springs 137 are provided on the vertical shafts 138 to maintain the proper positioning of the shafts 138 relative to the base 112. Casters or sliders 139 are provided at the bottom of the shafts 138. The casters or sliders 139 make contact with the ground when the device 110 is tilted or turned to provide the necessary stability and facilitate the self-righting aspect of the device 110.

Figure 23:
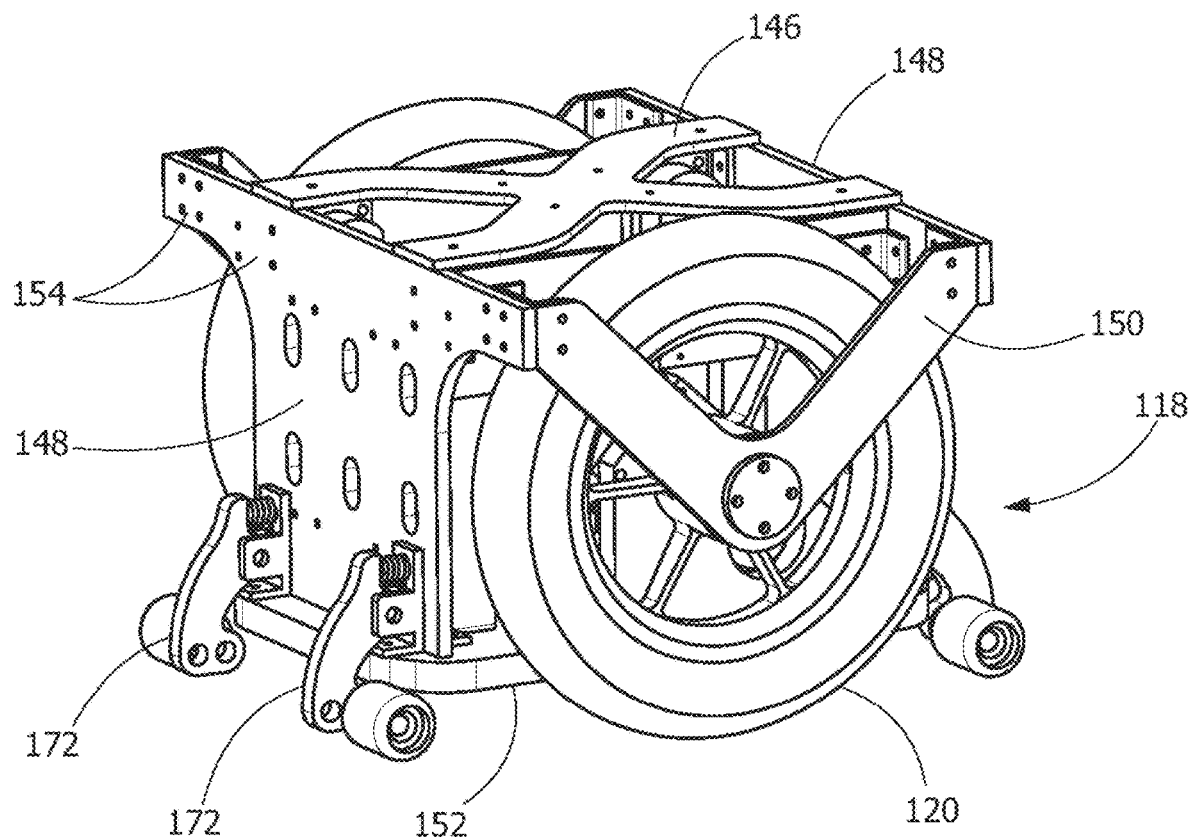
FIG. 23 is a perspective view of a fifth alternate illustrative embodiment, a base of a mobile device which simulates human motion according to the present invention.

Other examples of the suspension system 136 include, but are not limited to: a hydraulic shocks; inflatable air bladder 168 (FIG. 25); rollers on a vertical shaft 170 (FIG. 19); swing arm design with resilient members, such as compression springs/hydraulic shocks/air bladder 172 (FIG. 23); flex arm design-steel leaf spring, fiberglass rod; and torsion resistant fixed swing arm. Alternatively, an integrated suspension system is part of foam padding with or without an inflatable bladder.

Suspension allows passive oscillation during velocity and direction changes that assists in realistic or real life movement simulation termed "juking" or "shake", while maintaining desired performance characteristics. Properties such as stiffness and position/depth relative to the base of the device of the suspension system may be adjusted to influence performance on different surfaces.

In another illustrative embodiment, the device 110 is used without suspension, whereby controllers maintain stability of the foam on top of the wheels without physical external stabilization forces.

Figure 24:
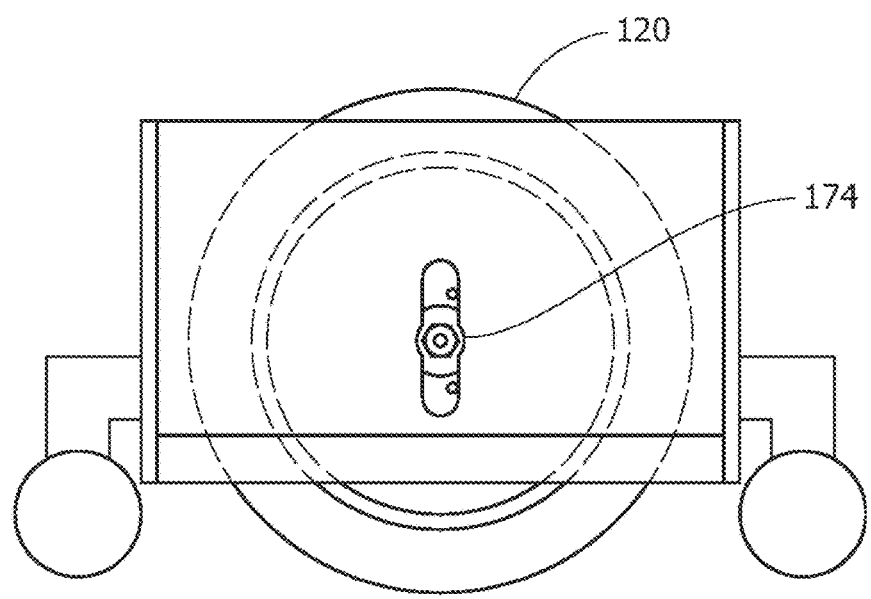
FIG. 24 is a perspective view of a sixth alternate illustrative embodiment, a base of a mobile device which simulates human motion according to the present invention.

In another illustrative embodiment, the diwheel has axles which include suspension and/or camber 174 (FIG. 24) to adjust the traction and control to improve performance.

Various types of motors 122 and power sources may be used without departing from the invention. As an example, a 3 hp motor may be used. One such motor is the AmpFlow A28-150. Another motor which can be used is the AmpFlow A28-400 motor. When used with a single 12V battery, instant acceleration in all directions is achieved with a high degree of control. When used with a 24V battery, a greater maximum velocity may be achieved. The motor choice shall not be limited to these two types rather the motor choice in conjunction with gear ratio and wheel size shall maintain the desired acceleration and top speed mentioned above.

The speed and acceleration of the device is dependent upon many factors, including the size of the device, the type of drive, the size of the motor, etc. The drive specifications may be specifically tailored to the user base. Examples of such user base may include, but is not limited to, adult football players, children lacrosse players, hunters or police. The device is also designed to have less than a 10% loss of speed in all playable weather conditions.

In an illustrative embodiment, the batteries 130 and battery system for the device 110 are of the type which are non-spillable and which are designed to be depleted and recharged many times. One such battery is a lithium polymer battery. In various embodiments, a minimum of 13,000 mAh of on board battery storage is needed to ensure one charge lasts a practice. While charging, each cell must be individually monitored or "balanced" such that they are all nearly equal. The batteries must be encased in a fire resistant case during charging for proper safety. The batteries may be quickly replaced in the event charging is not possible during use.

Alternative embodiments of a power supply system include, but are not limited to: other rechargeable batteries (lithium polymer or other composition); charging port which is accessible from the exterior of the device; on-board battery chargers; on-board battery balancers; on-board battery monitors; removable rechargeable batteries; tethered for power to an electrical source or outlet; combustion; induction; hydraulic; or compressed air.

Figure 25:
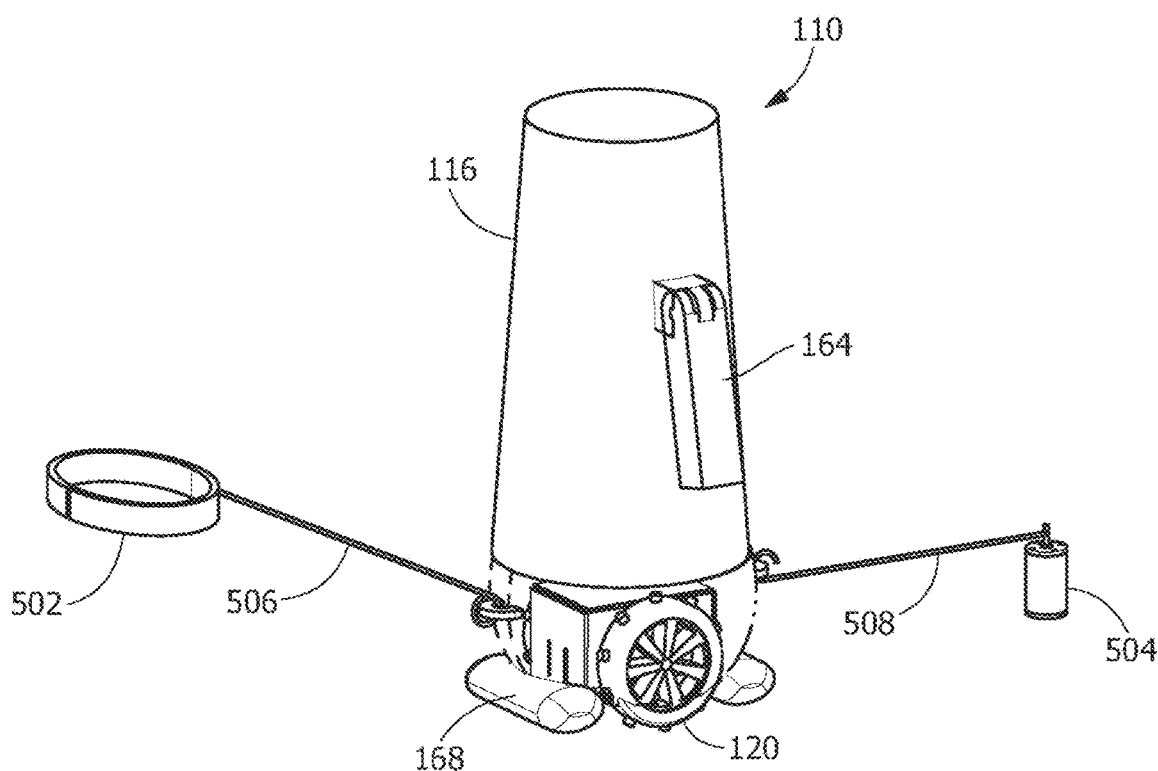
FIG. 25 is a perspective view of a seventh alternate illustrative embodiment, a mobile device which simulates human motion according to the present invention.

In addition, the device 110 may be driven by a human or additional motorized vehicle as represented in FIG. 25. In this embodiment, the device 110 includes an attachment 502 for connecting to the external device or person. The attachment 502 is connected to the device 110 by a cable, rope or tether 506. A winch 504 is provided for return motion of the device 110. The winch 504 is connected to the device 110 by a cable, rope or tether 508. Attachment points may also allow the device 110 to move other field equipment.

Figure 26:
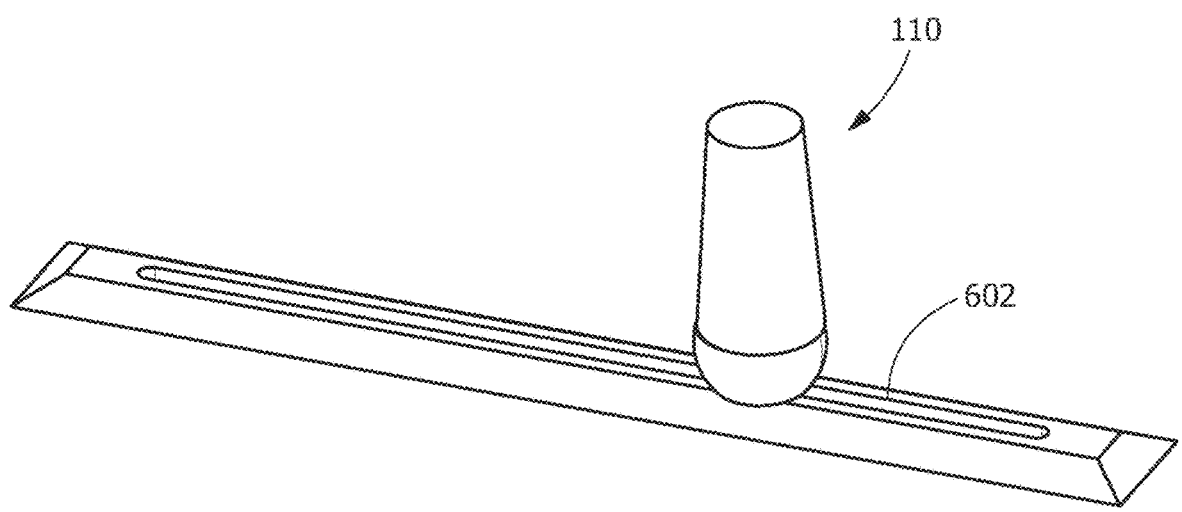
FIG. 26 is a perspective view of an eighth alternate illustrative embodiment, a mobile device which simulates human motion according to the present invention.

The device 110 may also be driven and/or motion controlled by a track 602, as shown in FIG. 26. In such an embodiment, the device 110 may be powered by a motor within the device 110, a motor within the track 602 or by some other device linked to the track or device. The device 110 is flexibly connected to the track 602 to allow the device 110 to be pushed toward a horizontal position and to be restored to an upright or vertical position.

Figure 29:
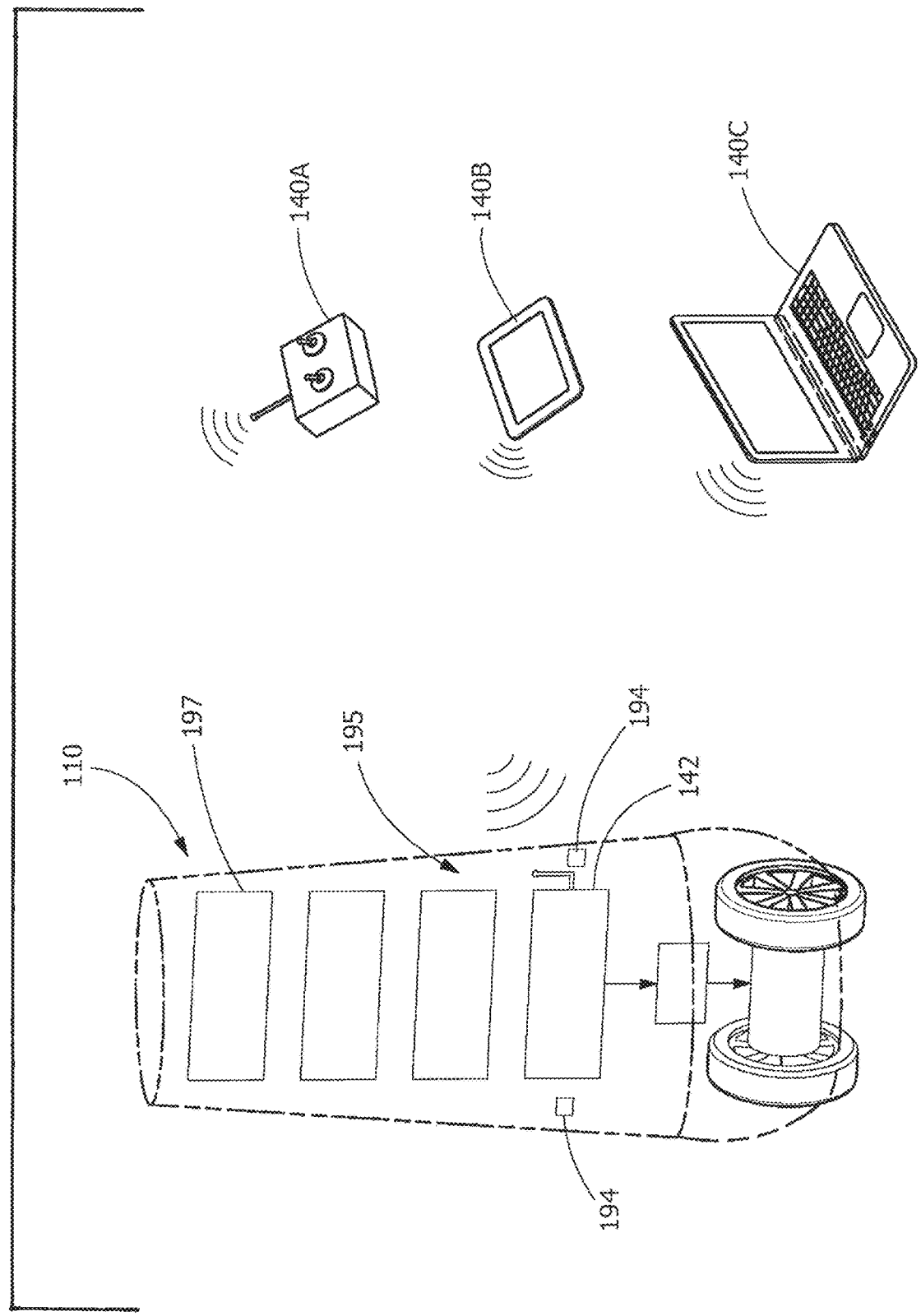
FIG. 29 is a diagrammatic view of a mobile device with representative controller illustrated.
Figure 30:
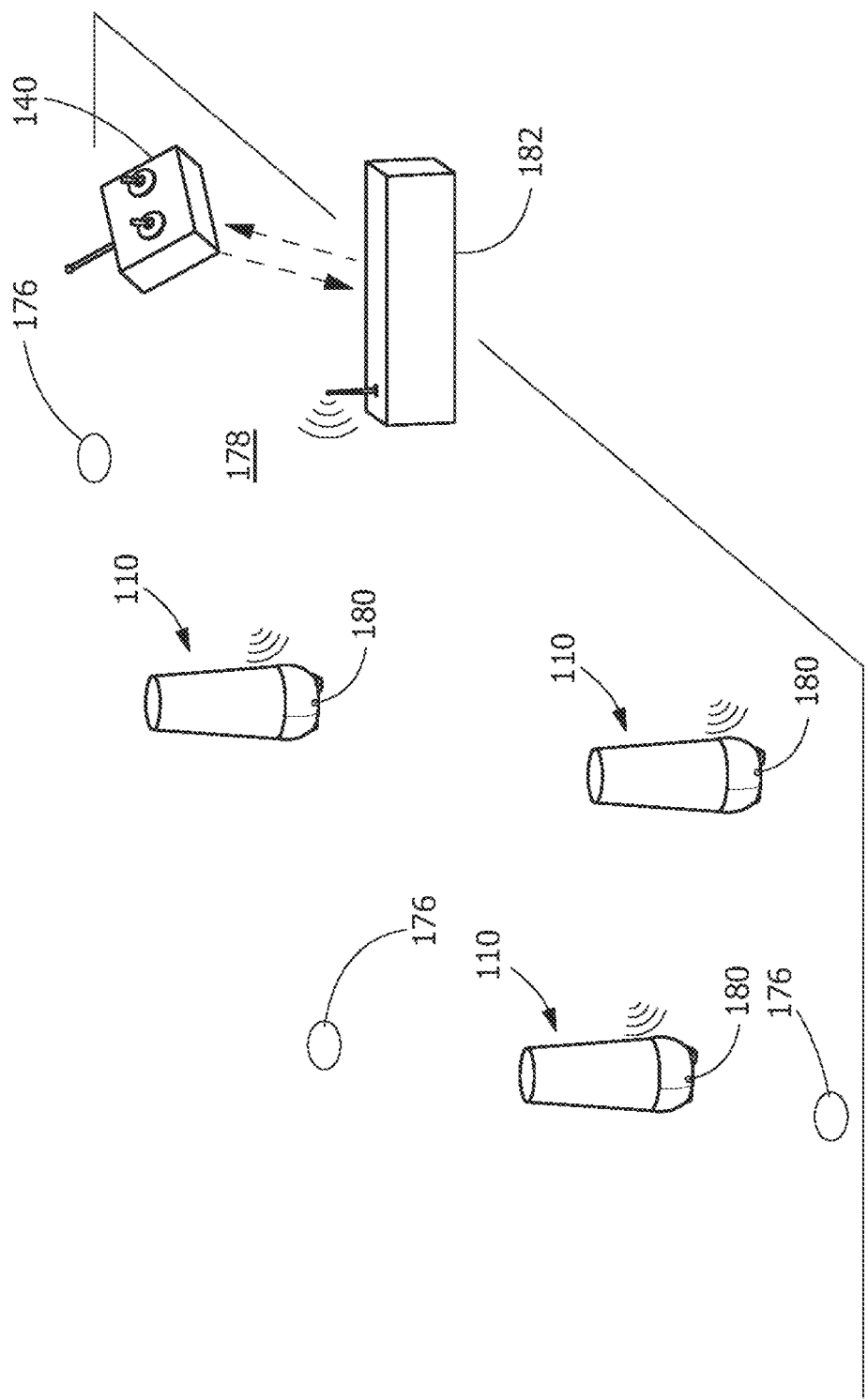
FIG. 30 is a diagrammatic view of multiple mobile units in an area, the mobile units being controlled remotely.

As best shown in FIGS. 29-30, the device 110 may be controlled by various methods or devices. In one illustrative embodiment, a single device is controlled by single remote utilizing RC, Wi-Fi or Bluetooth, whereby direct control is necessary during all device use. The remote may be stand-alone or developed in app structure for mobile or computational device access. As shown in FIG. 29, a transmitter 140, which may be, but is not limited to, a handheld controller 140A, a touch screen device 140B or a computer 140C. The transmitter 140 communicates with a receiver or processor 142 provided in the device 110 to control the device 110.

In another illustrative embodiment, the control is in pre-programmable functions, where predetermined routes of travel and performance can be chosen and executed. This embodiment allows for autonomous performance of preprogrammed routes or behavior. Simultaneous control of multiple devices from single control center can simulate entire array of motion to replace a practice squad.

At times, the steering and handling characteristics of the mobile device 110 may be difficult to control or unstable as users attempt to pursue and perform complex maneuvers or routes. Such control issues may be lessened by the non-dynamic systems and components described in this application. In addition, the mobile device 110 may include a traction control or driving assist feedback system 195, an illustrative embodiment of which is shown in FIG. 29. In this embodiment, the system measures motion of the mobile device 110 using one or more sensors 197, such as, but not limited to, angular rotation and acceleration rates of the device to actively manipulate one or more controls of the mobile device 110 through the use of processor or controller 142, including, for example, steering, throttle, braking, or any other device that may affect handling and control. As an example, in operation, the one or more sensors 197 are configured to receive angular rotational information associated with the rotation of the mobile device 110. The processor or controller 142 is configured to receive the angular rotation information associated with the rotation of the device from the one or more sensors 197 and, in turn, control a wheel speed of the mobile device 110 based at least in part on the received angular rotation information.

The sensors 197 may include one or more sensors configured to detect information about the environment surrounding the mobile device 110. For example, the sensors 197 may include one or more of a Global Positioning System (GPS), an inertial measurement unit (IMU), and/or a camera. Sensors 197 may also include sensors configured to monitor internal systems of the mobile device 110 and measurements (e.g., pitch, yaw, and roll angles) of the mobile device 110 (e.g., wheel speed sensors, wheel direction sensors, etc.). In some embodiments, sensors 197 may also include one or more gyroscopes or accelerometers, each configured to determine (or measure) rotational information about various axes of mobile device 110. Additionally, in some embodiments, one or more of the sensors 197 may be utilized or activated separately and/or collectively to modify a position and/or an orientation of the mobile device 110.

The device may have an internal, automatic shutoff device to disable motion in case of malfunction, fail safe if out of RC range, zero speed, etc. Such a shutoff may also be used to disable motion or turn off motors of the device or if the device is operating outside of proper operating parameters or after events, such as, but not limited to: human contact is made; the batteries are low; the temperature of the device or any of the components is not in an acceptable range; the device is toppled and does not self-right; the device loses communication with the controller.

In various illustrative embodiments, as illustrated in FIG. 30, the device 110 may sense a system or array of positional reference markers 176 deployable on or near a playing field 178 that allows one or more devices to remotely register location and orientation on the field by means of a positional tracker (such as a GPS) or special recognition sensor 180. The sensor 180 may receive signals from the transmitter 140 by way of a base station 182.

In other embodiments, as illustrated in FIG. 19, the device 110 has a positional sensor 184 in order to orient itself on the field or orient itself to the driver; has internal motion sensors 186 which sense current speed, position, justification; utilizes tachometers and accelerometers to facilitate ease of control; has sensors 188 which measure impact, such as impact or force a player or ball generates against the device; and has the ability to collect any desired data by addition of sensors to the control system; or a combination thereof. The sensors allow the strength and location of contact on the device 110 to be measured and tracked. An RFID or other similar device provided on the participant can also cooperate with the sensors of the device 110 to allow the participant making contact with the device to be identified and recorded.

The device 110 may include a mechanism or programming to return to designated starting area between repetitions.

The control unit may include "draw-to-drive" technology where a route can be drawn on the controller which is translated to real-world motion of the device. The processor of the control unit can record and repeat such routes that are created by the operator of the transmitter. In addition, the device may use previous player or team motion converted from video recording or motion tracking sensors placed on players.

The device 110 may have external lights or display 190 (FIG. 19) to provide users with information regarding internal assessment or feedback on player performance. Such information may include, but is not limited to, battery level or force of impact. Speakers 192 may also be incorporated to provide feedback or use audio to communicate or enhance reality of the training experience.

Device 110 may include an on-board processor 142 (FIG. 29). In addition, motion sensors 194 may be provided on the device to allow the device 110 to evade or attack approaching objects or tacklers. Alternatively or in combination, location or proximity detection devices may be provided and used to initiate un-programmed response motion of the device (e.g. evasive maneuvers). The sensor-locator system could be incorporated into player uniforms or helmets.

Device may incorporate cameras 196 (FIG. 19) for first person view and ease of driving and/or film review for training purposes.

In one illustrative embodiment, the device includes high density padding 114 around the base of the device and lower density padding 116 for the upper portion of the device. A structural element 198 (FIG. 21) may be provided for supporting the upper portion of padding. The structural element also provides a robust connection between the frame, the upper portion and the lower portion. The structural element 198 is a rigid but slightly flexible cylinder or post made from high density polyurethane. In other embodiments, other materials such as a metal beam or pipe may be used for the structural element. This material is highly durable, able to sustain a high force impact and is designed to restore itself to vertical after an impact. The structural element 198 may be bolted to the base of the device or fastened using other known fastening means. This structure is only necessary where the padding itself is not rigid enough to sustain contact and rotate the drive system during use.

The illustrative device 110 has high density foam 114 around the base 112 of the device 110 and lower density foam 116 for the upper portion of the device 110. Foams may be open-cell foams or closed-cell foams. Open-cell foams have gas pockets which are connected to one another, creating a lower density. In contrast, closed-cell foams have isolated gas pockets for a more rigid high-density shape. The high density, closed cell foam 114 around the base 112 is used as a cushion against and provide protection for the electronics. The high density, closed cell foam 114 also provides structure for the self-righting nature of the dummy or device 110. The low density, open-cell foam 116 is used where the primary impact area will be.

The design and composition of the upper portion of the mobile device may vary based upon desired training usage.

For example, foam may be used for direct combat scenarios with implementation of arms, while a hardened/increased density exterior may be necessary when used in scenarios when field bullets or projectiles are involved. The upper portion may be in many shapes, including, but not limited to, the shape of a human or of a target. Incorporation of different configuration of the upper portion of the device allows the device to perform different functions, such as, but not limited to: act as a target for cut blocks; act as a target for passing (netting, basket, target or top circle attachment which falls or is knocked down when struck), or other receptacle to be used as a passing target; act as a blocker (for ball carriers and/or kickers and punters); act as a defender employing arms/hands that may be mobile and controlled actively or passively; act as a bullet proof target for military or law enforcement. Arm attachments 164 may employ different implementations including but not limited to jammer hands, D-line arms that can "shoot up" (i.e. arms start at rest or lowered position and upon activation or trigger, they will raise to an erect position in order to simulate a player raising their hands in front of or over their body to simulate a cornerback jamming wide-receiver or a D-line trying to throw hands up to block a quarterback's pass).

The upper portion 116 may be or include attachable members to allow for the interchangeability of different upper portions. Although the upper portion 116 may be detachable, the upper portion 116 is secured to the base 112 during normal operation, thereby preventing the unwanted detachment of the upper portion 116 from the base 112.

Figure 27:
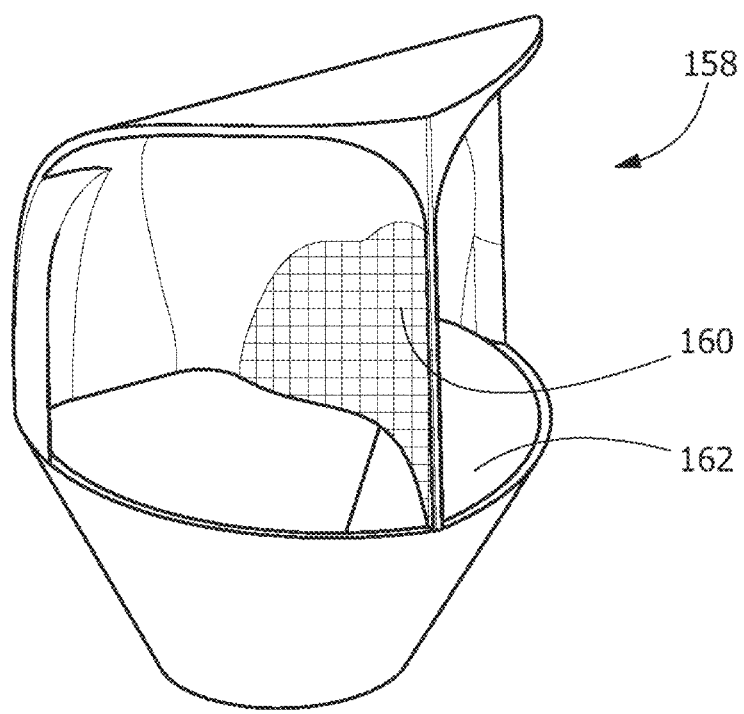
FIG. 27 is a perspective view on an illustrative attachment which can be used with the mobile device.
Figure 28:
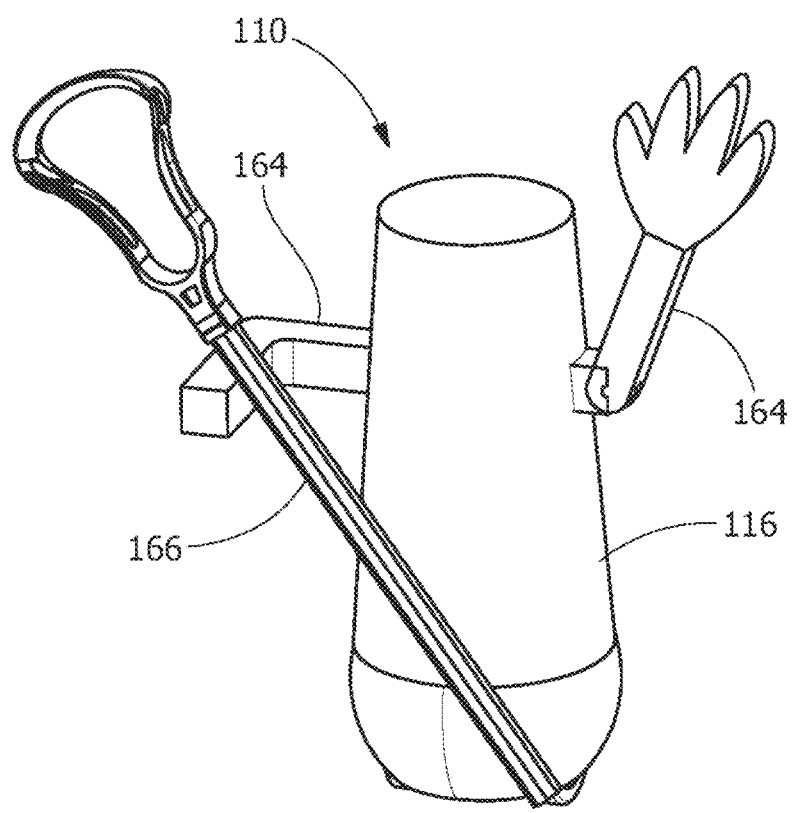
FIG. 28 is a perspective view on alternate illustrative attachments which can be used with the mobile device.

Accessories may be provided to expand the function of the device 110. Once example of an attachment is the ball catcher 158 shown in FIG. 27. The ball catcher 158 has a net 160 and a hopper 162 to facilitate the collection of balls or the like. Another example is shown in FIG. 28, which illustrates a device 110 with simulated arms 164 extending from the upper portion 116.

The device may include attachment points to act as holders for sticks 166 (lacrosse or hockey) as well as to be used as an anchoring/attachment point to transport other equipment. The attachments may be modular to serve multiple purposes on the field. The attachment points may also serve as a fixture for a ball, which may be facilitated by Velcro, magnetics, tether system or positioning of arms or other unique holding fixture, etc. Any moving components may utilize servo motors and corresponding RC channel controls and signals or may be controlled passively by a processor based on sensor inputs (for example the device may provide a stiff-arm when the device senses that a player is in close proximity. The upper portion may be configured to allow for draping of jerseys and other apparel.

Depending on the configuration of the upper portion 116 and the use of the device 110, the base may be made wider and more stable to act as blocker. The upper portion 116 can assume various configurations by adjusting the tilt and height. A tilt mode allows the upper portion to be mobile independent from the base. The height of the upper portion may be adjusted and set to different height dimensions. The height and tilt may also be self-adjusting in real time. For example, the upper portion 116 may lower its height to simulate a player crouching to absorb the hit. Furthermore, the upper portion 116 may also rotate independently of the base which may simulate a player spinning upon contact. In addition, different materials may be used for different surfaces/sports.

External passive designs may be included to encourage proper techniques and procedures. For example, a tackling zone may be marked to encourage proper tackling.

The device is configured to be water resistant and operate in all weather conditions. The device may be painted and/or the padding may be coated in vinyl-coated polyester or other durable coating to provide a robust, uniform and aesthetically pleasing finish.

The device is configured to be tall enough and heavy enough to provide a realistic visual target and realistic resistance for participants. In one embodiment, the device has a weight of approximately 180 lbs and a height of approximately 63 inches. Scaled versions of different size, weight, speed and acceleration may be used without departing the field of invention.

Alternate embodiments of the mobile device 110 include, but are not limited to a close-range combat device and a shooting target device. The close-range target device has self-stabilizing components as described above. In various embodiments, the close-range target device may include self-righting components as described above. Such a close-range target device may be used for example for training military or police or may be used as a sparring partner for boxing.

The shooting target device includes a drive system which has sufficient protection, such as a bullet proof casing, to protect the drive system from being harmed from live rounds of ammunition. A target area may be provided on the shooting target device. The target area may be made of bullet proof material or may be replaceable. Sensors may be provided to detect if the target area has been hit by the ammunition. Alternatively, or in addition, audio or visual feedback may be provided to communicate a hit.

Further to the above, a certain aspect of the invention is a mobile device which simulates human motion, the device including a base having a drive system for providing motion to the device; pads provided on the device; and a suspension system both in front and behind an axis of rotation of the drive system, the suspension system having a contact element both in front and behind the axis of rotation of the drive system, that contacts a ground surface to resist axial rotation of a body of device around the axis of rotation during rapid acceleration and deceleration. The suspension system restores the device to a vertical position while dampening oscillation and maintaining sufficient normal force on the drive system to maintain traction. Accordingly, the device can be integrated into any activity where device motion can improve practice safety, efficiency and performance.

Another aspect of the invention involves a remotely controlled mobile device having a base including a self-propelled, remotely controlled, drive system, the drive system comprising at least two wheels, each wheel powered by at least one independent motor, where each wheel is coupled to an axle and having an axis of rotation defined thereby, the axes of rotation defining an axle plane. The device also has an upper portion extending upwardly from, and attached to, the base, where the upper portion and the base have a longitudinal axis extending therethrough, where the axle plane is perpendicular to the longitudinal axis; and where the longitudinal axis is generally vertical when the device is in an upright position. The device can also have a suspension system having a contact element residing behind the two wheels, the contact element having a bottom, the contact element bottom defining a contact element bottom plane perpendicular to the longitudinal axis, the contact element bottom plane intersecting the longitudinal axis between an intersection of the axle plane with the longitudinal axis and an intersection with the longitudinal axis of a plane, perpendicular to the longitudinal axis, defined by a bottom of the at least two wheels; whereby the suspension system, via contact by the contact element with a ground surface, limits axial rotation of the upper portion about any of the axes of rotation during acceleration or deceleration of the device.

In this embodiment, the suspension system could be a two part system, where a first part includes the contact element residing behind the two wheels, and a second part includes a contact element residing in front of the two wheels, the contact elements of the two part system each having a bottom, the bottoms defining the contact element bottom plane, perpendicular to the longitudinal axis, whereby the two part system, via contact by one or both of the contact elements with the ground surface, limits axial rotation of the upper portion about any of the axes of rotation during acceleration or deceleration of the device.

In addition, or alternatively, the contact element could include at least one slider, the at least one slider extending longitudinally, generally perpendicularly to a forward direction of the device, wherein a bottom of the at least one slider makes contact with the ground surface when the device tilts, relative to any of the axes of rotation, during acceleration or deceleration of the device.

In this embodiment, each slider could include an inflatable air bladder, having a rounded or squared perimeter in cross-section; and/or the at least one slider could communicate with the base via one or more shafts mounted to the base, the one or more shafts disposed perpendicularly to the axle plane. The device could further comprise one or more springs provided on each of the one or more shafts, the one or more springs providing biased positioning of the one or more shafts relative to the base, and providing variable resistance to axial rotation of the upper portion about any of the axes of rotation upon slider contact with the ground surface.

In addition, or alternatively, the contact element could include at least one caster, each caster including a housing and a roller, where each housing is connected to the base and each roller rotates about an axis generally perpendicular to a forward direction of the device, whereby the roller makes contact with the ground surface when the device tilts, relative to any of the axes of rotation, during acceleration or deceleration of the device. Each housing could further comprise a spring, the spring biasing the respective roller relative to the base and providing a variable dampening of an axial rotation of the upper portion about any of the axes of rotation when the respective roller makes contact with the ground surface when the device tilts, relative to any of the axes of rotation, during acceleration or deceleration of the device.

In addition, or alternatively, the suspension system comprises components selected from the group consisting of hydraulic shocks, compression springs, inflatable air bladders, rollers on a vertical shaft, a swing arm design with resilient members, a flex arm design-steel leaf spring, a fiberglass rod and a torsion resistant fixed swing arm. The suspension system might allow passive oscillation of the device, about any of the axes of rotation, during acceleration, deceleration and direction change of the device, and wherein the suspension system is modifiable to control an amount of passive oscillation by providing adjustability of a vertical or a horizontal distance between the bottom of the at least two wheels and the bottom of the contact element.

Another aspect of the invention involves a remotely controlled mobile device having a base including a self-propelled, remotely controlled, drive system, at least a portion of the drive system contacting a ground surface to propel the device, the device being in an upright position when the at least a portion of the drive system is operationally contacting the ground surface. In this aspect, an upper portion extends upwardly from, and is attached to, the base, where the upper portion and the base have a longitudinal axis extending therethrough, the longitudinal axis being generally vertical when the device is in the upright position. The device also has a sensor and automatic control component, wherein pre-determined control signals received remotely are disabled when the device is in an other than upright position.

In this embodiment, all power to the drive system is shutoff when the device is in the other than upright position. In addition, or alternatively, all power to the drive system is restricted upon an occurrence, within the device, selected from the group consisting of a low battery, a high temperature of one or more device components, human contact with the device, and device losing communication with the remote.

In this embodiment, pre-determined control signals received remotely can be additionally disabled upon an occurrence, within the device, selected from the group consisting of a low battery, a high temperature of one or more device components, and human contact with the device. In addition, or alternatively, speed of the device can be further limited to 20% of maximum when a low battery occurrence is sensed.

This embodiment could further include an external audio-visual display of status of the device selected from the group consisting of low battery, sensor status, a high temperature of one or more device components and device losing communication with the remote.

Still another aspect of the invention involves a remotely controlled mobile device having a base including a self-propelled, remotely controlled, drive system, at least a portion of the drive system contacting a ground surface to propel the device, the device being in an upright position when the at least a portion of the drive system is operationally contacting the ground surface. The device also has a an upper portion extending upwardly from, and attached to, the base, where the upper portion and the base have a longitudinal axis extending therethrough, the longitudinal axis being generally vertical when the device is in the upright position; and one or more sensors and at least one processor or controller, wherein angular rotation information of the device is detected by the one or more sensors, with the at least one processor or controller determining and providing control instruction to the drive system based at least in part on the detected angular rotation information.

In this embodiment, the drive system can include at least two wheels, each wheel powered by at least one independent motor, where each wheel is coupled to an axle and having an axis of rotation defined thereby. The device could further have one or more sensors detecting angular rotation of the device; and the at least one processor or controller could determine and provide control instruction for each of the at least two wheels independently based at least in part on the detected angular rotation of the device. The control instruction provided could involve independent speed control for each of the two wheels.

The one or more sensors may each include a gyroscope or accelerometer to determine the angular rotation information detected. Alternatively, or in addition, the one or more sensors could each additionally include one or more components selected from the group consisting of a Global Positioning System, an Inertial Measurement Unit, positional reference markers, and a camera; and the at least one processor or controller could determine and provide control instruction to the drive system based at least in part on information provided by the one or more additionally included components. The one or more sensors could additionally sense acceleration rates of the device, and the control instruction provided to the drive system involves instructions selected from the group consisting of steering, braking and throttling.

A further aspect of the invention involves a remotely controlled mobile device having a base including a self-propelled, remotely controlled, drive system, at least a portion of the drive system contacting a ground surface to propel the device, the device being in an upright position when the at least a portion of the drive system is operationally contacting the ground surface. The device also has an upper portion extending upwardly from, and attached to, the base, where the upper portion and the base have a longitudinal axis extending therethrough, the longitudinal axis being generally vertical when the device is in the upright position. In this embodiment, the device is self-righting to an upright position when the device is in an other than upright position; the base has an at least partially rounded exterior enclosure that at least partially surrounds the drive system; the base, when in the other than upright position, has a point of the rounded exterior enclosure contacting the ground; the device has a center of mass within the base; and a location on the longitudinal axis where a plane defined through the center of mass and a perpendicular intersection with the longitudinal axis is below a location on the longitudinal axis where a plane defined through the point of the rounded exterior enclosure contacting the ground and extending vertically intersects the longitudinal axis.

In this embodiment, the drive system could include at least two wheels, and the device would be in an upright position when the at least two wheels are operationally contacting the ground surface. The at least two wheels could extend from a bottom of the exterior enclosure of the base; the device would be in an upright position when the at least two wheels are operationally contacting the ground surface and the exterior enclosure of the base is elevated above the ground surface, having no contact with the ground surface; and the location on the longitudinal axis where the plane defined through the center of mass and the perpendicular intersection with the longitudinal axis causes the device to self-right, without the use of motors or electronic devices, to an upright position, with the exterior enclosure of the base elevated above the ground surface, wherein the exterior enclosure of the base has no contact with the ground surface.

An entirety of the upper portion could remain attached to the base when the device is in an upright position, when the device falls to an other than upright position, and when the device self-rights back to the upright position. The upper portion could be secured to the base by a mounting component selected from the group consisting of a bracket, latch, vinyl covering, bolt, fastener, buckle and zipper.

The device could include high density, closed cell foam in the base and low density, open cell foam in the upper portion, where the low density, open cell foam in the upper portion is replaceable to provide differing upper portion shapes to enhance variability of device use. The device could further include a mobile mass or flywheel device to facilitate self-righting of the device to an upright position.

The drive system could also include at least one tread, each tread being powered by at least one independent motor, where the device is in an upright position when the at least one tread is operationally contacting the ground surface.

In another aspect, the present invention provides a system for operating mobile training devices, the devices consisting of a base which propels the device and an upper portion specific to the training purpose. The system can include a user interface whereby the operator enters commands, a processor interprets commands and dictates the propulsion, orientation, reactive motion, and activation of mechanisms on the device, and at least one mobile training device. In one embodiment, the control system includes memory where location data can be stored as routes of motion to be executed by the training devices.

Aforementioned routes may be determined by previous human motion, prior motion of the training device, or created electronically by the operator via a user interface. As an illustrative example, human motion data may be obtained by one or more of the following: RFID, GPS, RTK GNSS, Computer Vision.

A plurality of devices may be controlled simultaneously to create an array of motion, for example an American Football play. Training devices may operate in an array of motion in tandem with human counterparts. As an illustrative example, a team consisting of training devices and human players may execute an American Football play.

The system can include a control loop wherein the processor determines the current location, heading and velocity of the training device and issues corrective commands to the motors providing motion to the device.

Figure 31:
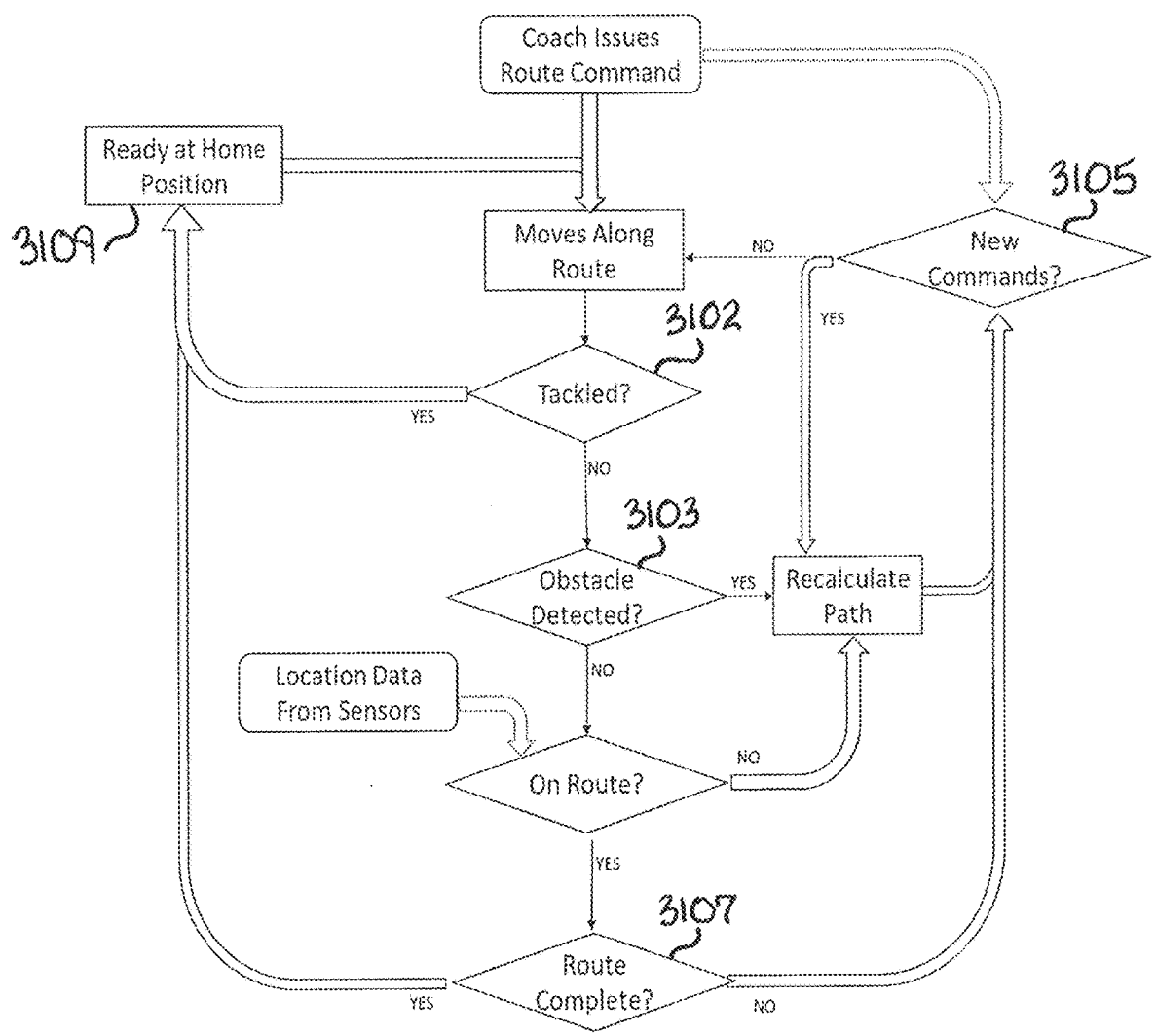
FIG. 31 is a flow diagram illustrating mobile unit routing, re-routing, obstacle activity, and return to home.

In one aspect, as shown in FIG. 31, the system may terminate a route at any event, including contact with a person 3102, a detected obstacle in the path 3102, new commands issued from the operator 3105, or arrival of the training device at the terminus of said route.

Upon completion of a route 3107, the system may automatically return the training device to its original position 3109 at a restricted speed, using sensors to detect and avoid collisions with persons or objects, and with audiovisual alerts. The training device may automatically return to a predetermined location when the battery energy storage drops below a specified threshold.

The system may use sensors, including radar, lidar, sonar and cameras, to detect obstacles in the path of a device. Detection of an obstacle in the path may elicit a response including but not limited to: stop motion of the device, restrict velocity of the device, recalculate the path of the device. Data regarding the location of obstacles may be transmitted to the processor and inform motion of other training devices operating in the same environment. Data regarding the location of each device may be transmitted between the processor and devices to avoid a collision between training devices.

Figure 32A:
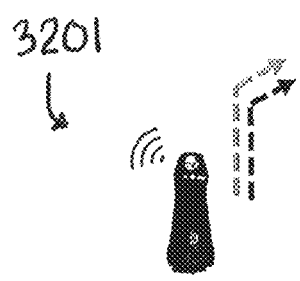
FIGS. 32A-32D illustrate mobile unit route recording/playback, for the devices alone or for one or more devices together with human players, where the mobile units can operate fully autonomously; where
Figure 32B:
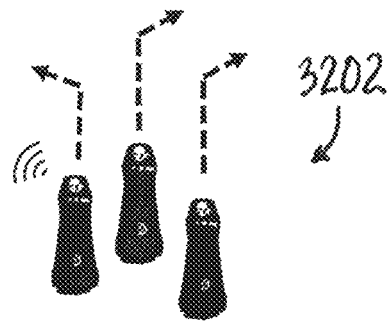
Figure 32C:
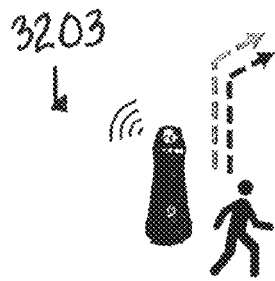
Figure 32D:
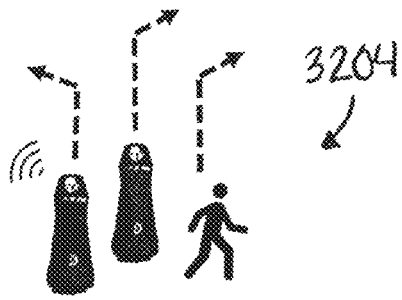

As shown in FIG. 32A-32B, location data can be transmitted between the processor and the devices to avoid a collision between training devices. This data transmission can be used to assist multiple units to work together, and to prevent collisions. Systems can send controls one-way to dictate device motion, or the system can send controls to the devices, and receive telemetry from the devices, to more specifically control the devices. As shown in FIG. 32A, the devices can playback a route recording 3201, or the devices can be fully autonomous 3202, relative to other devices in the fleet, to perform routes without collision (FIG. 32B), or the devices can work with humans, either alone 3203 (FIG. 32C), or as a hybrid team 3204, where each device is fully autonomous (FIG. 32D), preventing collisions with one another, and with the one or more humans.

In these embodiments, the devices can learn new routes by following players on the field and replicating motion, or by following humans on the field. These routes can be detected with RFID/Magnetic/GPS or other "tokens." Or, cameras can be used. As noted, the devices can learn new routes directly from human, player motion through the use of cameras or positional sensors.

Location data of the training devices and the control unit may be determined by one or more of the set including GPS, RTK GNSS, compass, camera(s), Lidar, Sonar, RFID, wireless communication to fiducial markers, on-board beacon. Location of the control unit may be used to orient the training device to the operator.

Computing for the control loop can be performed on a single processor located on the training unit itself, in the controller module, or on a separate computing device. Computing for the control loop can be distributed across a plurality of mobile training devices with no central processor.

Training devices can receive control signals via wireless communication with the control unit, or relayed from wireless communication with other training units.

Figure 33:
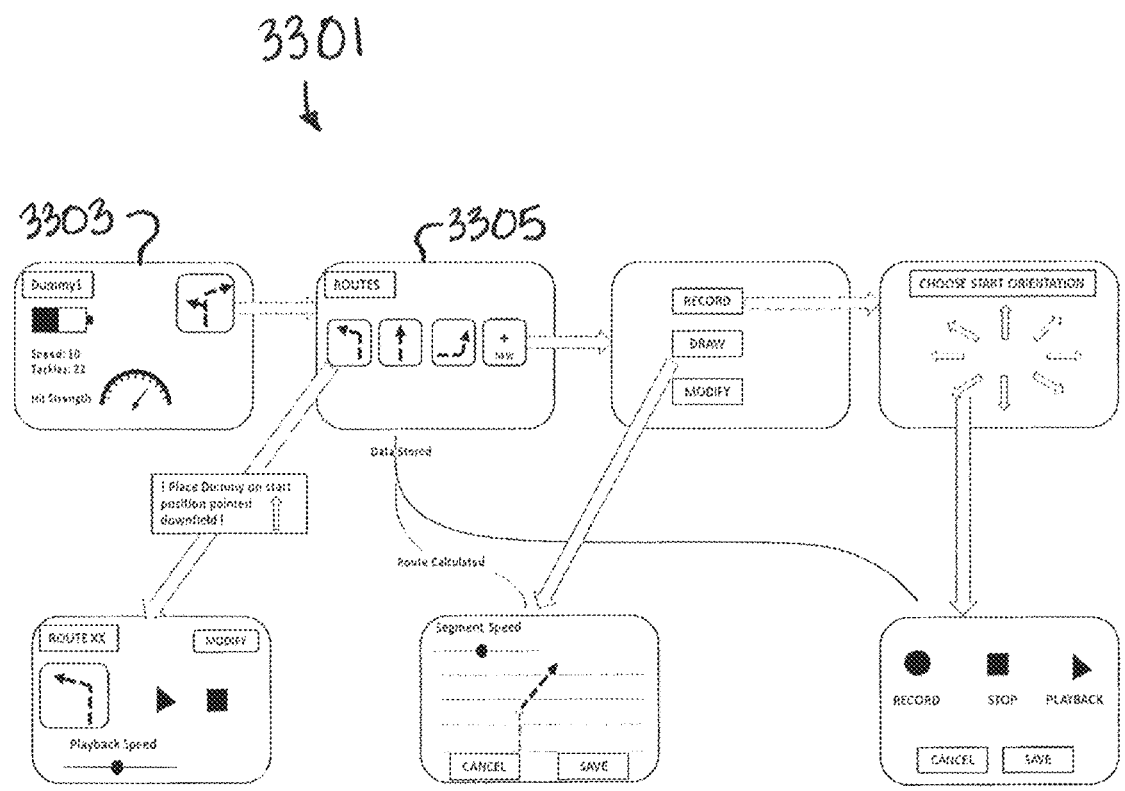
FIG. 33 illustrates a user interface capable of generating mobile unit route playback, including from home position.

As shown in FIG. 33, the training devices can operate based on a control loop 3301 wherein the processor receives real-time location data to determine current location, velocity and acceleration. The processor can fuse location data with on-board acceleration, rotation, magnetic heading, encoder and ground sensor data. The control loop 3301 can adjust individual wheel speed to continue motion along the desired path.

Sensors including encoders, accelerometers, gyroscopes and optical ground sensors can be used to detect and mitigate wheel slip. The training device can compensate for driving on a variety of different surfaces, each having a different coefficient of friction with the drive tires. The motor controller's acceleration ramp on the training device may be adjusted accordingly and can be configured automatically or by an operator-controlled switch.

A user interface 3303, as shown in FIG. 33, can be provided on a computer, smartphone, or tablet connected to the processor and one or more mobile training devices. The user interface 3303 allows operators to remotely monitor and visualize current and historical status of units including but not limited to speed, temperature, battery level, number and strength impacts to the unit, percent of current route complete and data from on-board sensors.

The user interface 3303 allows an operator to issue a single command whereby a plurality of mobile training devices executes a prescribed set of motions 3305. The user interface allows an operator to issue audio commands. As an illustrative example, an operator saying "Blue 42" will initiate motion of training devices along a predetermined set of routes 3305.

Figure 34:
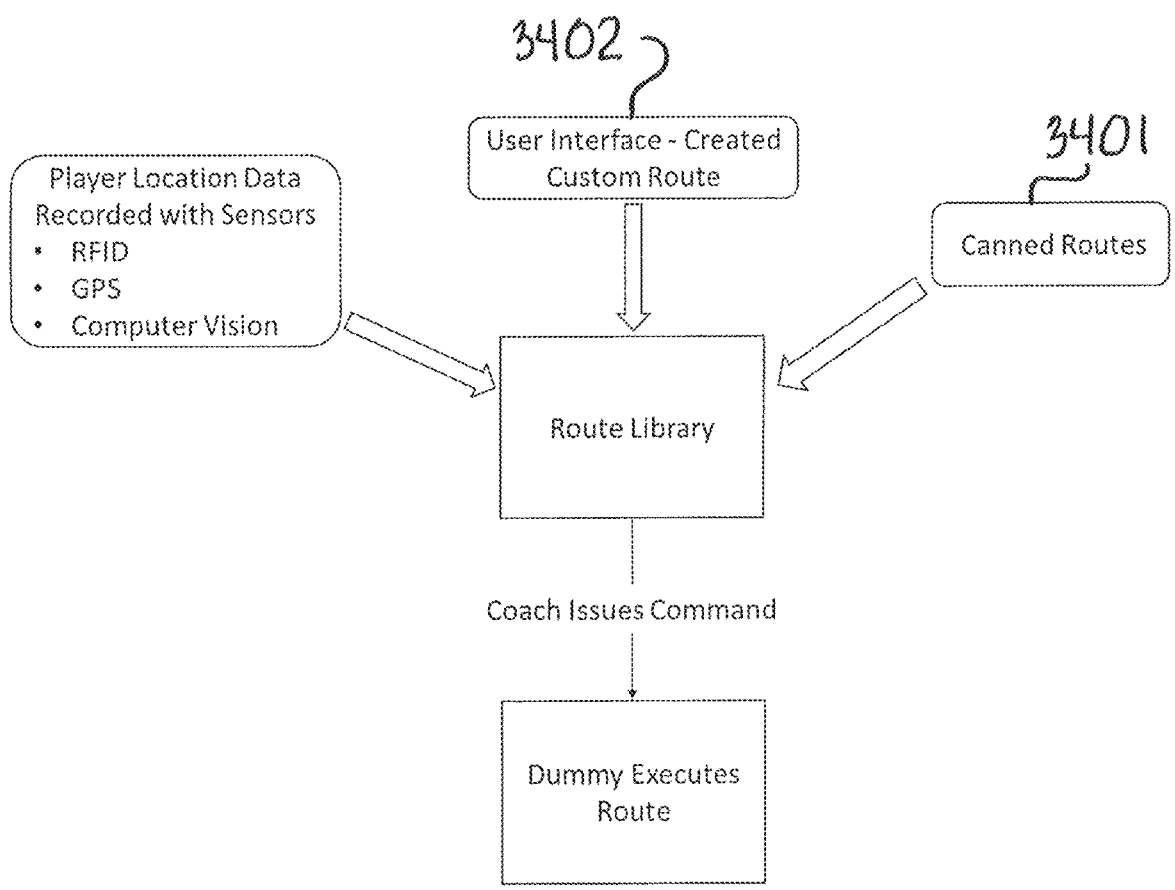
FIG. 34 is a flow diagram illustrating mobile unit routing from one or more of canned routes, user interface created routes, or from player location data generated from sensors.

As shown in FIG. 34, an operator has the ability to select from a set of predetermined, "canned" routes 3401. An operator has the ability to modify the distance, speed and direction changes of any routes. An operator has the ability to create new routes 3402.

"Draw-to-drive" technology may be used to interpret a path drawn by the operator and determine speed and steering controls for each segment of motion, or between waypoints for the mobile training device.

Control signals and telemetry may be communicated between the user interface and the mobile device by one or more of the following: Wifi, Bluetooth, XBee, Radio Frequency, Cellular data or a wired connection.

The mobile training device may include sensors including accelerometers, gyroscopes, pressure transducer, strain gauge, and piezoelectric sensor to characterize impacts to the device by a projectile, object or person.

Figure 35:
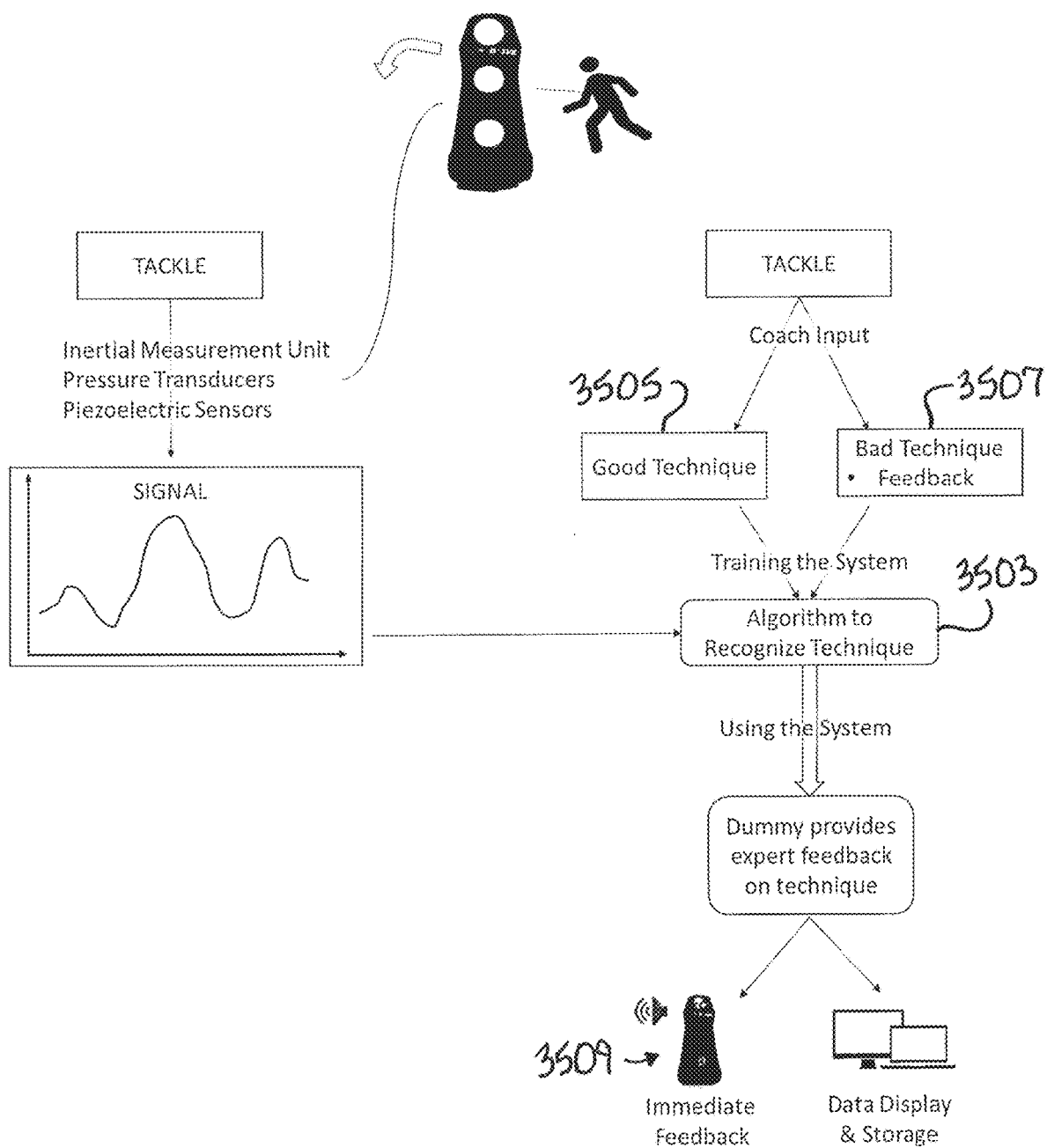
FIG. 35 is a flow diagram illustrating the use of sensors, manual input, and a machine learning algorithm, to provide technique feedback to a user of the mobile device.

As shown in FIG. 35, data from the sensors may be processed using a machine learning algorithm 3503 trained by coaches. As an illustrative example, expert Football coaches may code tackles as "good" 3505 or "poor" 3507 technique with the appropriate feedback. This input will be coupled with sensor data in a training set. With a sufficient training set, the training device will compute and provide the appropriate coaching feedback 3509 based on sensor data in the event of a tackle.

The user interface allows an operator to visualize data regarding an impact to the device by a projectile, object or person including location, strength and duration of the impact.

Another embodiment employs an RFID beacon on a person, allowing the training device to detect and evade or pursue aforementioned person. Location data from tracking a player or object can be stored and recalled as a canned route. Data regarding operation of the training device, for example runtime, speed and battery level in addition to sensor information such as tackle strength and location can be uploaded to the internet via wifi, hard wire or cellular data and accessed remotely. The training device can have on-board internet connectivity. Data may be stored on the training device or controller and uploaded to the internet at a later time. Data upload can occur automatically.

The operation of the mobile training devices may be limited to specific geographic zones (the "training environment"). The training environment may be detected automatically. In one embodiment, a camera detects the sideline of a football field and automatically create a boundary for the operation of the training device. The training environment may be set by the operator on the user interface or by any of the following: markings on the field, fiducial markers or beacons, wire or antennas carrying a signal, GPS or local positioning coordinates, lasers.

The mobile device 110 and system simulates human motion as realistically as possible in order to practice various movements. In particular, the mobile device and system allows for practice of various movements, such as tackling, with no need for person-to-person contact. The drive permits for motion of the device in any direction, thereby allowing participants to practice in a simulated relevant scenario. The mobile device and system provide a safe alternative to live interaction and will increase participant safety and reduce the incidence of injuries during practice or drills while at the same time reinforcing proper form and procedures.

Tactical Target

Another embodiment of the present invention relates generally to an omnidirectional sensing target of a stationary or mobile device (robot); and more particularly to a sensing target that can detect and differentiate between projectile (bullet) hits to the head, body, and one or more peripheral regions (e.g., arms, pelvis, legs) of a humanoid-form target, elicit a physical response from the mobile device based upon the sensing data, and provide real time feedback to a user (shooter) via a user-friendly interface.

A tactical target embodiment can be directed to: 1) a sensor having the ability to detect bullets shot through the target from any direction and differentiate between impacts to different zones of the target (e.g., the head, body, and peripheral zones (arms, pelvis, legs)); 2) an integrated electrical control system capable of collecting input data from the target sensor and eliciting a desired physical response from the device; 3) a mechanical actuator which will cause a humanoid target attached to the mobile device (MVP) drive base to pivot to a near-horizontal position in response to defined critical zone hits; 4) a software application which interfaces with the aforementioned electrical control system, displays shot placement to a user in real time, and allows the user to specify the conditions that trigger the target to fall over.

In one or more tactical target embodiments, a three-dimensional (3D) target geometry for omnidirectional sensing of bullets is provided, where:

an embodiment of a shooting target for sensing bullet impact comprises multiple layers of conductive material separated by one or more insulating layers. The embodiment can be formed by the wrapping of a planar sensing panel into a three-dimensional configuration such that the panel occludes a three-dimensional volume and presents surfaces that can sense projectiles incident from all directions;

an embodiment and associated circuitry is configured to have a bullet pass through multiple zones and to electronically detect the bullet path based on a combination and/or sequence of zones detecting bullet passage;

the 3D, omnidirectional configuration above, where a sensor panel is comprised of multi-layered conductors of any material (e.g. metal foil, metal mesh, conductive paint);

the aforementioned sensor panels, laminated in such a way that individual conductors protrude from the sensing zone such that discrete electrical contact may be made with each layer individually;

a method of making an initially planar sensor panel into a 3D configuration by means of scoring and bending, hinging, wrapping around a shaped die; in addition to simple bending; and a method of pre-forming and affixing the three-dimensional target configuration for subsequent embedding in molded polymer that comprises the manufactured target outer shape, texture and appearance.

In one or more further embodiments, the tactical target includes detection and repair of conductive target electrical shorting.

a system and method of detecting a persistent electrical connection (short circuit) between conductive layers of a sensing target panel resulting, for example, from pieces of conductive-layer material being torn and repositioned as a result of bullet impact;

a system and method of automatically applying a voltage across the conductive panels from a power source of sufficient capacity to burn out a fragment causing the unwanted short circuit;

a system and method of detecting the completion of the fragment burn-out and automatically switching off the applied voltage and resetting the circuitry in preparation for a repeated short circuit event; and a system and method of implementing more than two layers of conductive material and observing the signal from each temporally such that a closed circuit from a penetrating projectile may be discerned from a spurious or unwanted short circuit (false positive).

Accordingly, tactical target embodiments of the present invention are directed to: 1) a target sensor having the ability to detect bullets shot through the target from any direction and can differentiate between impacts on different zones of the target (e.g., the head, body, and peripheral zones); 2) an integrated electrical control system capable of collecting input data from the target sensor and eliciting a desired physical response from the target device; 3) a mechanical actuator which will cause a humanoid target attached to the mobile device (MVP) drive base to pivot to a near-horizontal position in response to defined critical zone hits; 4) a software application which interfaces with the aforementioned electrical control system, displays shot placement to a user in real time, and allows the user to specify the conditions that trigger the target to fall over.

The target embodiments can stand alone, being used in a stationary position. Or, the target embodiments can be used with (and riding atop) a mobile, remote controlled drive base. Examples of structure and functionality of such a mobile device (robot or MVP) is disclosed and detailed in U.S. Pat. Nos. 9,427,649; 9,682,301; and U.S. Application Publication No. 2017/0340942, all of which are incorporated herein by reference. In one aspect, a two- or four-wheeled version of the mobile device may be used for fast maneuverability on relatively smooth surfaces. In another aspect, a three-wheeled, a track driven, or a ball driven mobile device may be used in various terrain environments.

Target Sensor and Target Actuation Response

In one embodiment, a target sensor includes parallel conductive layers configured to short upon projectile passage therethrough. The target sensor, or detection mechanism, can include two sheets of electrically conductive material spaced by electrically insulating material, where the target sensor is configured to close an electric circuit upon projectile penetration of the two sheets of electrically conductive material. In one aspect, a voltage can be applied to one of the sheets of electrically conductive material, while the other sheet of electrically conductive material is connected to ground. In this aspect, the respective circuit is an open circuit that is momentarily closed when penetrated by a conductive object (e.g., projectile). In this aspect, the respective circuit can include resistive elements to detect current flow through the circuit and to detect a momentarily closed circuit.

Figure 36A:
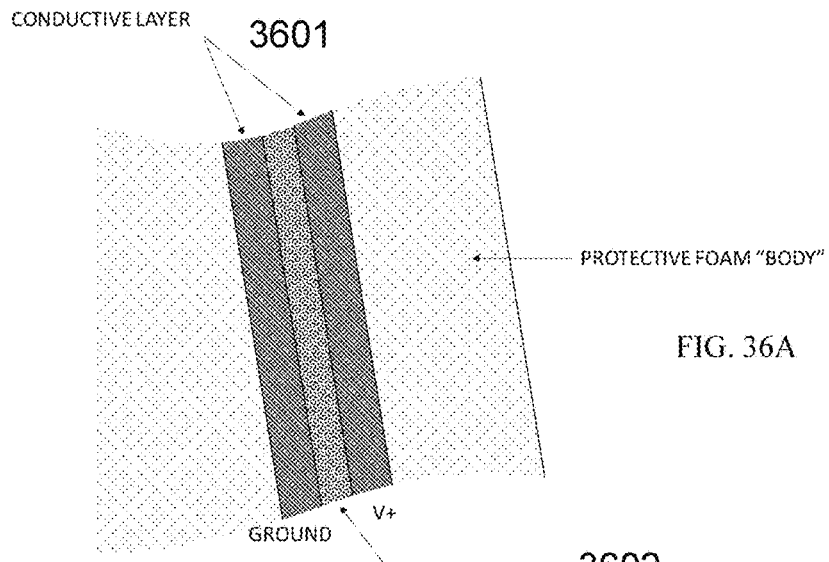
FIGS. 36A-36D illustrate a shot detection system housed within a body of an embodiment of the mobile unit; where
Figure 36B:
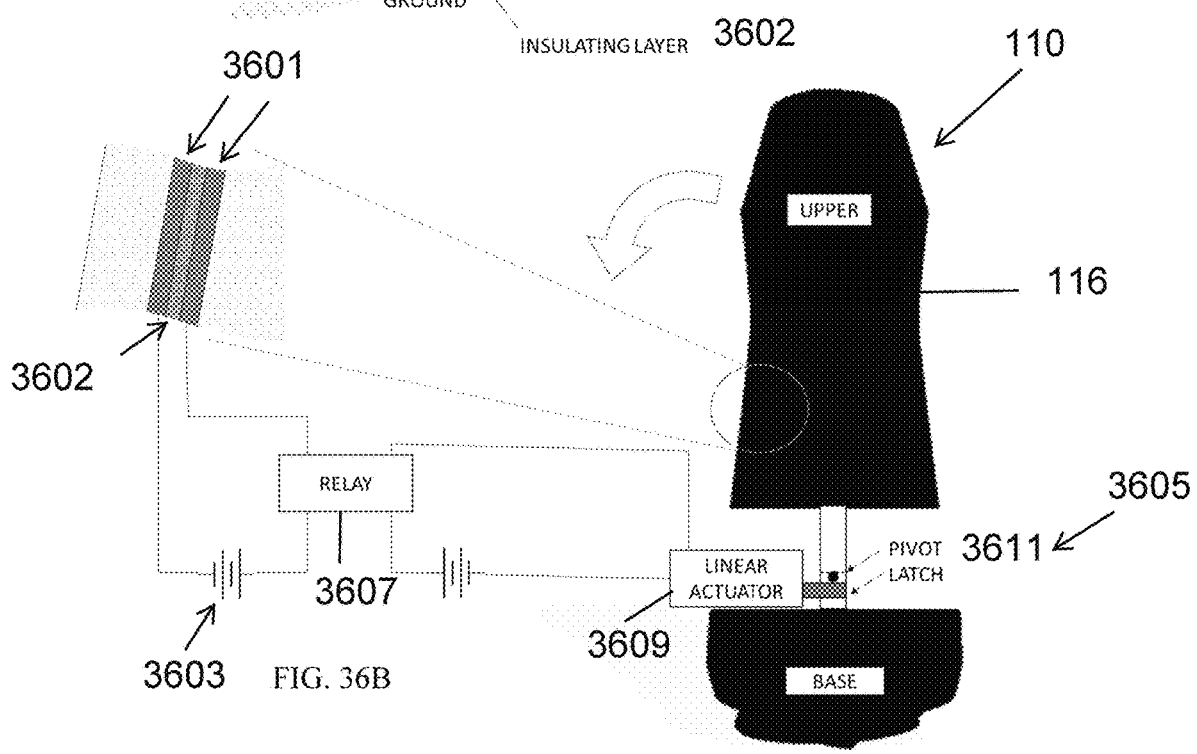

As shown in FIGS. 36A and 36B, the training device may include multiple layers of conductive material 3601, connected to a positive voltage or ground, and separated by an insulating layer 3602 such that in the event of a conductive projectile penetrating the training device, an electronic circuit is closed. The layers of conductive material 3601 may take the form of a foil or wire mesh. The circuit 3603 to detect conductive projectiles is connected to a controller which can be configured to trigger an on-board mechanism 3605 in response to the completed circuit. This mechanism 3605 can include a latch 3611 release to cause the device 110 or a portion of the device 110 to topple, external audiovisual display.

Figure 36C:
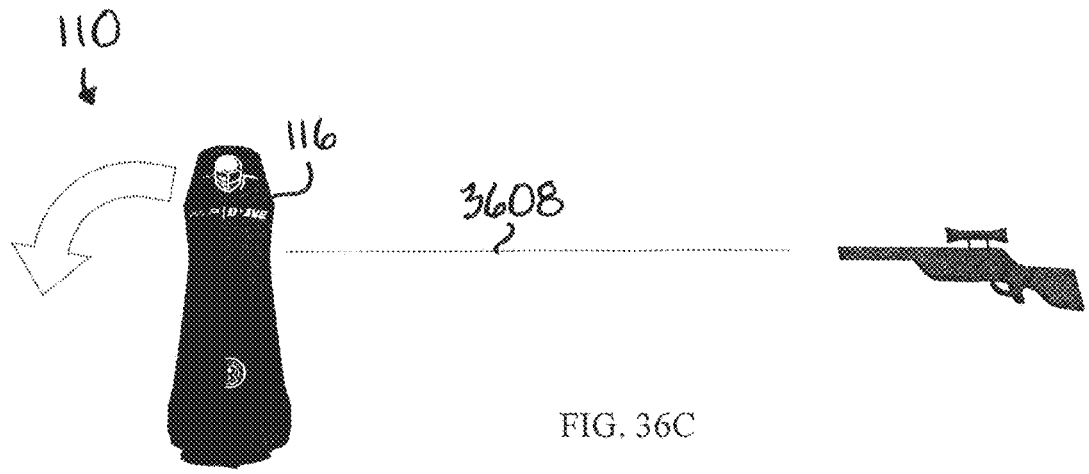
Figure 36D:
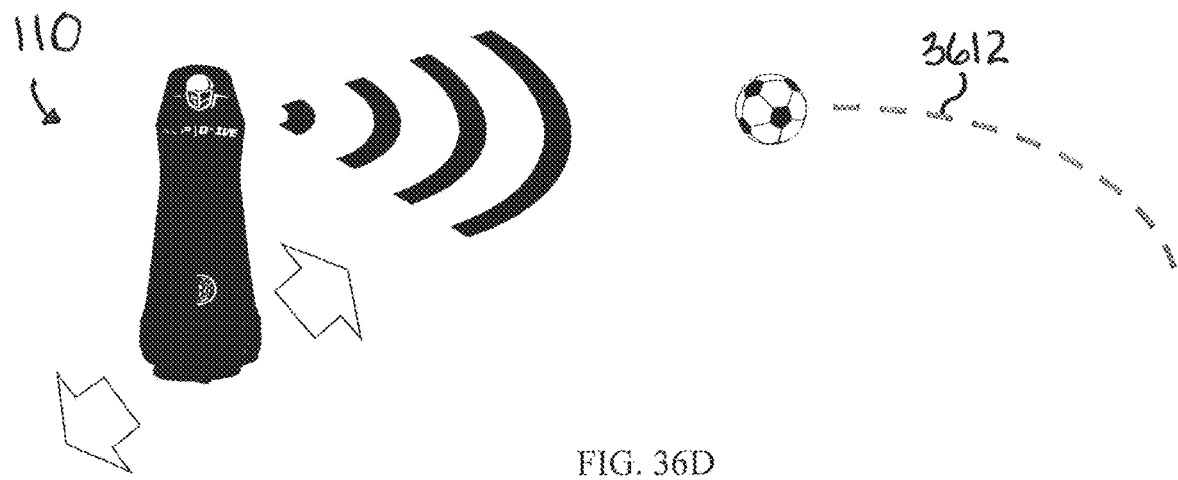

In another embodiment, the projectile detection circuit 3603 may consist of a relay 3607, a power source and a response mechanism 3605. As an illustrative example, a bullet 3608 penetrating the conductive layers simultaneously completes a circuit, triggering the relay 3607. Power is thereby delivered to a linear actuator 3609, releasing a latch 3611 and causing the upper portion 116 of the device 110 to topple, as shown in FIGS. 36B and 36C. In another embodiment, for example, FIG. 36D, the projectile 3612 response triggers a delayed effect, allowing the dummy to self-right with the use of motors or passive means after toppling.

In another embodiment, as shown in FIG. 37A, a target sensor 3701 includes three layers of electrically insulating material 3703 and two sheets of electrically conductive material 3705 spaced therebetween. In one exemplary embodiment, the electrically insulating material 3703 can be ⅛-inch thick, crosslinked ethylene foam and the electrically conductive material 3705 can be aluminum foil. In other embodiments, one or two additional sheets of electrically conductive material 3705 may be added, each spaced by electrically insulating material 3703.

For example, FIG. 37B illustrates a three conductive layer embodiment, where a target sensor 3711 includes five layers of electrically insulating material 3703 and three sheets of electrically conductive material 3705 spaced therebetween.

In one embodiment, a target for sensing projectile impact includes a detection mechanism comprising three sheets of electrically conductive material, each spaced by electrically insulating material, where the detection mechanism is configured to close an electric circuit upon projectile penetration of: 1) two of the three sheets of electrically conductive material; and 2) another two of the three sheets of electrically conductive material. The target further includes a processor configured to interpret commands, receive and forward signals, provide control instructions to the training device, and receive a first signal upon electric circuit closure resulting from projectile penetration of the two of the three sheets of electrically conductive material; and receive a second signal upon electric circuit closure resulting from projectile penetration of the another two of the three sheets of electrically conductive material.

In this embodiment, the three sheets of electrically conductive material can include a first sheet, a second sheet, and a third sheet. Voltage can be applied to the second sheet, with the first sheet and the third sheet being connected to ground. At rest, an open circuit exists between the first and the second sheets, and between the second and the third sheets. Each open circuit is configured to be momentarily closed upon projectile penetration of the first and the second sheets, and of the second and the third sheets. Each closed circuit can result in a signal noting projectile penetration of the respective pair of conductive layers. Therefore, in this embodiment, it is possible to generate two signals indicating projectile penetration of the three sheets of electrically conductive material.

In one aspect, the conductive layers are housed within a foam or rubber upper portion of a target or mobile training device to allow safe human contact with the training device but still allow conductive projectile detection. The conductive layers may be wrapped, folded or placed at intersecting angles within the training device such that they form a sufficiently three-dimensional target and can detect projectiles from any angle.

The base of the training device may be covered with a rubber material designed to prevent ricochet and splatter of projectiles. Foam padding may be affixed to the external surface of the rubber material to allow safe human contact while retaining the anti-splatter properties.

In another aspect, a threshold number or location of hits can be configured by the operator to elicit the response. The sensors may be used in conjunction with specific RFID, magnetic or visual beacons on other objects to facilitate their recognition by the training device. The device may include optical, RFID, magnetic, RTK, GPS or other sensor to detect and identify objects for the purpose of eliciting a distinct response. As an illustrative example, as shown in FIG. 35D, the training device may use a camera to detect a soccer ball and position itself in front of the ball at all times in order to serve as a defender or goalkeeper.

Figure 38:
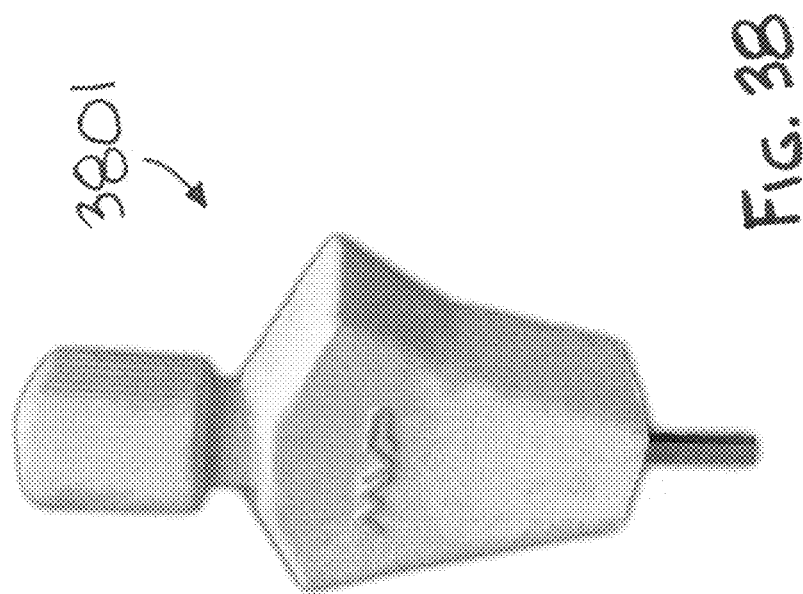
FIG. 38 illustrates a humanoid target including a target sensor including two or more conductive layers.

A shown in FIG. 38, the target, including the two or more sheets of conductive layers (detection mechanism), can take the form of a humanoid target 3801. The humanoid target can include one or more detection mechanisms, which can be whether wrapped, folded or placed about a center core, or placed at intersecting angles, within the humanoid target 3801, to form a sufficiently three-dimensional target which can substantially occlude any linear projectile path through the three-dimensional volume of the target 3801.

Target Detection Circuitry

Detecting projectile passage through the detection mechanism's parallel conductive layers requires the conductive layers to normally have different voltage potentials when at rest. As the projectile passes through the conductive layers, the projectile conducts electricity from one plate (or conductive layer) to another. The conductive layers of the target sensor then transition from an open, capacitive circuit (when at rest) to one with a resistor between the conductive layers (upon projectile penetration). The detection circuitry is configured to monitor the voltage of the conductive layers to detect when this transition occurs.

With a projective (e.g., bullet) velocity in excess of 3000 ft/s, the bullet detection system could have less then 70 ns to detect the bullet passing through the conductive layers. Initial efforts used voltage comparators with latches to capture this event (i.e., penetration of the conductive layers). Later iterations used faster microprocessors or FPGA's with direct sampling of the sensors to capture this event. Additionally, the move to faster microprocessors and FPGA's allows not just simple detection of projectile penetrations, but advanced heuristics and analytics can then be used to further improve shot detection and identification of projectile type. In an alternative embodiment, a single conductive layer lamination with electronically isolated ground and high voltage zones, wrapped into a three-dimensional geometry, is used to determine where the projectile passed through the target.

Shot Confirmation and Limitation of False Positives

As noted above, the three conductive layer target embodiment can be configured to generate two signals indicating projectile penetration of the three sheets of electrically conductive material. Two signals can also be generated in a four conductive layer target embodiment, where a one circuit is closed, and one signal generated, upon projectile penetration of each respective pair of conductive layers. The second signal can be used to confirm sufficient projective penetration of the target, and to limit false positives, which can sometimes occur due to a short in a single pair of conductive layers, or from a malfunctioning pair of conductive layers.

In an embodiment of a three conductive layer target embodiment, the closing of the electric circuit upon projectile penetration of two sheets of electrically conductive material comprises a penetrating signal, and the projectile penetration of the other two sheets of electrically conductive material comprises an enabling signal. In this embodiment, the processor is further configured to receive the penetrating signal; receive the enabling signal; assess the penetrating signal relative to the enabling signal; and upon satisfactory assessment, provide notification of penetration confirmation, thereby lessening a likelihood of false positives.

In this embodiment, the assessment of the penetrating signal relative to the enabling signal can further involve a discernment of projectile path based upon the multiple penetrations. In addition, the processor can be further configured to receive notification or signal of faulty penetrating signal, thereby indicating a malfunctioning detecting layer; transfer (or substitute) the enabling signal for the penetrating signal, where receipt of the enabling signal is thereafter registered and used as the penetrating signal, indicating sufficient target hit.

In an embodiment of a four conductive layer target embodiment, two sheets of electrically conductive material spaced by electrically insulating material comprises a detecting layer, and another two sheets of electrically conductive material spaced by electrically insulating material comprises an enabling layer. The detecting layer is spaced by electrically insulating material from the enabling layer.

In this embodiment, a electric circuit is closed upon projectile penetration of the detecting layer, and provides a penetrating signal. Further, an electric circuit is closed upon projectile penetration of the enabling layer. In this embodiment, the processor is further configured to receive the penetrating signal; receive the enabling signal; assess the penetrating signal relative to the enabling signal; and upon satisfactory assessment, provide notification of penetration confirmation, thereby lessening a likelihood of false positives.

In this embodiment, the processor can be further configured to receive notification or signal of faulty penetrating signal, thereby indicating a malfunctioning detecting layer; transfer (or substitute) the enabling signal for the penetrating signal, where receipt of the enabling signal is thereafter registered and used as the penetrating signal, indicating sufficient target hit.

Detecting Target Sensor Degradation or Individual Target Sensor Zone Degradation Each parallel set of conductive layers in the target exhibit some level of electrical capacitance. The level of capacitance between any two conductor layers can be quantified and characterized, as being specific to that particular target panel set, for a given set of materials, panel geometry and conductor pairing.

The aforementioned, specific capacitance can be measured by the processor. Such detection may be done with passive components with known resistance, inductance and capacitance. The processor monitors the voltage response on any panel to a step input in voltage on one conductive panel (or layer). From the resulting output, the time constant of the system may be measured and the specific capacitance of the conductor layer pairs determined. The measured value is compared to a baseline specific capacitance and used to determine proper or improper assembly and wiring.

The conductor layer pairs exhibit different electrical characteristics over time and the capacitance indicates the level of degradation as the panel and substrate break down over time and as continuously perforated (penetrated) by projectiles. This measurement is of value as an indicator of target lifespan and ongoing utility. Capacitive monitoring also reveals target failures or coupling between conductive layers.

In one target embodiment, the two sheets of electrically conductive material spaced by electrically insulating material comprise a detection layer, and at least one detection layer is included in the training device. Each detection layer exhibits a characterized level of electrical capacitance that is specific and independent relative to a characterized level of electrical capacitance of each and every other detection layer included in the training device.

In this embodiment, the target device includes electric circuitry, including the processor, configured to monitor a voltage response on the detection layer to a step input in voltage on the detection layer; then, from the voltage response, measure a time constant of the detection layer and determine a specific capacitance of the detection layer. The processor is configured to then assess the determined specific capacitance of the detection layer relative to a baseline specific capacitance of the detection layer and determine proper assembly and wiring of the detection layer. Because conductor pairs exhibit different electrical characteristics over time and the determined specific capacitance relative to the baseline specific capacitance indicates a level of degradation of the detection layer over time, use and projectile penetration, the assessment provides indication of likely detection layer lifespan and ongoing utility.

In this embodiment, the electric circuitry can be further configured to provide notification to a remote device upon determined specific capacitance of the detection layer relative to a baseline specific capacitance of the detection layer exceeding one or more pre-determined parameters. The determination of the specific capacitance of the detection layer can be performed through use of passive components of known resistance, inductance and capacitance.

Target and Target Sensor Manufacture

Figures 39A, 39B:
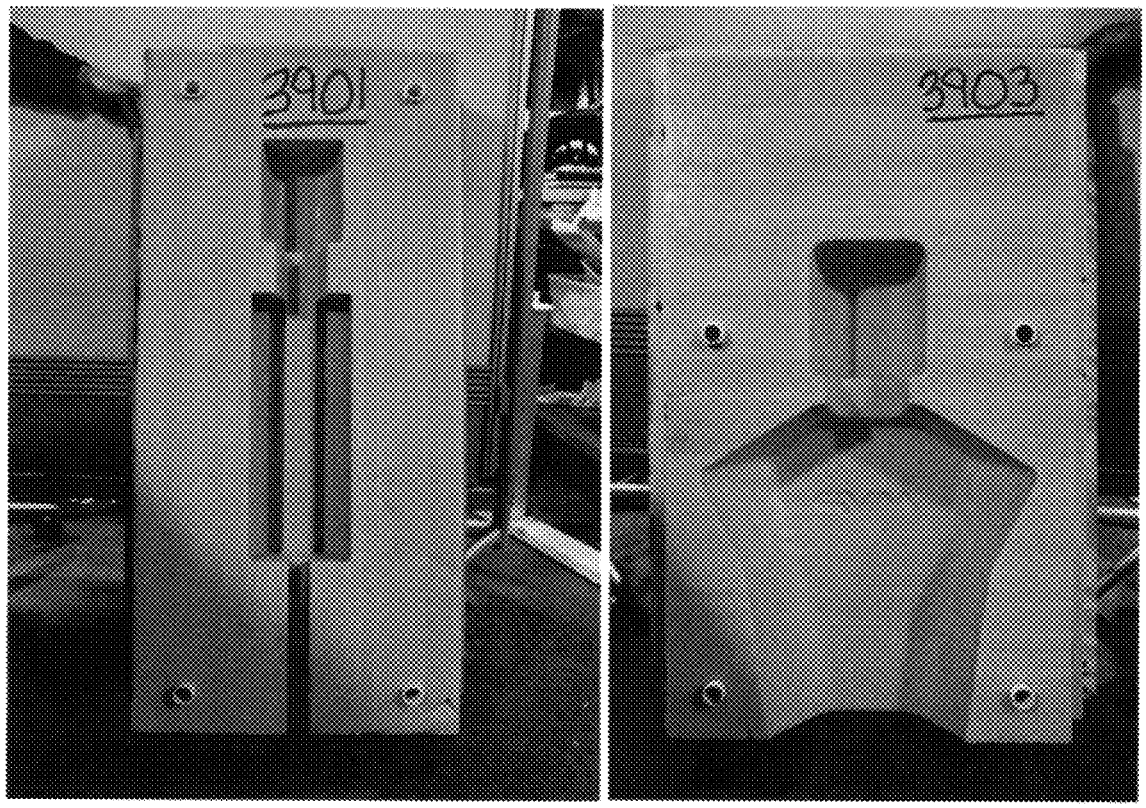
FIGS. 39A and 39B illustrate molds used to manufacture the humanoid target; where

FIG. 39A illustrates an inner mold 3901, for fabrication of a central core, or inner die, for the humanoid target 3801. FIG. 39B illustrates an outer mold 3903, for fabrication of an outer body of the humanoid target 3801. In one aspect, FIGS. 40A-E illustrate one embodiment for manufacturing the humanoid target 3801. FIG. 40A illustrates a central core 4005, possibly fabricated by injection molding using the mold shown in FIG. 39A. Planar detection layers (or detection mechanisms or sensing panels), each including two or more sheets of electrically conductive material, each conductive layer spaced by electrically insulating material, are provided for each of a head 4011 (FIG. 40B), a body 4012 and peripheral arm regions 4013 (FIG. 40C).

The planar detection layers 4011, 4012, 4013 are wrapped about the central core 4005 to form a three-dimensional humanoid target sensor configuration 4020, such that the sensing panels present surfaces configured to sense projectile incident omnidirectionally. The wrapping of the planar sensing panels 4011, 4012, 4013 into the three-dimensional target sensor configuration 4020 can include scoring, bending, hinging, and/or wrapping the planar sensing panels around the shaped inner die 4005.

The three-dimensional target sensor configuration 4020 can then be placed into an outer mold 3903 (FIG. 39) for injection molding about the target sensor configuration 4020 to form an outer shape and complete an overall appearance of a humanoid target 4025 (FIG. 40E).

Accordingly, if using both forms 3901, 3903, this method can be referred to as a 'two-pour' foam casting process. As detailed above, the inner mold 3901 provides for a casting of an inner polymer core 4005, which can be attached to a post, thereby allowing the target 4025 to connect to a mechanical actuator. The head 4011, body 4012, and periphery 4013 sensor panels are attached to the inner core 4005, which is then placed inside the outer mold 3903 to cast a main polymer body of the humanoid target 4025. The 'two-pour' manufacturing method to encase the layered sensor panels in urethane includes: 1) using an inner mold to cast a foam core onto a post; 2) wrapping the layered (e.g., laminated) sensor panels around the head, body, and fringe regions of the inner core mold; 3) placing the wrapped core in the body mold; and 4) casting the main body of the humanoid target out of urethane foam.

Figure 42:
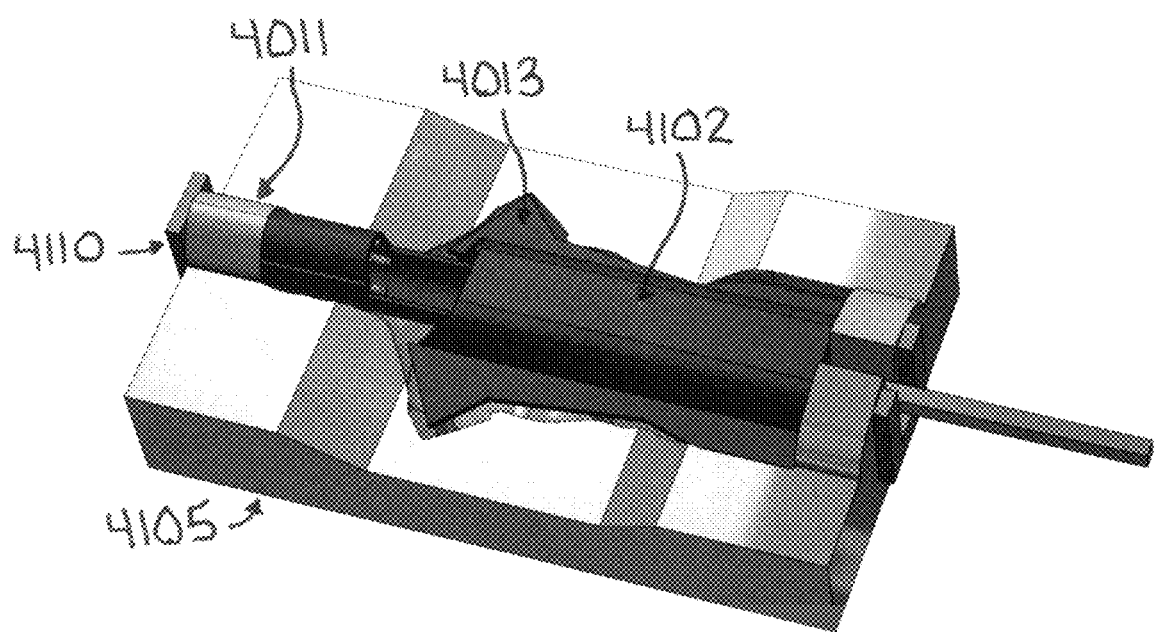
FIG. 42 illustrates the one-half outer body mold shown in FIG. 41A, with the fixed support pins and removable support posts securing sensor panels for the head, body, and peripheral regions, all packed into the mold for casting of the outer body thereabout.

Alternatively, an expedited casting process allows an entire humanoid target to be poured in a single mold. In this alternative method, a two-piece mold includes internal structure that can support the layered sensor panels and allow for a more efficient polymer casting process. As shown in FIGS. 41 and 42, this alternative manufacturing method (of a molding process) can comprise the steps of: 1) accessing an open mold; 2) inserting support pins into the mold; 3) folding, wrapping, and/or packing the layered sensor panels into the mold; 4) closing the mold for polymer injection; 5) opening the mold after curing; and 6) removing the support pins and then removing the cast humanoid target from the mold.

FIGS. 41A and 41B illustrate the two-halves of the mold, first half 4105 and second half 4107. Also shown are the insertable support pins 4110 and fixed support posts 4112 located within the mold 4105, 4107. FIG. 42 illustrates the sensor panels (e.g., shown in FIGS. 40B, 40C) packed into the first half 4105 of the mold, with the sensor panels suitably spaced and properly positioned for casting by the insertable support pins 4110 and the fixed support posts 4112. After curing, the cast humanoid target 4125 is shown in FIG. 41C.

Electrical System Short Detection and Burn-Out

The sensor panels can be prone to failure when a projectile causes the conductive layers to permanently short within the sensor panels. A short can significantly reduce target life. The electrical circuitry, including the processor, can be configured to detect and electrically "burn out" these shorts. For example, if the system detects a short lasting longer than 100 milliseconds, the shorted target is connected to a power source (e.g., a 24 volt battery), allowing current to flow through the metal foil shard which is bridging the two parallel conductive layers to burn out shorting shard. In one aspect, the circuitry can attempt to burn out a short a maximum of ten times, and if the panels continue to be shorted, burn out attempts cease, and the target requires replacement. In another aspect, the shorted target circuitry, or portions thereof, can be isolated, via use of relay switches, to isolate sensitive electronics, before increased voltage and burn out current flow begins.

In another embodiment, the detection system preemptively exposes the sensor panels to full battery voltage to burn out shorts as (or before) they occur. In this system, the short circuit burnout may be triggered after projective detection. Alternatively, the shunt resistor may be of such a resistance that sufficient current flows through to burn out any shorted sensor material, but still provides great enough voltage differential to detect bullet strikes above the noise threshold. In yet another embodiment, the target is left open to full battery voltage such that any conductive material adjacent to the bullet is burned out upon impact; the sensor system relies on current detection to observe each bullet strike.

In one aspect, a detection circuit is included that incorporates resistive elements to sense momentary closed circuits through the conductive sheet pairs, the resistive elements possibly inhibiting current flow through the system. To effectively burn back (or burn out) hanging fragments of a conductive layer, a switch (or switches) is used to bypass the detection circuit, thereby removing the resistive elements from the circuit and yielding a circuit with sufficiently low resistance. The low-resistance circuit allows high current draw that heats and oxidizes any shorting fragments of conductive layer (e.g., foil), thereby decreasing the probability of further short circuits at that target (conductive layer pair) location In another aspect, the detection circuit coupled to the conductive sheet pairs is of sufficiently low resistance to enable oxidation of the conductive sheets immediately in all states. A current sensor outputs a response to a momentary closed circuit to the processor. The current sensor may be a shunt resistor, flux gate, hall sensor, or similar electromagnetic sensor.

In one embodiment, a target for sensing projectile impact can be provided, the target including a detection mechanism comprising two sheets of electrically conductive material spaced by electrically insulating material, where the detection mechanism is configured to close a detection circuit upon projectile penetration of the two sheets of electrically conductive material. In this embodiment, electrical circuitry, including a processor, can be configured to detect a closed detection circuit; detect a short in the closed detection circuit, where the detection circuit will remain closed for at least a predetermined time period; and apply an increased current across the two sheets of electrically conductive material of sufficient capacity to burn out a fragment of the electrically conductive material causing the short.

In this embodiment, the electrical circuitry can be further configured to detect completion of the burn out of the fragment of the electrically conductive material causing the short; discontinue the application of the increased current across the two sheets of electrically conductive material; and reset the electrical circuitry for use in sensing projectile impact.

This embodiment may further involve a voltage being applied to one sheet of electrically conductive material, where the other sheet of electrically conductive material is tied to ground. This results in an open detection circuit configured to be momentarily closed upon projectile penetration of the two sheets of electrically conductive material. The electrical circuitry can further comprise resistive elements to detect the momentarily closed detection circuit, and to detect current through the closed detection circuit. The electrical circuitry can further be configured to, upon detection of the short in the closed detection circuit, operate one or more switches to remove the resistive elements from the electrical circuitry, where current is increased across the two sheets of electrically conductive material due to lower circuit resistance. The increased current is sufficient to burn out the fragment of the electrically conductive material causing the short.

In another embodiment of the target, the electrical circuitry, including a processor, can be configured to detect a closed detection circuit upon projectile penetration of the two sheets of electrically conductive material; instantaneously apply an increased current, for a predetermined time period, across the two sheets of electrically conductive material, of sufficient capacity to burn out a fragment of the electrically conductive material. This would prevent a short caused by a fragment of the electrically conductive material.

This another embodiment may further involve a voltage being applied to one sheet of electrically conductive material, where the other sheet of electrically conductive material is tied to ground. This results in an open detection circuit configured to be momentarily closed upon projectile penetration of the two sheets of electrically conductive material. The electrical circuitry can further comprise resistive elements to detect the momentarily closed detection circuit. The electrical circuitry can be further configured to, upon detection of the closed detection circuit, operate one or more switches to remove the resistive elements from the electrical circuitry, where current is increased across the two sheets of electrically conductive material due to lower circuit resistance. The increased current is sufficient to burn out a fragment of the electrically conductive material, should one arise. The increased current thereby prevents a short caused by a possible fragment of the electrically conductive material.

Mechanical Actuator

Figure 43:
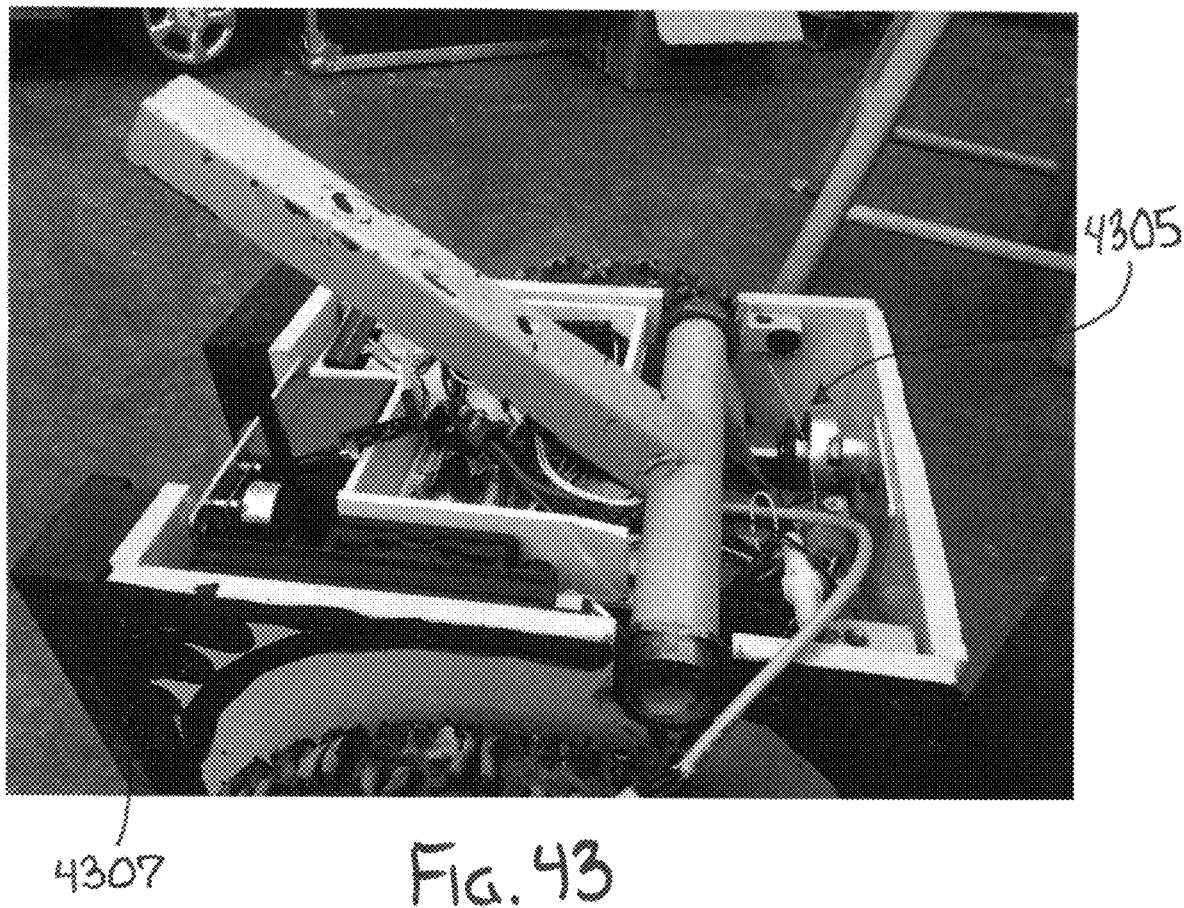
FIG. 43 illustrates a target base with mechanical actuator that includes a metal yoke and motorized lead screw to raise and lower a target with panel sensors.

FIG. 43 illustrates a mechanical actuator 4305, which can provide that the humanoid target atop a base 4307 move or fall over in response to critical detection zone hits or projectile impact tally. The mechanical actuator 4305 includes a metal yoke which rotates about a single axis and a motorized lead screw which rotates the yoke through a range of motion.

A limit switch can be positioned at the extremes of up and down throw. A motor controller can be implemented to accept input from the up/down limit switches, and to code operation of the entire system on a microcontroller board. When the target is adequately hit (e.g., target sensor circuit closed) and the electrical circuitry reaches a pre-determined number of hits for a "kill," the electric motor runs forward and causes the target to tip backward until reaching the lower limit switch. Upon contacting this limit switch, the motor reverses direction until hitting the upper limit switch, thus returning the humanoid target to a standing position. This motion provides a robust physical hit indicator for trainees. A swiper resistor, potentiometer or encoder may also be used to detect the position of the target and inform control thereof.

The mechanical actuator responds instantly to the motor controller in the electrical detection system, allowing the actuator to initiate a mechanical response mere milliseconds after bullet hit (circuit closure). The U-channel and aluminum connection between the target and the actuator also allows for easy target replacement in less than 1 minute.

In another embodiment, the three-dimensional target sensor may be suspended from an unmanned aerial vehicle (UAV), upon which the sensor electronics can be mounted. When a strike on target is detected, the target is released to fall to the ground, providing the shooter feedback of a positive hit. This configuration allows live fire training on a highly mobile, aerial platform without causing permanent damage to the aerial vehicle.

Operating System

A software application provides users with real-time feedback when shooting. The operating system allows users to create and save training exercises in which they can specify how many head, body, and peripheral fringe shots are needed to trigger the mechanical actuator. For the operating system to communicate with a base, or mobile base, a message relaying hub can be provided.

A communication protocol ensures reliability of communication. Each base used in association with a humanoid target sensor is assigned a unique identification. All messages from the operating system to a base, or drive base, contains the unique identification, the desired action or information, and appropriate delimiting characters. Messages coming the other direction are similarly formatted, but with a distinct leading delimiter. With this protocol, communication with multiple target systems can occur simultaneously. Additionally, a microcontroller onboard the target base continually streams relevant data, including the head, body, and fringe hit counts, the up or down state of the mechanical actuator, and whether the exercise is paused or active. As a result, if the operating system and a drive base fall out of sync, once reconnected, the system will receive this needed information and update its state accordingly.

As detailed above, to prevent permanent shorts, layers of conductive foil in the target sensor are separated by a penetrable layer, such as a self-healing foam. Additionally, the operating system is configured to inform a user of a permanent short via the software application. Then, the system works to burn-out persistent shorts with a spike of current, as previously described. In one aspect, after ten unsuccessful attempts to burn-out a short, the operating system informs a user to replace the affected target.

Addressing wireless communication and possible receiver failure, a transmitter relies on the appropriate signal from the detection circuit, and a receiver depends on the transmitter working properly. There is risk for dropped messages if the transmitter is out of range of the receiver or if the receiver antenna fails. By constantly streaming shot data from the target circuitry, the system is protected against these failures. In the event of wireless communication loss—when communication is later restored, the operating system will receive an updated shot count and updated target state, and can then update its own state accordingly. In the worst case, should wireless communication fail completely, the mechanical actuator will provide redundant feedback.

While the invention has been described with reference to an illustrative embodiment, it will be understood by those skilled in the art that various changes may be made and equivalents may be substituted for elements thereof without departing from the spirit and scope of the invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. As an example, the use of the mobile device on artificial surfaces may cause several of the components to be altered to prevent the rubber granules from interfering with the operation of the mobile device. The presently disclosed embodiments are therefore to be considered in all respects as illustrative and not restrictive.

What is claimed is:

1. A training device, comprising:
   a target for sensing projectile impact, the target including a detection mechanism comprising two sheets of electrically conductive material spaced by electrically insulating material, wherein the detection mechanism is configured to close an electric circuit upon projectile penetration of the two sheets of electrically conductive material; and
   a processor configured to interpret commands, receive and forward signals, and provide control instructions to the training device.

2. The training device of claim 1, wherein the two sheets of electrically conductive material spaced by electrically insulating material comprise two sheets of aluminum foil laminated on each side thereof to a layer of crosslinked ethylene foam.

3. The training device of claim 1, wherein the two sheets of electrically conductive material spaced by electrically insulating material are geometrically arranged to occlude any linear path through a three-dimensional volume of the target.

4. The training device of claim 1, wherein electronic contacts to one or more different zones of the detection mechanism are substantially wide, wider than a projectile, configured to continue transmission of electrical signals therethrough even after reception of one or more projectile penetration to the contacts.

5. The training device of claim 1, wherein the two sheets of electrically conductive material spaced by electrically insulating material comprise a conductive sensor panel, wherein the conductive sensor panel is laminated such that individual conductors protrude from a sensing zone such that discrete electrical contact may be made with each layer individually.

6. The training device of claim 1, wherein the two sheets of electrically conductive material spaced by the electrically insulating material form a detection layer, wherein the detection layer is wrapped about a perimeter of a center core portion of the target, providing a rounded, three-dimensional detection mechanism, thereby providing that the detection mechanism can receive projectile penetration from any direction.

7. The training device of claim 1, wherein the two sheets of electrically conductive material spaced by the electrically insulating material form a detection layer, wherein the detection layer is bent or folded to form an intersecting angle, or multiple detection layers are placed at intersecting angles, relative to one another, within the target, thereby providing that the detection layer or layers can receive projectile penetration from any direction.

8. The training device of claim 7, wherein:
the multiple detection layers placed at intersecting angles, relative to one another, within the target, comprise multiple and independent detection zones, and
the training device further includes electrical circuitry, and together with the processor, are configured to:
detect projectile impact to each of the multiple and independent detection zones; and
detect a projectile path through the target based on projectile impact to one or more of the multiple and independent detection zones.

9. The training device of claim 1, wherein the training device is mobile and comprises:
a base including a self-propelled, remotely controlled, drive system;
an upper portion extending upwardly from, and attached to, the base, where the upper portion is configured for a training purpose and includes the detection mechanism; and
a control module configured to receive operator commands.

10. The training device of claim 1, where a separate detection mechanism is established for each of a head, body, and one or more peripheral regions, where each separate detection mechanism is independently electrically connected, and the processor is further configured to:
receive a signal concerning each closed electric circuit, upon projectile penetration of the respective detection mechanism, including a signal indicative of the respective detection mechanism;
tally the number of closed circuits, wherein the tally factors the detection mechanism associated with each closed circuit;
provide control instructions initiating a notification of performance, the notification factoring each closed circuit, along with the associated detection mechanism, thereby differentiating between projectile penetrations associated with different detection mechanism regions.

11. The training device of claim 1, wherein:
the closing of the electric circuit upon projectile penetration of the two sheets of electrically conductive material initiates a penetrating signal;
the detection mechanism further comprises a third sheet of electrically conductive material, spaced by electrically insulating material from the other two sheets of electrically conductive material, the third sheet of electrically conductive material electrically connected to provide an enabling signal upon projectile penetration thereof; and the processor is further configured to:
receive the penetrating signal;
receive the enabling signal;
assess the penetrating signal relative to the enabling signal; and
upon satisfactory assessment, provide notification of penetration confirmation, thereby lessening a likelihood of false positives.

12. The training device of claim 11, wherein the assessment of the penetrating signal relative to the enabling signal involves a discernment of projectile path based upon multiple penetrations.

13. The training device of claim 11, where the processor is further configured to:
receive notification or signal of faulty penetrating signal, thereby indicating a malfunctioning detecting layer, where the detecting layer comprises the two sheets of electrically conductive material;
transfer the enabling signal for the penetrating signal, wherein receipt of the enabling signal is thereafter registered and used as the penetrating signal.

14. The training device of claim 1, wherein:
the two sheets of electrically conductive material spaced by electrically insulating material comprises a detecting layer;
the closing of the electric circuit upon projectile penetration of the detecting layer initiates a penetrating signal;
the detection mechanism further comprises an enabling layer comprising a second set of two sheets of electrically conductive material spaced by electrically insulating material, the detecting layer spaced by electrically insulating material from the enabling layer;
the enabling layer is electrically connected to provide an enabling signal upon projectile penetration thereof; and
the processor is further configured to:
receive the penetrating signal;
receive the enabling signal;
assess the penetrating signal relative to the enabling signal; and
upon satisfactory assessment, provide notification of penetration confirmation, thereby lessening a likelihood of false positives.

15. The training device of claim 14, where the processor is further configured to:
receive notification or signal of faulty penetrating signal, thereby indicating a malfunctioning detecting layer;
transfer the enabling signal for the penetrating signal, wherein receipt of the enabling signal is thereafter registered and used as the penetrating signal.

16. The training device of claim 1, wherein:
the two sheets of electrically conductive material spaced by electrically insulating material comprise a detection layer;
at least one detection layer is included in the training device;
each detection layer exhibits a characterized level of electrical capacitance that is specific and independent relative to a characterized level of electrical capacitance of each and every other detection layer included in the training device;
the training device further comprises electric circuitry, and together with the processor, are configured to:
monitor a voltage response on the detection layer to a step input in voltage on the detection layer;
from the voltage response, measure a time constant of the detection layer and determine a specific capacitance of the detection layer;

assess the determined specific capacitance of the detection layer relative to a baseline specific capacitance of the detection layer and determine proper assembly and wiring of the detection layer, whereby conductor pairs exhibit different electrical characteristics over time and the determined specific capacitance relative to the baseline specific capacitance indicates a level of degradation of the detection layer over time, use and projectile penetration, thereby providing indication of likely detection layer lifespan and ongoing utility.

17. The training device of claim 16, wherein the electric circuitry and processor are further configured to provide notification to a remote device upon determined specific capacitance of the detection layer relative to a baseline specific capacitance of the detection layer exceeding one or more pre-determined parameters.

18. The training device of claim 16, wherein the electric circuitry and processor are further configured to determine the specific capacitance of the detection layer through use of passive components of known resistance, inductance and capacitance.

19. A training device, comprising:
a target for sensing projectile impact, the target including a detection mechanism comprising three sheets of electrically conductive material, each spaced from another by electrically insulating material, wherein the detection mechanism is configured to close an electric circuit upon projectile penetration of each of:
 a first set of two of the three sheets of electrically conductive material; and
 a second, different set of two of the three sheets of electrically conductive material; and
a processor configured to interpret commands, receive and forward signals, provide control instructions to the training device, and:
 receive a first signal upon electric circuit closure resulting from projectile penetration of the first set of two of the three sheets of electrically conductive material; and
 receive a second signal upon electric circuit closure resulting from projectile penetration of the second, different set of two of the three sheets of electrically conductive material.

20. The training device of claim 19, wherein:
the three sheets of electrically conductive material comprise a first sheet, a second sheet, and a third sheet;
the training device further comprising electrical circuitry, and together with the processor, are configured to apply a voltage to the second sheet; while the first sheet and the third sheet are connected to ground;
where an open circuit exists, at rest, between the first and the second sheets, and between the second and the third sheets; and
each open circuit is configured to be momentarily closed upon projectile penetration of the first and the second sheets, and of the second and the third sheets.

21. A target for sensing projectile impact, the target including a detection mechanism comprising two sheets of electrically conductive material spaced by electrically insulating material, wherein the detection mechanism is configured to close a detection circuit upon projectile penetration of the two sheets of electrically conductive material; and
 electrical circuitry configured to:
 detect a closed detection circuit through use of resistive elements of the electrical circuitry;
 detect a short in the closed detection circuit, wherein the short is determined to exist upon the detection circuit remaining closed for at least a predetermined time period; and
 apply an increased current across the two sheets of electrically conductive material, through operation of one or more switches of the electrical circuitry to remove the resistive elements from the electrical circuitry, the increased current being of sufficient capacity to burn out a fragment of the electrically conductive material causing the short.

22. The target of claim 21, where the electrical circuitry is further configured to:
 detect completion of the burn out of the fragment of the electrically conductive material causing the short;
 discontinue the application of the increased current across the two sheets of electrically conductive material; and
 reset the electrical circuitry for use in sensing projectile impact.

23. The target of claim 21, wherein the electrical circuitry is further configured to:
 apply a voltage to one sheet of electrically conductive material while the other sheet of electrically conductive material is tied to ground, thereby resulting in an open detection circuit configured to be momentarily closed upon projectile penetration of the two sheets of electrically conductive material;
 use the resistive elements to detect a momentarily closed detection circuit, and to detect current through the momentarily closed detection circuit;
 upon detection of the short in the closed detection circuit, operate the one or more switches to remove the resistive elements from the electrical circuitry, whereby current is increased across the two sheets of electrically conductive material due to lower circuit resistance, the increased current thereby sufficient to burn out the fragment of the electrically conductive material causing the short.

24. A target for sensing projectile impact, the target including a detection mechanism comprising two sheets of electrically conductive material spaced by electrically insulating material, wherein the detection mechanism is configured to close a detection circuit upon projectile penetration of the two sheets of electrically conductive material; and
 electrical circuitry configured to:
 detect a closed detection circuit upon projectile penetration of the two sheets of electrically conductive material through use of resistive elements of the electrical circuitry;
 apply an increased current, for a predetermined time period, across the two sheets of electrically conductive material, through operation of one or more switches of the electrical circuitry to remove the resistive elements from the electrical circuitry, the increased current being of sufficient capacity to burn out a fragment of the electrically conductive material, thereby removing a short caused by a fragment of the electrically conductive material.

25. The target of claim 24, wherein the electrical circuitry is further configured to:
 apply a voltage to one sheet of electrically conductive material while the other sheet of electrically conductive material is tied to ground, thereby resulting in an open detection circuit configured to be momentarily closed upon projectile penetration of the two sheets of electrically conductive material;

use the resistive elements to detect a momentarily closed detection circuit;

upon detection of the closed detection circuit, operate the one or more switches to remove the resistive elements from the electrical circuitry, whereby current is increased across the two sheets of electrically conductive material due to lower circuit resistance, the increased current thereby sufficient to burn out a fragment of the electrically conductive material, thereby removing a short caused by a fragment of the electrically conductive material.

26. A target for sensing projectile impact, comprising:

a base; and a target portion extending upwardly from, and movably attached to, the base, where the target portion includes a detection mechanism comprising two sheets of electrically conductive material spaced by electrically insulating material, wherein the detection mechanism is configured to close an electric circuit upon projectile penetration of the two sheets of electrically conductive material and to activate a mechanical actuator, the mechanical actuator configured to pivot the target portion, relative to the base, to a near horizontal position.

27. The target of claim 26, wherein:

the target portion is of humanoid shape, and a separate detection mechanism is established for each of a head, body, and one or more peripheral regions, and each separate detection mechanism is independently electrically connected;

the target further comprises electrical circuitry, and together with a processor, are configured to:

receive a signal concerning each closed electric circuit, upon projectile penetration of the respective separate detection mechanism, including a signal indicative of the respective separate detection mechanism;

tally the number of closed circuits, wherein the tally factors the separate detection mechanism associated with each closed circuit;

upon satisfaction of a predetermined tally amount, provide control instructions to activate the mechanical actuator to pivot the target portion, relative to the base, to a near horizontal position.

28. The target of claim 27, where the electrical circuitry and processor are further configured to:

provide control instructions, after a predetermined time period, to return the target portion to an upright position, by re-pivoting the target portion relative to the base.

* * * * *